(12) United States Patent
Tessier et al.

(10) Patent No.: US 9,090,337 B2
(45) Date of Patent: Jul. 28, 2015

(54) APPARATUS AND METHOD FOR CONTROLLING A FORCE-ACTIVATED CONTROLLER

(75) Inventors: Claude Tessier, Sainte-Adele (CA); Jonathan Martineau, Entrelacs (CA)

(73) Assignee: BOMBARDIER INC., Dorval, Quebec (CA)

( * ) Notice: Subject to any disclaimer, the term of this patent is extended or adjusted under 35 U.S.C. 154(b) by 859 days.

(21) Appl. No.: 13/220,740

(22) Filed: Aug. 30, 2011

(65) Prior Publication Data

US 2012/0053735 A1   Mar. 1, 2012

Related U.S. Application Data

(63) Continuation of application No. 10/494,563, filed as application No. PCT/CA02/01686 on Nov. 6, 2002, now Pat. No. 8,050,780.

(60) Provisional application No. 60/331,010, filed on Nov. 6, 2001.

(51) Int. Cl.

| G05D 3/12 | (2006.01) |
|---|---|
| B64C 13/50 | (2006.01) |
| B64C 13/04 | (2006.01) |
| B64C 13/10 | (2006.01) |
| B64C 13/12 | (2006.01) |
| B64C 13/46 | (2006.01) |

(52) U.S. Cl.
CPC ............... *B64C 13/503* (2013.01); *B64C 13/04* (2013.01); *B64C 13/10* (2013.01); *B64C 13/12* (2013.01); *B64C 13/46* (2013.01)

(58) Field of Classification Search
CPC .......................................... G05D 3/12
USPC .................... 700/300, 275, 302, 63
See application file for complete search history.

(56) References Cited

U.S. PATENT DOCUMENTS 5,291,113 A * 3/1994 Hegg et al. .................. 318/584

* cited by examiner

*Primary Examiner* — Tejal Gami
(74) *Attorney, Agent, or Firm* — Thomas, Karceski & Karmilovich, PC

(57) ABSTRACT

A servo-controlled system is disclosed for providing simulated feel equivalent to that of traditional mechanical hand controllers. Processed position and force sensor signals are used in a feedback loop that controls the motor mechanically connected to the stick. The feedback loop comprises a low-level motor feedback loop, and high-level force feel loop. The latter comprises static and dynamic performance components. The system allows variable and additional force cues to be specified externally to the system and felt by the operator, and/or external signal to backdrive die stick to follow a specified motion. The control framework permits the electronic coupling of motion and applied forces by pilots in a dual arrangement while retaining the above-mentioned features. It simulates cross-coupling mechanical compliance due to force fight between pilots detents and asymmetric force feel gradients. Parameters associated with loops and performance components can be specified independently.

40 Claims, 45 Drawing Sheets

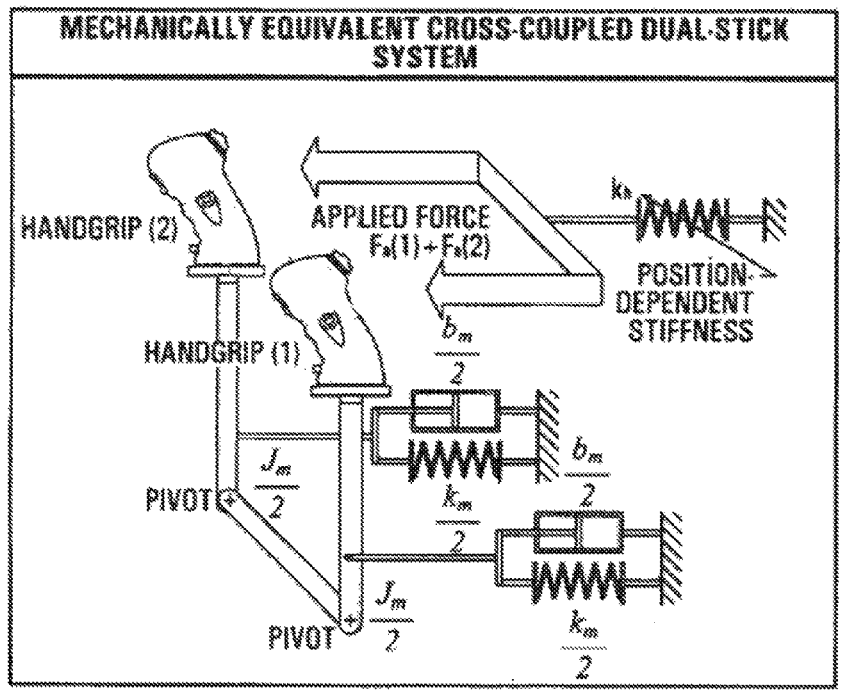

Model dynamics[1]:

$$\left(\frac{J_m}{2}\ddot{\theta}+\frac{b_m}{2}\dot{\theta}+\frac{k_m}{2}\theta\right)+\left(\frac{J_m}{2}\ddot{\theta}+\frac{b_m}{2}\dot{\theta}+\frac{k_m}{2}\theta\right)=F_a(1)+F_a(2)-k_h(\theta)\cdot\theta$$

$$J_m\cdot\ddot{\theta}+b_m\cdot\dot{\theta}+k_m\cdot\theta=F_a(1)+F_a(2)-k_h(\theta)\cdot\theta \quad \text{Leading to}$$

$$\ddot{\theta}+2\cdot\zeta\cdot\omega_n\cdot\dot{\theta}+\omega_n^2\cdot\theta=\omega_n^2\cdot\left[\frac{F_a(1)+F_a(2)-k_h(\theta)\cdot\theta}{k_m}\right]=\omega_n^2\cdot\frac{F}{k_m}=\omega_n^2\cdot\theta_c$$

FIG. 16
*(CONTINUED)*

APPARATUS AND METHOD FOR CONTROLLING A FORCE-ACTIVATED CONTROLLER

CROSS REFERENCE TO RELATED APPLICATIONS

This application is a continuation of U.S. patent application Ser. No. 10/494,563, filed on May 6, 2004, now U.S. Pat. No. 8,050,780 which is a National Phase Application of PCT/CA2002/001686 filed on Nov. 6, 2002, claiming priority from U.S. Provisional Application No. 60/331,010 filed on Nov. 6, 2001, the contents of all of which are incorporated herein by reference.

FIELD OF THE INVENTION

The present invention generally relates to control systems, for example, aircraft control systems, and in particular, but not limited to manual control devices such as hand controllers for use with a fly-by-wire control system that are driven electrically in response to hand movement.

BACKGROUND OF THE INVENTION

Over the years, the flight control systems have evolved from simple cable systems, where the pilot had to provide the force to overcome the aerodynamic hinge moments on the control surfaces, to today's fly-by-wire (FBW) systems, where computers signal surface actuators to provide a closed loop maneuver trajectory in response to pilot inputs. Prior to the advent of FBW technology, the flight control systems on commercial airplanes used cables to relay pilot commands to the flight control actuators and/or control surfaces. Even with powered controls, the control system friction was so high that the pilot required a high mechanical advantage on the controls to reduce the effect of the friction, hence the conventional control column and wheel. With the FBW systems, the pilot's inputs are sensed by transducers therefore allowing the use of sidesticks for pilot control input.

In one fly-by-wire architecture, the pilot interfaces with the system through passive sidesticks. With this implementation, no pilot situational awareness is provided through tactile cues such as changes in sidestick feel characteristics. Instead, with passive sidesticks the system has to incorporate hard envelope control limits to prevent the pilot from flying outside the normal flight envelope. This prevents the pilot from using any inherent aircraft maneuver capability in an emergency situation. Because safety is always of the highest priority in the aircraft industry, a system that can provide pilot situational awareness and also provide full aircraft maneuver capability available to the pilot when needed is highly desirable.

Other fly-by-wire systems have been able to provide pilot situational awareness and make the full maneuver capability available to the pilot; however, to accomplish this, the system had to incorporate conventional control columns and control wheels connected to variable feel mechanisms, backdrive servos, trim actuators and other supportive mechanisms. This results in a much heavier and more expensive installation than the use of sidesticks. In addition, sidesticks provide the pilot with an unobstructed view of the instruments and free up valuable space on the cockpit.

The flight control systems used today on all commercial jet transports are exposed to the consequences of a jam in the control system. Some of the systems have incorporated jam override devices that by some pilot action could alleviate a jam. Common to all of these systems is that a jam in the flying pilot's controls would require transfer of control to the other pilot and there would be some small period of time where control inputs are lost. If the jam occurred during the critical part of the flight, such as during take off or final approach, there may not be sufficient time to regain control and prevent a catastrophic event. Therefore, to improve aircraft safety, a need exists to provide continuous control capability from either pilot station following a control system jam.

Examples of active hand controllers are disclosed in U.S. Pat. No. 5,264,768 (Gregory, et al), U.S. Pat. No. 5,347,204 (Gregory, et al), U.S. Pat. No. 5,735,490 (Berthet, et al), U.S. Pat. No. 5,559,415 (Gregory, et al), U.S. Pat. No. 5,489,830 (Fernandez), U.S. Pat. No. 5,291,113 (Hegg, et al) and U.S. Pat. No. 5,694,014 (Hegg, et al).

The system described herein addresses the above issues.

SUMMARY OF THE INVENTION

According to one aspect of the present invention, there is provided a control system comprising: a control member, drive means for driving movement of the control member, determining means for receiving the value of a desired displacement for said control member and determining a required movement for said control member based on said desired displacement, and a controller for controlling said drive means in response to said determined movement.

According to another aspect of the present invention, there is provided an apparatus for controlling movement of a force-activated control member, comprising: a control member, a driver for driving movement of said control member, trajectory determining means to receive a first signal indicative of the direction for movement for said control member and to determine a trajectory for said control member based on said first signal, and a controller to control said determining means to determine the trajectory for said control member based on at least one of (1) a second signal, (2) a comparison of the direction for movement for said control member indicated by said first signal with a direction indicated by a second signal, and (3) a comparison of a force applied to said control member with a second force, and wherein said driver is arranged to drive movement of said control member based on the determined trajectory.

According to another aspect of the present invention, there is provided an apparatus for controlling movement of a control member, comprising: a driver for driving movement of a control member, a conditioner for receiving an input signal indicative of a force, said conditioner defining a first relationship between an input force in one direction and an output force and defining a second relationship between an input force in the opposite direction and an output force, said first relationship being different to said second relationship, trajectory determining means for determining a trajectory for said control member based on said output force determined by said conditioner, and wherein said driver is arranged to drive said control member based on said determined trajectory.

According to another aspect of the present invention, there is provided an apparatus for controlling movement of a control member, comprising: a driver for driving movement of a control member, a conditioner for receiving an input signal indicative of a force, said conditioner defining a first relationship between an input force in one direction and an output force and defining a second relationship between an input force in the opposite direction and an output force, said first relationship being different to said second relationship, trajectory determining means for determining a trajectory for said control member based on said output force determined by said conditioner, and wherein said driver is arranged to drive said control member based on said determined trajectory.

According to another aspect of the present invention, there is provided a controller for controlling a driver for driving movement of a control member, comprising: input means for receiving a signal indicative of a force applied to a control member by an operator, and a compensator for varying the force applied by said driver to said control member in response to said signal to oppose the force applied to said force-activated controller by said operator.

According to another aspect of the present invention, there is provided an apparatus for controlling coupling between first and second force-activated control members, comprising a first sensor for sensing a value of a parameter indicative of a force when a force is applied to said first control member, a second sensor for sensing a value of a parameter indicative of a force when a force is applied to said second control member, coupling means for coupling motion of one of said first and second control members to the other said control member, detecting means for detecting a difference in the direction of said forces, and coupling control means for permitting differential displacement between said first and second control members if the lesser of said values exceeds a predetermined value.

According to another aspect of the present invention, there is provided an apparatus controlling an actuator, comprising a control member for receiving an applied force from an operator, a trajectory generator for receiving a commanded displacement and for generating a signal therefrom indicative of a desired trajectory for said control member, and means for feeding said signal to an actuator controller for controlling said actuator in response to said signal.

According to another aspect of the present invention, there is provided an apparatus for controlling an actuator, comprising a control member for receiving a force from an operator, a trajectory generator for receiving a commanded displacement for said control member and for generating a signal indicative of a desired trajectory for said control member, and an actuator controller for receiving said signal and adapted to control an actuator in response to said signal.

According to another aspect of the present invention, there is provided an apparatus for controlling movement of a control member comprising drive means for driving movement of said control member, determining means for receiving the value of a commanded displacement for said control member and for generating from said commanded displacement a series of positions for said control member, and a controller for controller said drive means in response to said series of positions.

According to another aspect of the present invention, there is provided an apparatus for controlling movement of a force-activated controller, comprising: a generator responsive to a force applied to said controller for generating the value of a parameter defining a desired movement for said controller based on said force, and a driver for driving said controller based on the value of said parameter.

According to another aspect of the present invention, there is provided a generator for generating a control signal for controlling a force-activated controller, comprising means defining the relationship between a first parameter relating to movement for a force-activated controller and a second parameter relating to a force applied to said force-activated controller, an input for receiving a value for said second parameter and an output for outputting a value of said first parameter.

According to another aspect of the present invention, there is provided a method of controlling movement of a force-activated controller, comprising the steps of: detecting a force applied to said force-activated controller, generating the value of a parameter defining movement for said controller based on said detected force and driving movement of said controller based on the value of said parameter.

According to another aspect of the present invention, there is provided an apparatus for controlling movement of a force-activated controller, comprising: a driver for driving movement of a force-activated controller, sensor means for sensing a force applied to said controller, generating means for generating a signal indicative of the value of a force based on the value of the applied force, summing means for summing said value with the value of another force, displacement determining means for determining a displacement for said controller based on the summed forces, and wherein said driver is arranged to drive said controller based on the determined displacement.

According to another aspect of the present invention, there is provided an apparatus for controlling movement of a plurality of controllers, comprising: a first controller and a second controller, a first driver for driving said first controller, a second driver for driving said second controller, sensing means for sensing a force on said first controller, displacement determining means for determining a displacement for said first controller based on a force derived from the force sensed by said sensing means, and wherein said first and second driving means are arranged to drive said first and second controllers, respectively based on the determined displacement.

According to another aspect of the invention, there is provided an apparatus for controlling movement of a force-activated controller, comprising: a first and second controller, a driver for driving movement of said first controller, first generating means for generating a value indicative of force based on a force applied to said first controller, second generating means for generating a value indicative of force based on a force applied to said second controller, a summer for summing said values, and displacement determining means for determining a displacement for said first controller based on the summed values, and wherein said driver is arranged to drive said first controller based on the determined displacement.

According to another aspect of the present invention, there is provided an apparatus for controlling coupling between first and second force-activated controllers, comprising a first sensor for sensing a value of a parameter indicative of a force when a force is applied to said first controller, a second sensor for sensing a value of a parameter indicative of a force when a force is applied to said second controller, coupling means for coupling motion of one of said first and second controllers to the other said controller, detecting means for detecting a difference in the magnitude of said values and displacement control means for permitting differential displacement between said first and second controllers if the lesser of said values exceeds a predetermined value.

According to another aspect of the present invention, there is provided an apparatus for controlling movement of a force-activated controller, comprising: a driver for driving said controller, a generator for generating a value of force based on a force applied to said controller, movement determining means for determining the value of at least one parameter defining movement for said controller based on said value, and wherein said driver is arranged to drive the movement of said controller based on the determined movement.

According to another aspect of the present invention, there is further provided a force-activated controller, comprising: a control member, a driver coupled to said control member at a first position for driving movement of said control member, a sensor coupled to said control member at a second position spaced apart from first position, for sensing a parameter indicative of a force on application of a force on said control member, and a stop for resisting movement of said control member when said control member reaches a predetermined position, and wherein said stop is positioned to engage said control member at said first position or at a position spaced therefrom in the direction of said second position.

According to another aspect of the present invention, there is provided an apparatus for controlling a force-activated controller substantially as hereinbefore described with reference to and illustrated by any one of the accompanying drawings.

Aspects of the present invention provide an implementation of a feel simulator for an active hand controller, and use this as a framework to assemble a cross-coupled active hand controller system, and to integrate various functions required for a commercial aircraft application within this framework.

Implementation of a Feel Simulator

In one aspect of the present invention, the feel simulator is comprised of two, preferably, independent components, a High-Level Controller, and a Low-Level Controller.

The Stick Unit High-Level Controller comprises as principal component a Model-Based Trajectory Generator. The Model-Based Trajectory Generator uses a desired model for the hand controller to determine how the latter moves or behaves when subject to an applied force at the handgrip of the hand controller. The desired trajectory may comprise at least one of the displacement of a control member as a function of time, the displacement rate and acceleration as well, both as a function of time.

In one embodiment, the Model-Based Trajectory Generator is further separated into a steady-state or static performance component called Static Performance Model, and a dynamic component called Dynamic Performance Model. These two elements may be independent of one another.

The Static Performance Model determines the steady-state position of the control member as a function of force. This is done using the desired Force versus Displacement relationship for the hand controller; this relationship will be referred to as feel force profile, or profile for short, hereinafter. This profile can include non-linearities such as zero breakout, also called detent, and soft and hard stops. Normally, the relationship is expressed with a small number of clear and intuitive parameters. The profile can also be varied during operation of the hand controller by modifying the value of its various parameters, for example as a function of the current aircraft state. For example, the force gradient could be increased to reflect higher control surface hinge moments as a function of aircraft airspeed, or the loss of control surface effectiveness with aircraft weight and center of mass location.

The Dynamic Performance Model determines how the hand controller moves from its current displacement toward the steady state displacement determined by the Static Performance Model. The desired dynamics can be modeled in various ways and in one example may be taken to be a simple second-order mass-spring-dashpot system because it is both natural and intuitive, and its response is well understood and described in terms of only two parameters, the system natural frequency and damping ratio. The desired dynamic model can also be varied during operation of the hand controller by modifying the value of its parameters. For example, the damping could be increased at the profile discontinuities, and the natural frequency can also be increased to reflect areas with greater stiffness.

A feature of one aspect of the present invention is the possible independence of the Static and Dynamic Performance Models with one another. In one embodiment, the profile can be modified without changing the dynamic response of the stick, or vice versa. This allows modification of the feel force, on-line if necessary, without requiring adjustment of or changes to the dynamic response of the hand controller.

The total applied force to the hand controller comprises two components. The first component is the measured force applied by the operator at the handgrip. This force is measured with a force sensor mechanically connected to the hand controller, preferably between the hand controller pivot axis or mechanical stops, and the handgrip. The second component of force is an externally supplied signal from either a similar hand controller, or computed by the flight control computer. The force sensor and associated electronics are elements of the Stick Unit Low-Level Controller.

Aspects of the present invention allow the implementation of an autopilot backdrive capability, variable feel, additional force feel to implement envelope protection cues, and feel force asymmetry to make the pilot experience both symmetric force and response for left and right hand controller displacements.

In one embodiment, the Low-Level Controller comprises the above mentioned force sensor, a gimbal mechanism to separate the various displacement degrees-of-freedom of the hand controller, a back-up mechanical feel system, a servomotor system that includes various feedback signals, optionally a mechanical reduction component, and a Trajectory Controller. It also comprises independent gimbal axis displacement sensors to provide redundant hand controller displacement commands to the flight control computer.

The desired trajectory from the Stick Unit High-Level Controller is relayed to a lower-level servo loop containing a Trajectory Controller in the Stick Unit Low-Level Controller. The Trajectory Controller uses position, rate, and force feedback from one or more sensors mechanically attached to the hand controller system to determine a control signal to the motor control electronics. This element in turn commands an electric motor, which through an optional reduction mechanism, and a coupling mechanism, moves the hand controller according to the desired trajectory. A sensor may be provided to measure one position, rate, and acceleration and other parameters can be derived therefrom by integration or differentiation. Alternatively, individual reasons may be provided for measuring each trajectory parameter. Therefore, when subject to some applied forces, the Trajectory Generator computes the trajectory corresponding to the desired behavior of the hand controller, and the Trajectory Generator makes the latter follow this trajectory. Hence, the hand controller moves according to the desired model, and provides an artificial and controllable feel.

In one embodiment, the Trajectory Controller takes as an input a desired trajectory and controls the hand controller, through an electric actuator, to accurately follow this trajectory. The Trajectory Controller can be designed to perform equally well on a limited range of trajectory corresponding to the required dynamics for the control task. Hence, if the desired behavior of the stick is changed, or the feel profile is modified, there is no need to adjust the controller gains to satisfy the trajectory tracking accuracy. The Trajectory Controller comprises two parts. A first part uses the measured applied force feedback to compensate the effects of this applied force so that a second part can control the hand controller as if no force were applied to it. This latter point is an important feature of an aspect of the present invention.

As said before, the hand controller system can also accept an external force signal that the Trajectory Generator will use to generate a trajectory, or directly an external trajectory signal. The resulting trajectory is passed to the Trajectory Controller and the servo loop will make the hand controller accurately track it. Given that these trajectories are dynamically equivalent to that of the desired model response under operator force, the system will track accurately. This capability of an aspect of the present invention can be used to implement cross-coupling of a number of hand controllers, or autopilot backdrive to make the hand controller move according to the autopilot commands to the control surfaces or additional force cues to provide envelope protection. In the former case, the external signal could simply be the force applied by a second pilot on a second hand controller.

Cross-Coupled Control Member System

The feel simulator of an aspect of the present invention offers a framework in which additional functions can be easily integrated while retaining all of its capabilities. The additional functions are hand controller cross-coupling, left-right asymmetric feel force, distributed zero breakout, cross-coupling force override, graceful de- and re-coupling. The feel control system functions may include variable feel, envelope protection additional force cues, autopilot backdrive, autopilot backdrive force override, and graceful de- and re-coupling.

Natural and intuitive cross-coupling of an arbitrary number of hand controllers is achieved by force summation. Accuracy in the cross-coupling is achieved by similarity rather than by cross-position feedback. This is based on the fact that if the hand controllers are similar, and if they are commanded the same trajectory, then their motion should be identical given that it is accomplished with the same controller performance. To achieve this, the Trajectory Controller must compensate for the force applied to the hand controller, to avoid invalidate the basic condition for an accurate system.

One aspect of the present invention provides a scaled force summation scheme to provide implementation of asymmetric feel force profile for the right and left hand controllers. This consists of a simple modification to the force summation scheme. With this asymmetry, each pilot will experience a symmetric feel even though he is stronger for inboard displacement than for outboard displacement.

Aspects of the present invention also include an additional modification to the cross-coupling scheme, either force summation or scaled force summation, to allow distribution of the zero breakout, or detent, in an arbitrary ratio between the hand controllers taken together, or independently. In the former case, the detent is shared, as would be the case in a mechanical system, while in the latter case, the detent is available on each hand controller independently of one another.

A cross-coupling force override capability is also developed. It could be needed in case of force fight that could occur between the two pilots, or to deal with dead-man type of input. Requirements for this capability depend on the exact implementation of the Stick Unit Low-Level Controller, especially the location and characteristics of the force sensor. It would certainly be needed in the case where a constant bias would develop on a force sensor following a fault. An aspect of the present invention defines precisely what the fight force is, and how to calculate it. It also proposes an optional decomposition of the system motion into two independent displacements, average and differential. The first is determined by the total force applied to the hand controller system, while the second is determined by the amount of force fight, and could result in the hand controllers separating from one another.

The differential displacement can use the same Model-Based Trajectory Generator as described before, except that its input is the fight force instead of the total force; the very same features and capabilities are retained. This allows the Fight Force versus Differential Displacement and the differential displacement dynamics to be specified independently of one another, and from the average hand controller displacement. The Static Performance Model determines the differential displacement of the hand controllers as a function of fight force. The Dynamic Performance Model determines the response or behavior of the hand controller differential displacement to changes in the amount of force fight. Typically, this dynamics would be much higher than the hand controller dynamics, but can be selected arbitrarily.

The cross-coupling force override makes the system behave as if the hand controllers were cross-coupled with a spring-loaded mechanical connection, although it also allows the separation breakout to remain constant over the full range of travel of the system, contrary to its mechanical counterpart.

A predetermined amount of fight force, or equivalently of separation between the hand controllers, triggers a cross-coupling fade-in to accomplish a graceful de-coupling of the hand controller system.

Finally, a Control Side Select Switch is briefly described. This switch allows the pilots to manually deselect a hand controller so preventing the flight control computer of using the de-selected hand controller displacement commands.

Some redundant implementation architectures are also proposed with maximum control path separation to minimize the potential for fault propagation and to optimize physical separation of the supporting electronics. Most of the architectures can be implemented with either analog or digital (processor and software) circuitry.

Aspects of the invention provide a control architecture framework and associated algorithms allowing the integration of the following capabilities in a system made of one, two, and eventually more, active hand controllers for a variety of applications including aerospace applications such as for flying a commercial aircraft. Aspects of the invention can be equally applied to sidestick or centerstick type of hand controllers in both tandem or back-to-back configuration. These hand controllers are normally used to provide commands about two mutually perpendicular axes, normally corresponding to the aircraft so-called pitch and roll axes. Note however that hand controllers have been developed to control various systems, such as helicopters or robotic manipulators, requiring from three to six degrees-of-freedom. Aspects of the present invention apply equally to these hand controllers as the control architecture and algorithms is applicable to each of the individual degrees-of-freedom independent of one another. Moreover, the flexibility offered by aspects of the present system allow the functions to be tailored to each of the independent degrees-of-freedom.

The major functions provided by various aspects of the present invention are:

(1) SIMULATED FEEL FORCE to provide the proprioceptive feedback needed to achieve adequate level of aircraft handling qualities.

(2) VARIABLE FEEL FORCE providing the capability to adjust the nominal feel so as to achieve optimum proprioceptive feedback over the flight envelope of the aircraft.

(3) AUTOPILOT BACKDRIVE allowing hand controllers to move to reflect the autopilot commands to the flight control system. Such tactile cues improve pilot situation awareness during automatic flight, and therefore improve the overall safety of the system by allowing the pilot to take appropriate actions more quickly in a critical situation.

(4) ADDITIONAL FORCE CUES elaborated by the envelope protection function of the Flight Control Computer. These cues are intended to improve pilot situation awareness with tactile cues to reflect exceedance of the normal flight envelope boundaries.

(5) CROSS-COUPLING of two or more hand controllers so that the motion imparted by a pilot to his hand controller is reflected at the other pilot hand controller. This function also allows two pilots to cooperate in the command of the aircraft, minimize transient commands when control is passed and taken over from one pilot to the other, or to make one pilot very well aware of what the other pilot is doing. In the latter case, one should mention instructor/student training where the instructor may need to provide some help or guidance to the student.

(6) Hand controllers LEFT/RIGHT ASYMMETRIC FEEL. This capability is needed for the roll axis in side-by-side hand controller configuration. It is due to the fact that the human operator has a better capability for developing force inward (i.e. inboard) than outward (i.e. outboard). By properly adjusting the inboard/outboard forces reflected by the hand controller, the pilot would feel symmetric forces in the two directions. Typically, the human operator generates 50% more force inboard than outboard.

(7) DISTRIBUTED BREAKOUT or DETENT providing hand controller centering or return to zero capability, zero displacement cue to the pilot, and some protection against the transfer of perturbing forces between controllers, either created by the pilot themselves, or simply due to aircraft acceleration (e.g. in gust, turbulence, high-g maneuvers).

(8) CROSS-COUPLING FORCE OVERRIDE allowing the hand controllers to be separated in case where significant opposing forces would be simultaneously applied by the two pilots. This feature is to protect against jam of some part of the flight control system. Note however that in the case of a fly-by-wire flight control system, and for some configuration, this feature may not be needed.

(9) GRACEFUL DECOUPLING in case of cross-coupling force override so as to minimize transient motion imposed on the hand controllers, and subsequently to the aircraft, due to the large forces applied by the pilots on the hand controllers. Note however that in the case of a fly-by-wire flight control system, and for some configuration, this feature may not be needed.

(10) AUTOPILOT FORCE OVERRIDE which allows the autopilot to be overridden on application of an operator force to a control member. This may also allow a differential displacement or trajectory between that induced by the applied force and that controlled by the autopilot.

(11) GRACEFUL COUPLING/DECOUPLING of the autopilot.

(12) USE OF THE DESIRED TRAJECTORY determined by the trajectory generator as an input to an actuator control system, such as a flight control system for controlling an actuator.

Many of the functions apply to a single hand controller, not necessarily to a cross-coupled hand controller system. However, they are important to consider as a cross-coupled system is the linking of two or more individual hand controllers. Aspects of the present invention allow these single hand controller functions to be maintained when hand controllers are coupled together, and strictly coupled functions to be added as well. As such, one aspect of the present invention can be thought of both as a general framework to integrate various capabilities, and as a set of individual functions to satisfy requirements associated with the flight control of multi-degree-of-freedom systems such as an aircraft. In brief, one aspect of the present invention can be regarded as a construction kit allowing the implementation and application specific tailoring of active cross-coupled hand controller, or other controller, system functions.

BRIEF DESCRIPTION OF THE DRAWINGS

Examples of embodiments of aspects of the present invention will now be described, with reference to the drawings, in which.

DETAILED DESCRIPTION OF THE PREFERRED EMBODIMENTS

In the following, the term stick will be used synonymously to (active) hand controller. Moreover, it is assumed to apply equally to sidestick and centerstick type of hand controllers as well as other controllers for example operated by other parts of the body e.g. a foot or feet. Although embodiments of the invention are described for an application to aircraft, it is applicable to any system requiring similar control functionality; for example, this includes rotorcraft, various types of ground vehicles including specialized machinery (e.g. construction, mining, forestry industries), water surface vehicles, underwater vehicles, spacecraft, and robotic manipulators. The embodiments described herewith apply to individual degrees-of-freedom of control of hand controllers. Therefore, although reference will be made to hand controllers providing two mutually perpendicular degrees-of-freedom of control, namely pitch and roll axes for an aircraft, aspects of the invention can be applied to any number of such degrees-of-freedom provided on the hand controller. For example, it could include the yaw axis control as well; the latter could be provided by independent rotation (twisting) of the handgrip about its axis.

Figure 1:
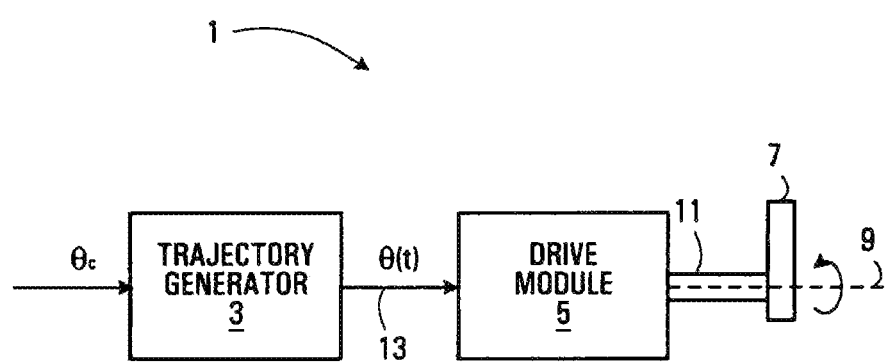
FIG. 1 shows a schematic diagram of an apparatus for controlling movement of a control member, according to an embodiment of the present invention.

Referring to FIG. 1, an apparatus 1 for controlling a force-activated control member, according to an embodiment of the present invention, comprises a trajectory generator 3 and a drive module 5 for driving movement of a control member 7. The control member 7 may comprise a hand controller for receiving manual input forces from a human user or any other control structure. In this embodiment, the control member is pivotally mounted for rotation about an axis 9 and coupled to the drive module 5 by means of a rotary or other shaft 11, such as a reciprocating shaft.

The trajectory generator 3, which may comprise a digital processor or other device, is adapted to receive the value of a commanded or desired displacement or position, $\theta_c$, for the control member 7 and to determine the precise movement for the control member between—its current position and the commanded position. For example, the trajectory generator 3 may include a description of the desired dynamic behavior for the control member and determine the trajectory or movement for the control member based on this description. The description may, for example, comprise a mathematical model of the desired mechanical behavior for the control member from which the desired movement is determined based on the commanded position. The trajectory generator 3 is adapted to generate a signal 13 which defines the movement for the control member 7 and which is indicative of the determined displacement or position for the control member as a function of time. In this way, the trajectory generator generates a series of values of the position for the control member over time according to the predetermined dynamic performance required for the control member. These values are transmitted from the trajectory generator 3 to the drive module 5 which drives movement of the control member 7 in accordance with the position values received from the trajectory generator 3. In this way, the drive module serves as a slave or follower to the trajectory generator 3, causing the control member to execute the movement commanded from the trajectory generator.

The commanded displacement, $\theta_c$, may be derived from any suitable source, including, for example, a force applied to the control member 7 or another control member, as will be described in more detail below, or from a computer or other controller as may be employed by an autopilot system to provide a visual cue to a pilot or operator via the control member of autopilot commands, or as may be employed in a simulator, or to directly or indirectly control a system, e.g. vehicle such as an aircraft.

Advantageously, the trajectory generator 3 allows the dynamic performance for the control member to be defined independently of the static performance for the control member so that the dynamic performance can be easily adapted depending, for example, on the required mechanical performance for the control member, to different applications, environments, or situations.

Figure 2A:
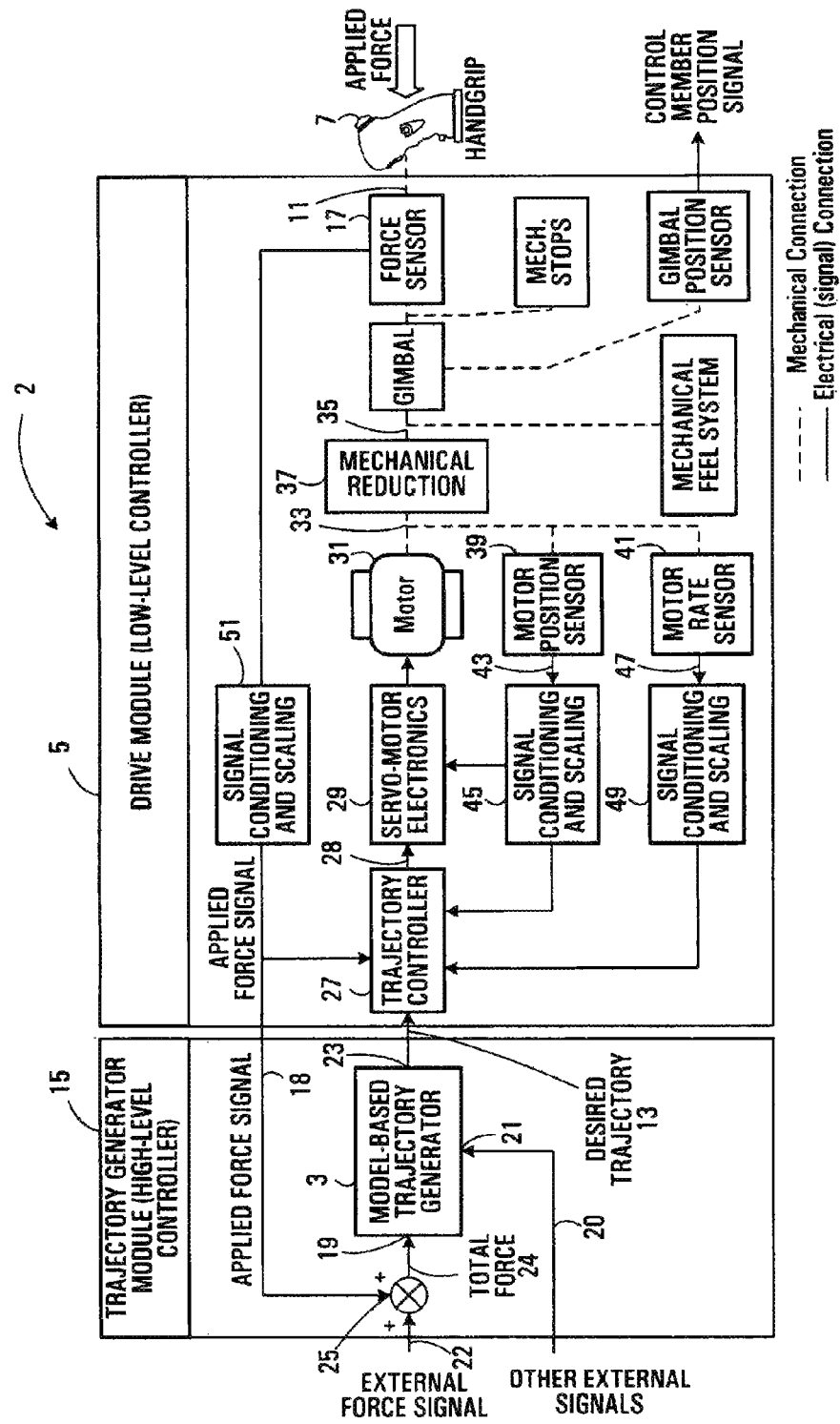
FIG. 2A shows a schematic diagram of an apparatus for controlling movement of a control member according to another embodiment of the present invention.

FIG. 2A shows another embodiment of a control apparatus in which an example of a drive module is shown in more detail. Referring to FIG. 2A, a control apparatus 2 comprises a trajectory generator module 15, which essentially serves as a high-level controller for controlling movement of a control member 7, and a drive module 5, which essentially serves as a low-level controller for driving movement of the control member 7 in response to a predetermined desired trajectory from the trajectory generator.

In this embodiment, the apparatus includes a force sensor 17 for sensing a force applied to the control member 7 and outputting a signal indicative of the magnitude of the applied force. The trajectory generator module 15 comprises a trajectory generator 3 having a first input 19 for receiving a force signal 24, a second input 21 for receiving other external signals and an output 23 for outputting a signal 13 prescribing the trajectory for the control member 7 to the drive module 5. The trajectory generator module 15 optionally includes a summer 25 for summing the applied force signal 18 from the force sensor 17 with an external force signal 22 and for passing the summed force signal to the first input 19 of the trajectory generator.

The drive module 5 comprises a trajectory controller 27, a drive signal generator 29 and a motor 31 which is coupled to drive the control member 7. The motor may include a rotary drive shaft, and the coupling 35 between the motor and the control member may include a mechanical reduction system 37 provided, for example, by appropriate gearing to reduce the angular displacement of the control member relative to the drive shaft by some appropriate predetermined factor.

The drive module 5 further includes a motor position sensor 39 for detecting the position of the motor output drive and a motor rate sensor 41 for detecting the rate or speed of the motor output drive. Alternatively, the rate may be determined by differentiating the displacement. The drive unit may also include an accelerometer (not shown) for detecting acceleration of the motor output drive. The motor position sensor 39 generates a signal 43 indicative of the position of the motor output drive which is optionally conditioned and/or scaled by a signal conditioner and/or sealer 45 and passes as an input to the motor signal generator 29 and the trajectory controller 27. Likewise, the motor rate sensor 41 outputs a signal 47 indicative of the motor rate which is optionally conditioned and/or scaled by an appropriate conditioner and/or sealer 49 and passed to the trajectory controller 27. If an accelerometer is also employed, the accelerometer outputs a signal indicative of motor acceleration, and the signal is passed to the trajectory controller 27 after any appropriate conditioning and/or scaling.

In this embodiment, the applied force signal 18 from the force sensor 17 is also applied as an input to the trajectory controller 27, and the drive module 5 may optionally include a signal conditioner and scaler 51 for conditioning (e.g. filtering) and/or scaling the applied force signal before being passed to the trajectory controller.

In operation, the trajectory generator 3 receives a force signal 24, which may comprise the applied force signal 18, an external force signal 22 or a combination of both. The trajectory generator then generates a desired trajectory signal 13 based on the force signal, and which defines the required movement or trajectory for the control member 7. Advantageously, and as described in detail below, the trajectory generator 3 may include first means for determining a commanded displacement, $\theta_c$, for the control member 7 from the force signal and second means for generating the desired trajectory signal 13 based on the commanded displacement. The first means may include means defining a relationship between force and commanded displacement and the second means may include a predetermined dynamic relationship between commanded displacement and actual movement for the control member as a function of time.

The trajectory controller 27 receives the desired trajectory signal 13 from the trajectory generator 3 and based on this signal generates a trajectory control signal which is used by subsequent components to cause the control member to follow the desired trajectory as defined by the trajectory generator. In one particularly advantageous embodiment, which is described in more detail below, the trajectory controller 27 is adapted to use the applied force signal to remove the influence of an applied force on the control member 7 which may otherwise cause the control member to move in a manner not strictly defined by the trajectory generator. This enables the control member to be controlled to move only in accordance with the desired trajectory determined by the trajectory generator. This may be achieved by including in the trajectory control signal a component which causes the motor to apply a force to the hand grip which is substantially equal to but in the opposite direction of the force applied to the control member by an operator.

Figure 2B:
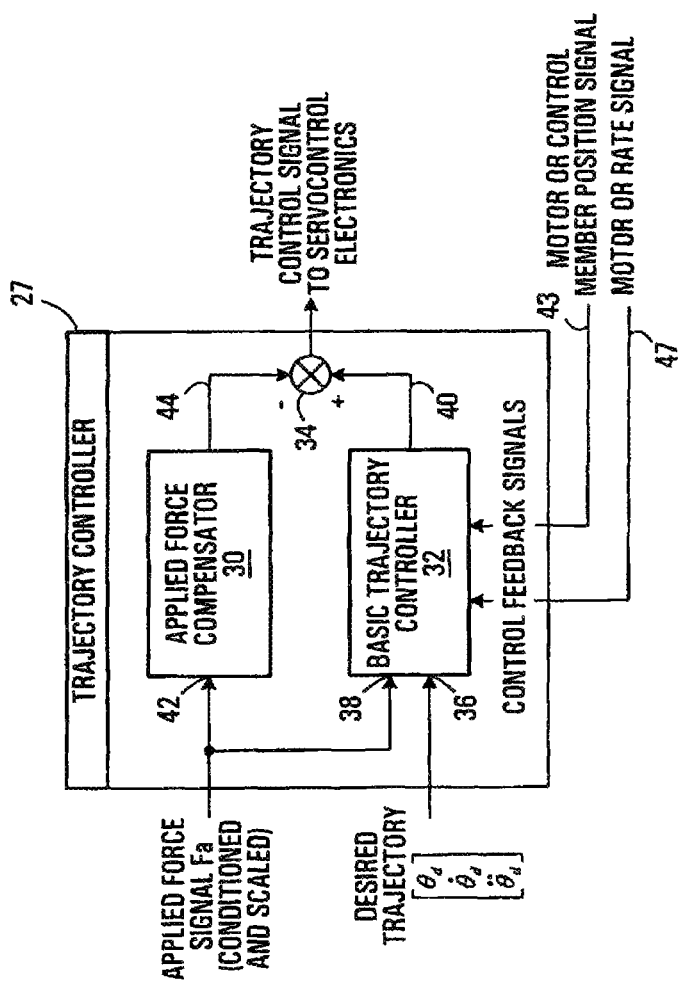
FIG. 2B shows a schematic diagram of a trajectory controller, according to an embodiment of the present invention.

FIG. 2B shows a schematic diagram of a trajectory controller, according to an embodiment of the present invention.

An example of an embodiment of a trajectory controller which is capable of compensating for errors between the actual trajectory and the desired trajectory caused by an operator force applied to the control member, is shown in FIG. 2B. The trajectory controller 27 comprises an applied force compensator 30, a basic trajectory controller 32 and a summer 34. The basic trajectory controller 32 may be adapted to receive control feedback signals, which may include a position signal indicative of the position of a drive motor, or of the position of a control member 43 and/or a signal 47 indicative of drive motor or control member rate. The basic trajectory controller 32 has an input 36 for receiving a desired trajectory signal as determined by a trajectory generator. The desired trajectory may include the desired position for the control member as a function of time. The desired trajectory may further include the desired rate, and this information may significantly improve the achievable trajectory tracking performance. It is to be noted that if the desired rate is not available directly, it can be obtained by numerical differentiation. A further improvement in tracking performance may be achieved by including in the desired trajectory, the desired acceleration. Again, if this is not directly available from the trajectory generator, the acceleration may be obtained by numerical differentiation of the desired rate or by double differentiation of the desired position. Numerical differentiation may introduce noise into the system, and additional compensation or filtering may be required. The basic trajectory controller 32 further includes another input 38 for receiving an applied force signal which may be conditioned and scaled. This signal may be used in various ways, including as a feed-forward into the control scheme, to improve the tracking performance and dynamics of the basic trajectory controller. In addition to motor or control member position and rate signals, a signal indicative of measured acceleration may also be provided to the basic trajectory controller 32 to improve tracking performance. It is to be noted that if rate or acceleration signals are not directly available from a sensor, they may be obtained by differentiation with compensation and/or filtering, as necessary. These feedback signals could be measured either on the motor or directly on the control member since there is a fixed relationship between the two. The basic trajectory controller provides a first control 40 to the summer 34.

The applied force compensator 30 has an input 42 for receiving an applied force signal $F_a$. The purpose of the applied force compensator is to compensate or remove the effect of the external force applied on a control member, for example by an operator, so that the low level controller (LLC) drives the control member accurately from the desired trajectory generated by the high level controller (HLC). The applied force compensator provides a second control signal 44 to the summer, the output of which constitutes the compensator trajectory control signal. The applied force compensator may provide additional signal compensation and/or filtering, for example to take account of undesirable characteristics of the interaction between the operator and control member, or of the unavoidable non-linearities and flexibility of members of the control member mechanism.

Figure 3:
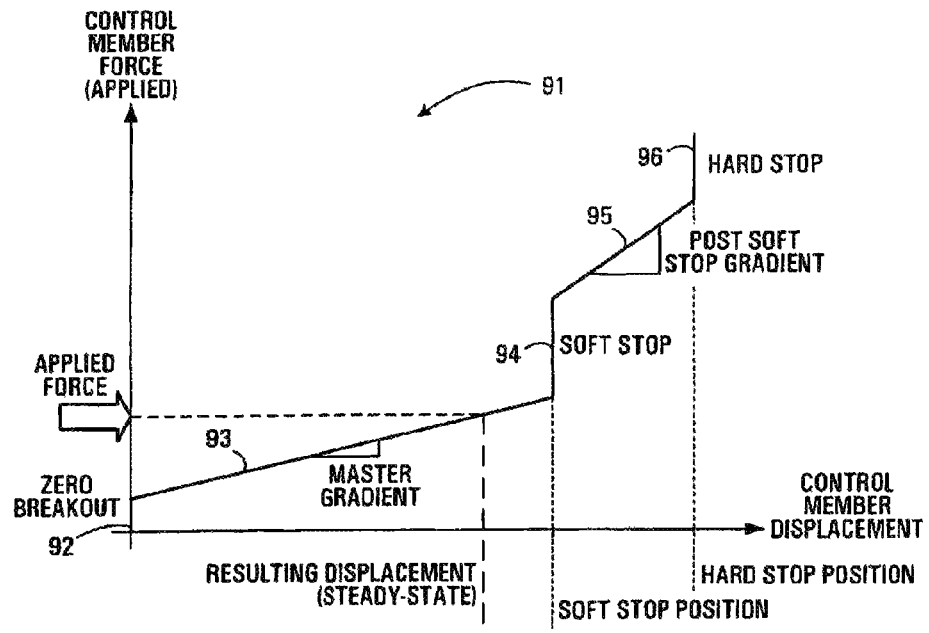
FIG. 3 shows a graph illustrating desired force vs displacement characteristics for a control member, which may be suitable in aerospace applications, and also shows a table containing sign conventions for control member displacement in the pitch and roll axis in aircraft applications.

The graph illustrated in FIG. 3 shows an example of the required relationship between the force applied to an aircraft hand controller (e.g. stick) and steady state hand controller displacement. This force versus displacement relationship may be referred to as the feel force profile and implements what is known as proprioceptive feedback, this feature being important for efficient control of a system with a hand controller. FIG. 3 also shows a table of displacement convention commonly used in the aircraft industry, and it is to be noted that the graph 91 shows only the positive displacement for a hand controller. The required feel force profile for the negative displacement may be similar or different, depending on the application.

The feel force profile includes a number of features including a zero breakout 92, a master gradient 93, a soft stop 94, a post-soft stop gradient 95 and a hard stop 96. The zero breakout 92 at zero displacement has a very steep or infinite gradient, requiring an operator to apply a finite force above a desired threshold level to move the hand controller from its zero position. The zero breakout or detent provides a tactile cue to inform an operator when the hand controller is in the zero or neutral position.

The master gradient 93 defines a linear relationship between the applied force and resulting, steady-state displacement such that the displacement increases with applied force. This ensures that the hand controller tends to return to the zero position in the absence of an applied force, for safety reasons, as may be implemented by a centering spring.

A soft stop 94 is provided at the end of the master gradient 93 and has a very steep or infinite gradient in which little or no displacement of the hand controller occurs over a predefined range of applied force. The soft stop may be used to provide another tactile cue to an operator that displacement of the hand controller is approaching its limit or the aircraft is approaching a limit of operation such as the boundary of the flight envelope.

The post-soft stop gradient 95 follows the soft stop 94 and is somewhat steeper than the master gradient to provide an operator with a tactile cue that the hand controller is beyond the soft stop position and the normal operating range defined by the extent of the master gradient.

Finally, the hard stop 96 has a steep or infinite gradient and prevents further displacement of the hand controller above a predetermined threshold level of applied force.

Figure 4:
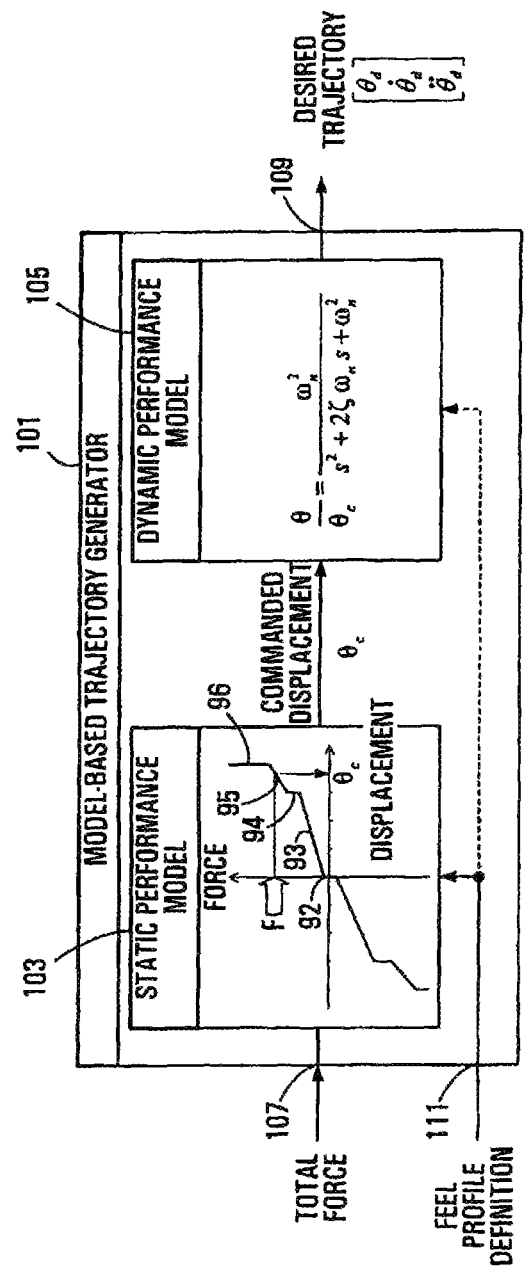
FIG. 4 shows a block diagram illustrating a trajectory generator, according to an embodiment of the present invention.

FIG. 4 illustrates an embodiment of a trajectory generator which is capable of implementing the required force feel profile, for example, a profile similar to that shown in FIG. 3. Referring to FIG. 4, the trajectory generator 101 comprises a static performance model 103 and a dynamic performance model 105. The static performance model defines the relationship between a force and the steady state displacement of a control member corresponding to that force for both positive and negative displacements, and has a profile similar to that shown in FIG. 3, and like features of the profile are designated by the same reference numerals. The trajectory generator 101 includes an input 107 for receiving the value of a force (for example which may be the force applied to the control member or some other force), and an output 109 for outputting a desired trajectory, e.g. the position for the control member as a function of time. The trajectory generator 101 invokes the static performance model 103 to determine the value of a steady state position (for a control member) from the value of force received at the input 107. The determined or commanded displacement $\theta_c$ is then used by the trajectory generator to determine the desired trajectory for the control member in accordance with the dynamic performance model. The dynamic performance model may have any number of states or form, which may include a simple second order spring-dash pot system because it is natural and intuitive and well understood. In this embodiment, the dynamic performance model defines a mechanical system having constant mass, damping or friction, and stiffness, and is defined in terms of a second order differential equation. The dynamic characteristics of the mechanical system are determined essentially by two parameters, the system natural frequency $\omega_n$ and the damping ratio, $\zeta$. The dynamic performance model enables the desired trajectory to be determined in terms of the desired position or displacement $\theta_d$ as a function of time, the desired velocity, $\dot{\theta}_d$ as a function of time and desired acceleration $\ddot{\theta}_d$ as a function of time and any one or more of these parameters may be used to control movement of the control member.

The provision of a trajectory generator having separate and independent static performance and dynamic performance models constitutes a significant departure from known arrangements and has substantial benefits. In particular, by separating the dynamic performance definition from the steady state definition for the control member, a zero breakout and other, non-zero breakouts or soft stops may be readily implemented without compromising the feel characteristics by requiring finite gradients and the need for position dependent damping to reduce oscillations in the breakout regions required by known systems. In the present system, a breakout may be defined as a region in which the displacement is substantially constant for a predetermined range of force. Accordingly, the commanded displacement $\theta_c$ can be determined unambiguously for any force input to the static performance model. For any input force that is in the range of forces defined for the breakout, the commanded displacement returned by the static performance model is a constant value and this will be reflected in the desired trajectory determined by the dynamic performance model. Another benefit of the present system is that the static performance model may be varied independently of the dynamic performance model and vice versa. Thus, for example, the steady state feel force profile may be varied alone without the need also to adjust the dynamic parameters such as mass damping ratio and natural frequency as defined within the dynamic performance. This allows the static feel force profile to be easily modified in real time according to system requirements, which may depend on such factors as the present operating characteristics such as speed, altitude or other factors of the system being controlled or the particular situation or environment to which the controlled system is exposed. In the embodiment shown in FIG. 4, the trajectory generator 101 further includes one or more inputs 111 which allows either one or both of the static performance model and dynamic performance model to be varied in accordance with external control signals.

Dynamic Performance Model

Figure 5:
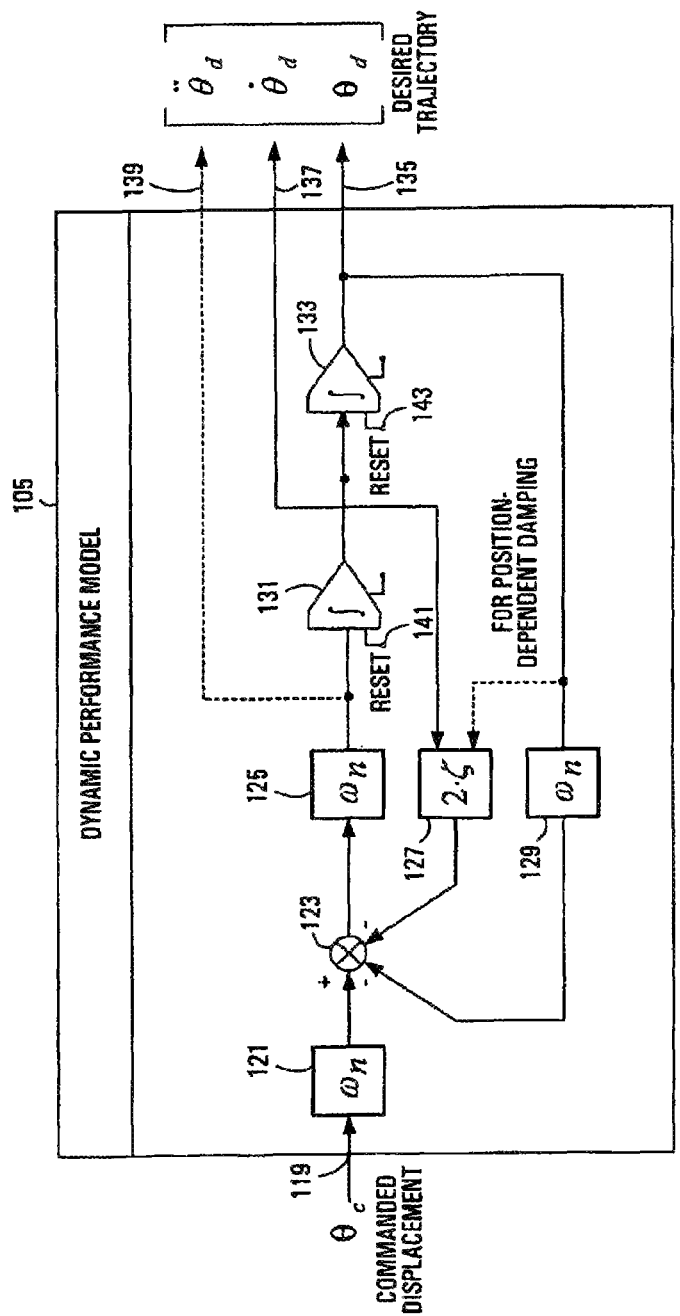
FIG. 5 shows a diagram of a dynamic performance model, according to an embodiment of the present invention.

FIG. 5 shows an embodiment of a dynamic performance model (DPM) which is capable of implementing a second order transfer function. Referring to FIG. 5, the DPM 105 comprises an input 119, a first multiplier 121, a summer 123, second, third and fourth multipliers 125, 127, 129, first and second integrators 131, 133, and first, second and third outputs 135, 137, 139.

The input 119 receives a commanded displacement "$\theta_c$", which is multiplied in the first multiplier 121 by "$\omega_n$" and the product is passed to the summer 123 for summation with the output of the third and fourth multipliers 127, 129. The output of the summer 123 is multiplied by "$\omega_n$" in the second multiplier 125 to provide the value of acceleration, "$\tilde{\theta}_d$", which is passed to the first integrator 131, and optionally passed to the third output 139 as a parameter defining the desired trajectory.

The output from the first integrator is the velocity "$\dot{\theta}_d$" and is multiplied by the coefficient "$2\zeta$" in the third multiplier 127, and the resulting product is summed in the summer 123 with the output from the first multiplier 121. The velocity, "$\dot{\theta}_d$", is also optionally passed to the second output 137 as a parameter defining the desired trajectory.

The velocity is passed to the second integrator 133, which determines the displacement "$\theta_d$". The displacement is multiplied by "$\omega_n$" in the fourth multiplier, and the resulting product is passed to the summer 123 for summation with the products from the first and third multipliers 121, 127. The value of the displacement "$\theta_d$" may also be output from the first output 135 as a parameter defining the desired trajectory.

Thus, this embodiment is capable of determining a consistent set of displacement, rate (velocity) and acceleration values as a function of time from a commanded displacement, and any one or more of these parameters may be used for defining the desired trajectory.

In this embodiment, each of the first and second integrators can be re-initialized for example, by applying a reset signal to a reset input 141, 143. The reinitialization values may be provided as default constants, or supplied to the DPM from an external source. This latter feature can serve to implement an automatic control scheme such as an autopilot back drive function, as described below. The integrators may include an anti-windup provision to limit their internal state to within a physically reasonable value, and to prevent system saturation.

In the present embodiment, the parameters that entirely characterize the dynamic response, "$\omega_n$" and "$\zeta$" are isolated from each other. The characterization parameters may be held constant, or modified, for example online from an externally supplied signal, or made internally dependent on any one or more of position (displacement), rate and acceleration.

Embodiments of the DPM may be analogue or digital, and the mathematical functions may be implemented in hardware or software or a combination of both. In a digital system, analogue-to-digital (A/D) and digital-to-analogue (D/A) converters may be provided for interfacing, as necessary.

Again, in a digital system, the update rate is preferably adapted to the desired bandwidth which may be, for example of 3 to 5 Hz so that a relatively low rate of about 100 Hz may be acceptable, but other considerations, such as the need to filter the force signal or minimize system time delays may require higher rates.

In other embodiments, the DPM may be implemented in a computer, such as a flight control computer, and, advantageously, this may allow redundancy and dissimilarity to be provided at little or no additional cost.

In one embodiment of the present invention, the Static Performance Model determines the steady-state displacement corresponding to the total force applied to a control member, this displacement may then drive a second-order model to generate the desired trajectory. Together, the Model-Based Trajectory Generator simulates the response of the desired control member model subject to the measured applied force. By arranging the LLC to accurately track this trajectory, an operator experiences a feel corresponding to the system being modeled in the Model-Based Trajectory Generator of the HLC.

Figure 6:
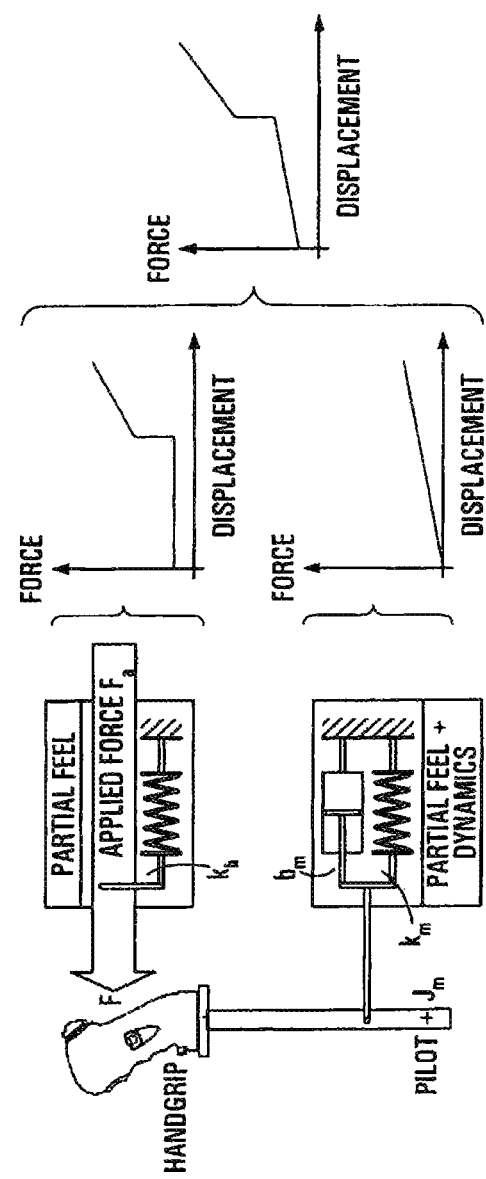
FIG. 6 is a schematic diagram illustrating a mechanical equivalent of a model that may be used to generate simulated feel for a control member, according to an embodiment of the present invention.

This may be better understood by considering a mechanical equivalent to an embodiment of the Model-Based Trajectory Generator. An embodiment of the Model-Based Trajectory Generator having an essentially independent Static Performance Model and Dynamic Performance Model is illustrated in FIG. 6. In this example, the Dynamic Performance Model simulates a simple control member with inertia $J_m$, damping coefficient $b_m$, and stiffness $k_m$. When left to itself, or when subject to a force, it will respond as a second-order system with natural frequency $$\omega_n = \sqrt{\frac{k_m}{J_m}}$$

and damping ratio $\zeta$ such that $$2 \cdot \zeta \cdot \omega_n = \frac{b_m}{J_m}.$$

The Static Dynamic Model is equivalent to an operator generating a force which partially fights a feel system attached to his hand and not to the control member, and partially fights the feel system attached to the control member. As a result, the operator will feel the combined force of the two systems which may, for example, correspond to the feel force profile of FIG. 3. However, only a fraction of this force is effectively applied to move the control member. Once the operator releases the control member, only the feel of the control member will determine its subsequent motion. Because the discontinuities are included in the feel attached to the hand and not to the feel system attached to the control member itself, the resulting motion is smooth.

Figure 7:
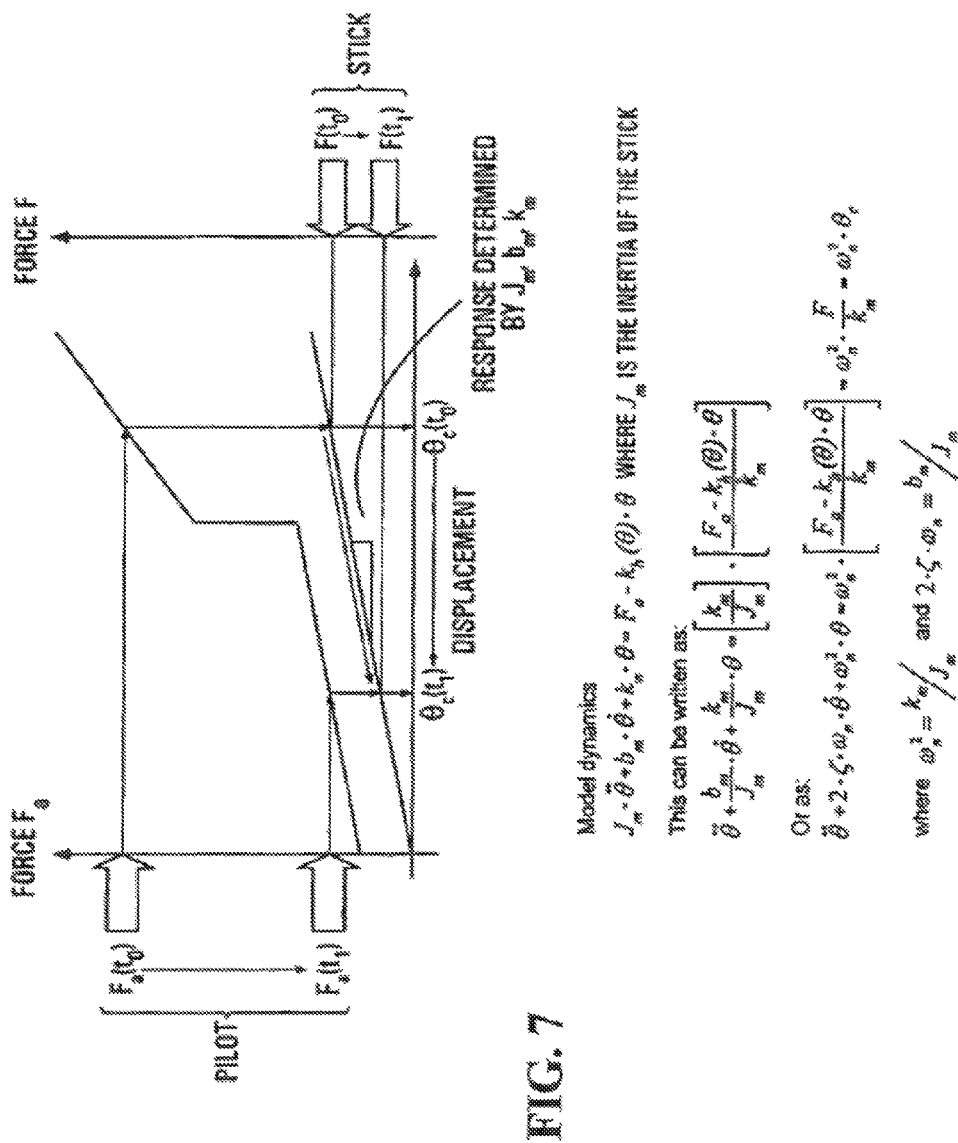
FIG. 7 shows a physical interpretation of a trajectory generator according to an embodiment of the present invention.

This can be further illustrated with FIG. 7. At time $t_0$, the control member is at a steady-state displacement $\theta_c(t_0)$ corresponding to an operator applied force $F_a(t_0)$ according to the feel force profile. The effective force applied to the control member is $F(t_0)$ as part of the operator force is effectively applied to the feel system attached to his hand; this can be shown on the right-hand-side of the figure. At time $t_1$ the operator reduces the amount of applied force to a value $F_a(t_1)$ corresponding to a steady-state displacement $\theta_c(t_1)$; however, the system only experiences an applied force $F(t_1)$. As a result, the system will move to its new equilibrium displacement $\theta_c(t_1)$ according to its own dynamics which is only a function of its inertia, damping, and stiffness, and completely independent from the feel system attached to the hand of the operator. If the force applied by the operator is changed gradually, the operator will feel the system with all of its non-linearities.

However, if the operator changes the force rapidly relative to the time response of the control member, for example by quickly increasing his applied force from a value of $F_a(t_1)$ to $F_a(t_0)$, the feel of the soft stop will be affected. One of the reasons for this is that the system response at all positions will be determined by the constant stiffness $k_m$, although the dynamics would in this case be better represented with the post soft stop stiffness once the soft stop position is achieved. From FIG. 6 and FIG. 7, it can also be seen that the force supplied by (virtual) spring $k_h$ is taken to correspond to the steady-state value of displacement instead of the current displacement; this approximation degrades with the rate of variation of the applied force. Depending on the application, this problem can be easily resolved by adjusting the control member natural frequency to correspond to the proper value of the post soft stop stiffness as a function of position, as described previously, or in moving the implementation of the soft stop and post soft stop gradient to the Dynamic Performance Model. In fact, as indicated before, the Dynamic Performance Model can be tailored to the application; it is a convenient and advantageous feature of an embodiment of the invention to be able to independently specify the static feel and the dynamic response of the control member.

Autopilot Backdrive

Embodiments of the present invention may be adapted to allow the control member to be driven by an automatic control system, such as an autopilot, which may automatically control the system being controlled in place of operator control through the control member. The automatic control system may drive movement of the control member to provide to an operator through tactile and visual cues awareness of what the automatic control system is actually doing. Examples of embodiments of the present invention which allow a control member to be back driven by an automatic control system are shown in FIGS. 8 and 9A.

Figure 8:
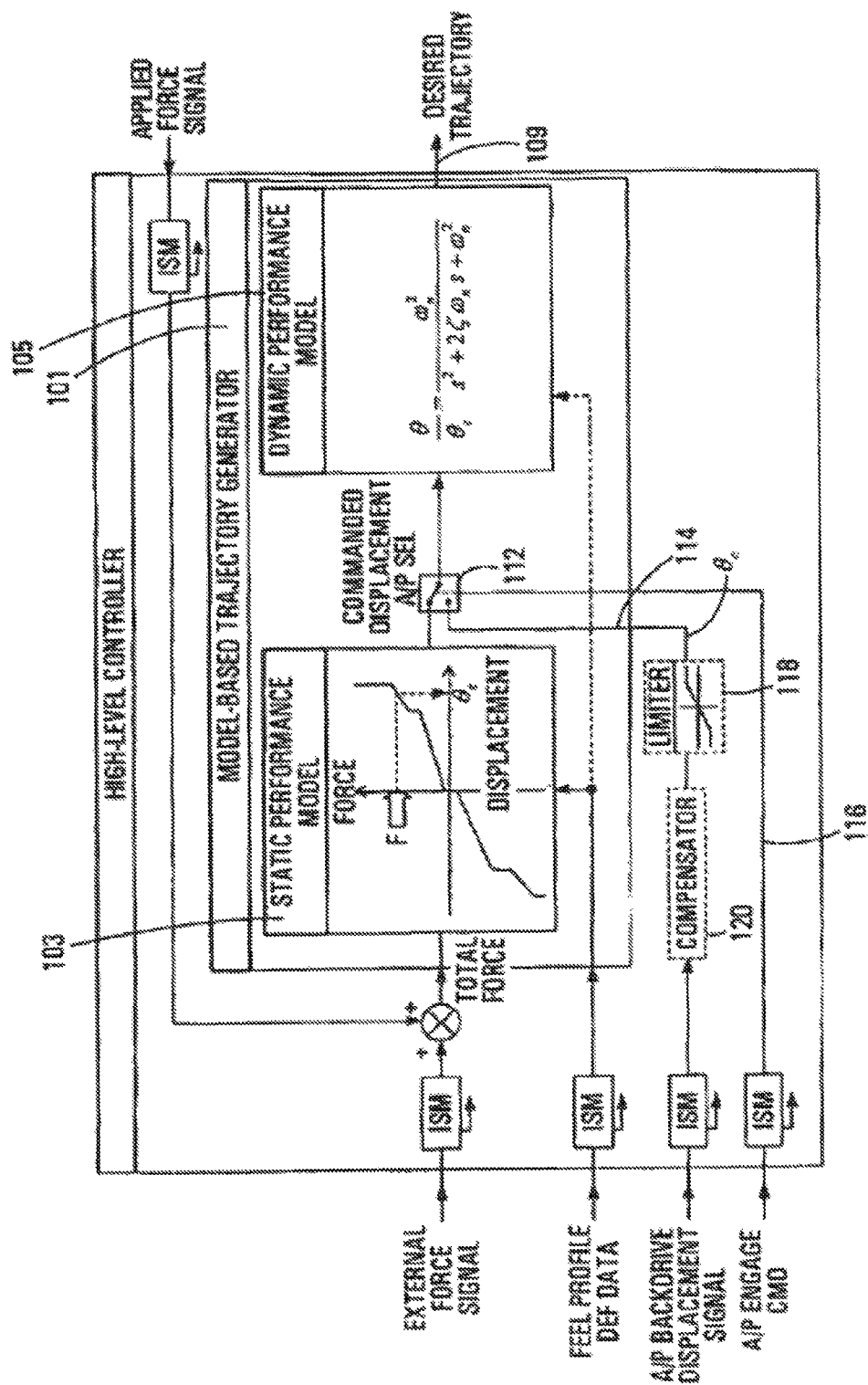
FIG. 8 shows a block diagram of a trajectory generator according to an embodiment of the present invention.

FIG. 8 shows an embodiment of a trajectory generator 101 comprising a static performance model 103 and a dynamic performance model 105, which may be similar to those shown in FIG. 4. The trajectory generator includes a selector switch 112 for selectively switching as the input signal to the dynamic performance model 105 one of the commanded displacement $\theta_c$ determined by the static performance model 103, or the commanded displacement 114 provided by an automatic control system, and the state of the switch is controlled by a control signal 116. A limiter 118 may be provided to limit the displacement of the control member so that, for example, it is prevented from hitting hard stops, and to prevent saturation of integrators that may be used in the dynamic performance model 105. A compensator 120 may be provided to compensate, at least partially for any time delay that may occur in the dynamic performance model 105, or to smooth out or interpolate the commanded displacement signal from the automatic control system which may have a relatively low sampling rate, for example of the order of 10 Hz in comparison to the dynamic performance model 105.

Figure 9A:
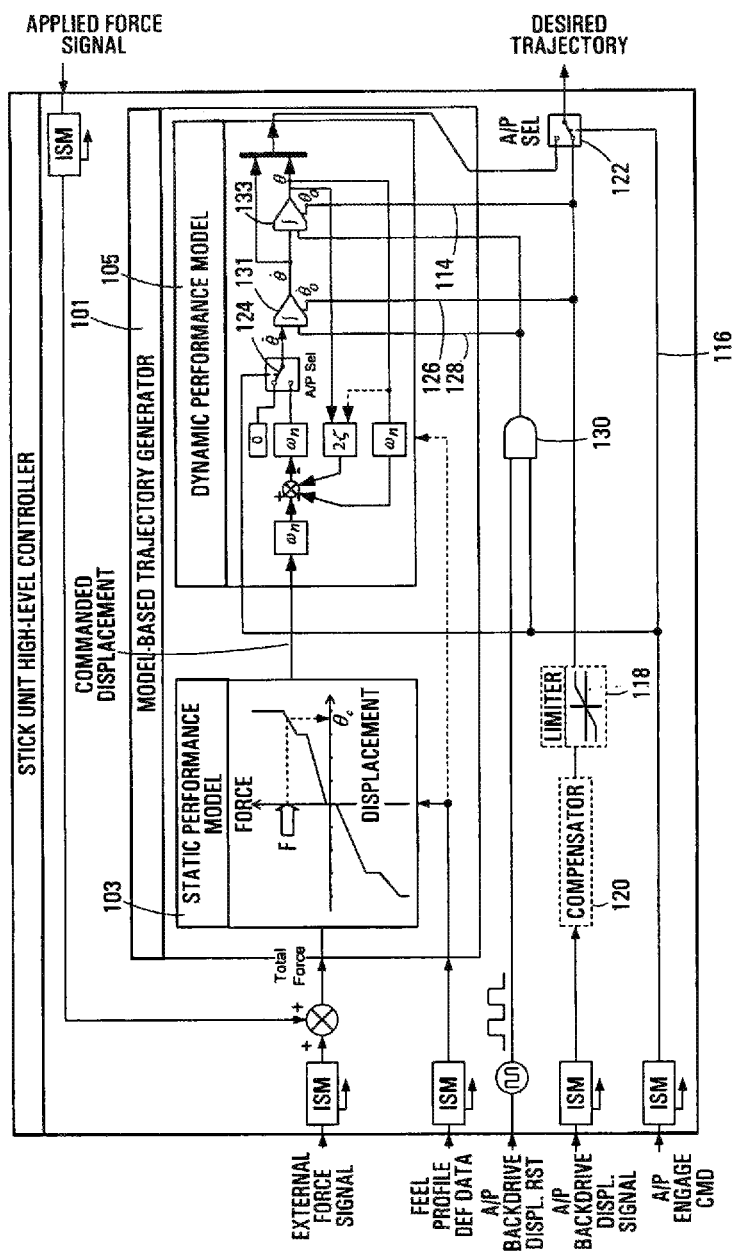
FIG. 9A shows another embodiment of a trajectory generator.

FIG. 9A shows another embodiment of a high-level controller in which the backdrive signal from the automatic control system constitutes the desired trajectory which is passed directly to the drive controller (i.e. low-level controller) which drives motion of the control member. As for the embodiment shown in FIG. 8, the high-level controller includes a trajectory generator 101 having a static performance model 103 and a dynamic performance model 105. In this embodiment, the dynamic performance model 105 is similar to that shown in FIG. 5, and like parts are designated by the same reference numerals. The high level controller has a selector switch 122 for selectively outputting the desired trajectory determined by the dynamic performance model 105 which is applied to one input of the switch and a backdrive displacement control signal from an automatic control system which may be applied to a second input of the switch 122. As for the embodiment of FIG. 8, a limiter 118 may be provided to limit the backdrive displacement signal, thereby limiting displacement of the control member, and a compensator may be provided to smooth out or interpolate the backdrive displacement signal. A differentiator may be provided to obtain the corresponding displacement rate by differentiating the displacement signal, and the rate signal may also be provided with the displacement as the desired trajectory. Advantageously, the high-level controller may be arranged so that the desired trajectory determined by the dynamic performance model 105 closely follows the desired trajectory from the automatic control system when the control system is enabled to ensure a smooth transition (i.e. no substantial or sudden movement of the control member) when control of the movement of the control member is passed from the automatic control system to an operator. In this embodiment, this function is implemented by resetting the integrators 131, 133 (to zero) by means of a selector switch 124 in response to an autopilot engage command signal 116, and feeding the backdrive displacement rate signal 126 to the first integrator 131 and feeding the backdrive displacement signal 114 to the second integrator 133. Resetting of the integrators may be controlled by a reset control signal 128, and this may be generated by the automatic control system. Logic 130, for example AND gate may be provided to ensure that the integrators are only reset if the autopilot engage command signal 116 is set.

If necessary, a blending algorithm could be used to smooth the transition between manual and autopilot and backdrive modes, especially if engagement or disengagement of the autopilot occurs while the control member is free. This may not be required if autopilot backdrive displacement are normally of small amplitude and small dynamics, and an operator would probably take over the control member at its current displacement. Examples of autopilot backdrive fade-in/fade-out are described below. The autopilot backdrive implementation may be either analog or digital, for example.

In the latter case analog to digital converters and digital to analog converters, signal conditioners and anti-aliasing filters may be added.

Autopilot Backdrive Force Override

Figure 9B:
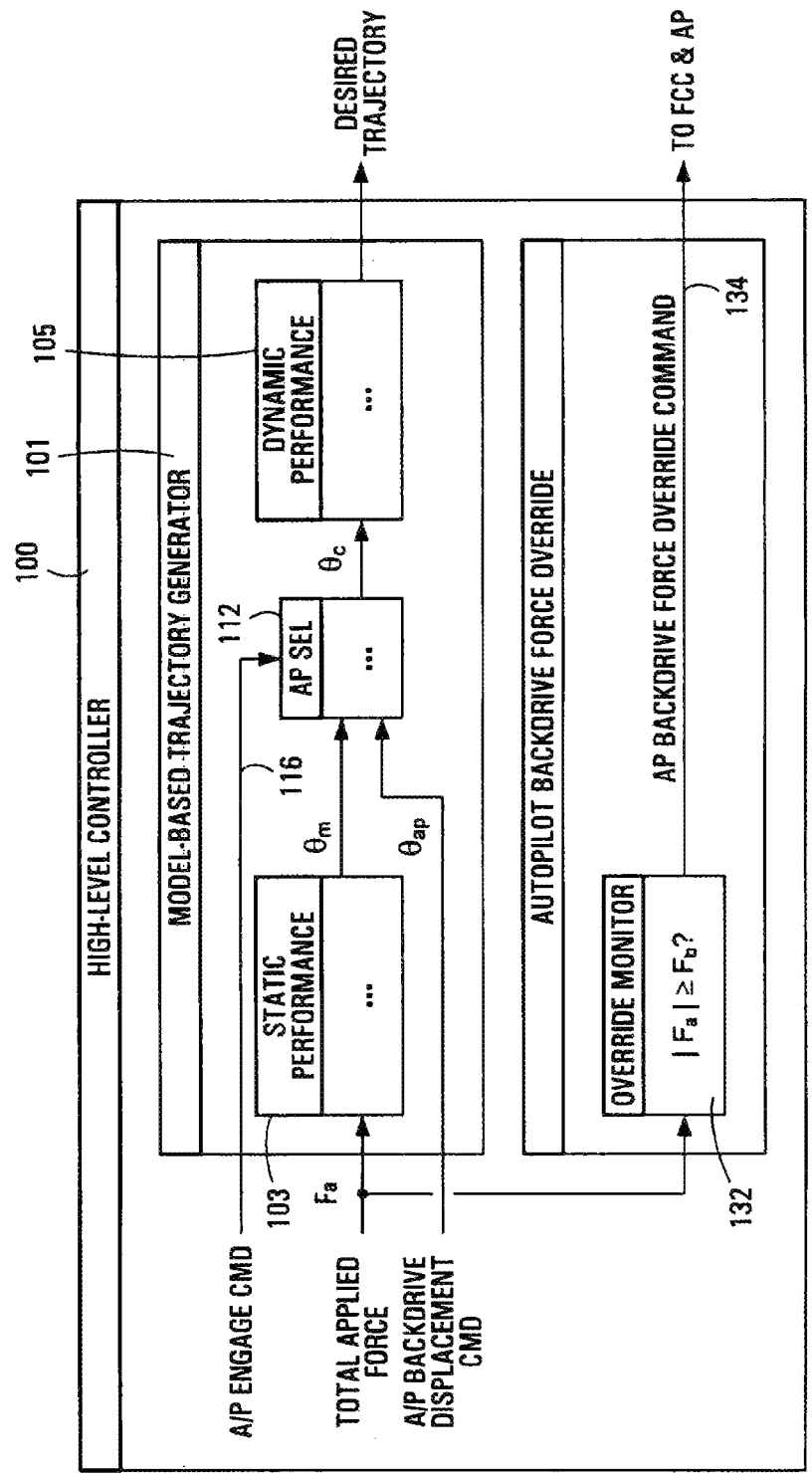
FIG. 9B shows a trajectory generator and associated components, according to another embodiment of the present invention.

Embodiments of the present invention in which the control member may be back driven by an automatic control system may be adapted to disengage the backdrive signal from controlling motion of the control member in response to a force applied to the control member by an operator. This capability will be referred to as autopilot backdrive force override. An embodiment of the present invention which is capable of implementing this function is shown in FIG. 9B. Referring to FIG. 9B, a high level controller 100 comprises a trajectory generator 101 having a static performance model 103, a dynamic performance model 105, a selector switch 112 and a monitor 132. The static performance model 103 and the monitor 132 each have an input for receiving an applied force signal which may be indicative of the force applied to a control member or a plurality of control members in a coupled system, together with any additional force cues, and the value of the force signal may be dependent on the direction of the force applied to a control member. The static performance model determines a commanded displacement $\theta_m$ based on the total applied force $F_a$, which is passed to an input of the selector switch 112. The second input of the selector switch is connected for receiving an autopilot backdrive displacement command $\theta_{ap}$, and the switch 112 selects the autopilot displacement command $\theta_{ap}$ as the commanded displacement for the dynamic performance model 105 if the autopilot engage command control signal 116 is set. The monitor 132 is adapted to compare the magnitude of the applied force $F_a$ with a predetermined value $F_b$, and if the total applied force $F_a$ is greater than or equal to $F_b$, the monitor generates a signal indicative of this condition, which may be passed to a control system such as a flight control computer which may use the signal to decide whether or not to disengage the autopilot. The override monitor 132 may equally be applied to the embodiment of FIG. 9A, as well as other embodiments. The override monitor may include different (asymmetric) thresholds, depending on whether the applied force is in the positive or negative direction, and/or may be adapted only to generate an autopilot backdrive force override command 134 if the applied force exceeds the predetermined threshold for some predefined length of time.

Figure 9C:
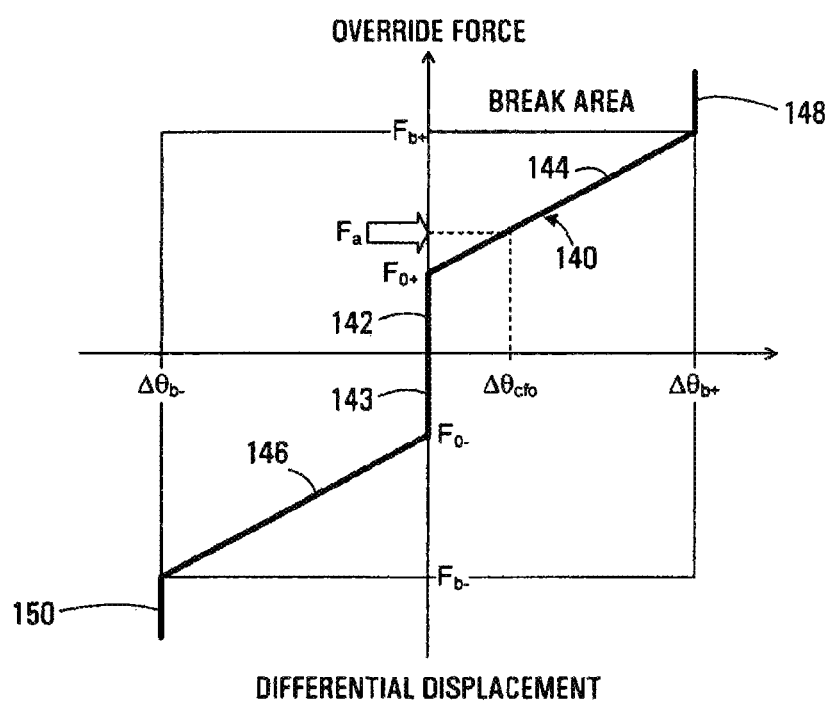
FIG. 9C shows a graph illustrating the relationship between force and differential displacement, which may be implemented by embodiments of the present invention.

In another embodiment of the present invention, an artificial compliance may be implemented into the displacement of the control member, in which a force applied to the control member which opposes the force applied by the autopilot results in a differential displacement or displacement error of the control member relative to the backdrive commanded displacement. An example of the characteristics for an artificial compliance is illustrated in the graph of FIG. 9C which shows the relationship between the applied force $F_a$ and differential displacement for both positive and negative directions. The autopilot backdrive force override profile 140 may include a zero breakout 142, 143 in one or both directions, the force threshold for which may either have the same or different values. The zero breakout is the minimum force applied to the control member before a differential displacement takes place. Immediately beyond the breakout threshold, the force versus differential displacement may have a proportional relationship in one or both directions as shown by the linear gradient 144, 146, which may either be symmetric or asymmetric. The profile includes a maximum differential displacement $\Delta \theta_b$, in both directions which starts at a break force $F_b$. When the applied force exceeds the break force, or when the control member differential displacement reaches the maximum (i.e. break) displacement, an autopilot backdrive force override command signal is generated, which may be passed to an actuator controller such as a flight control computer.

Figure 9D:
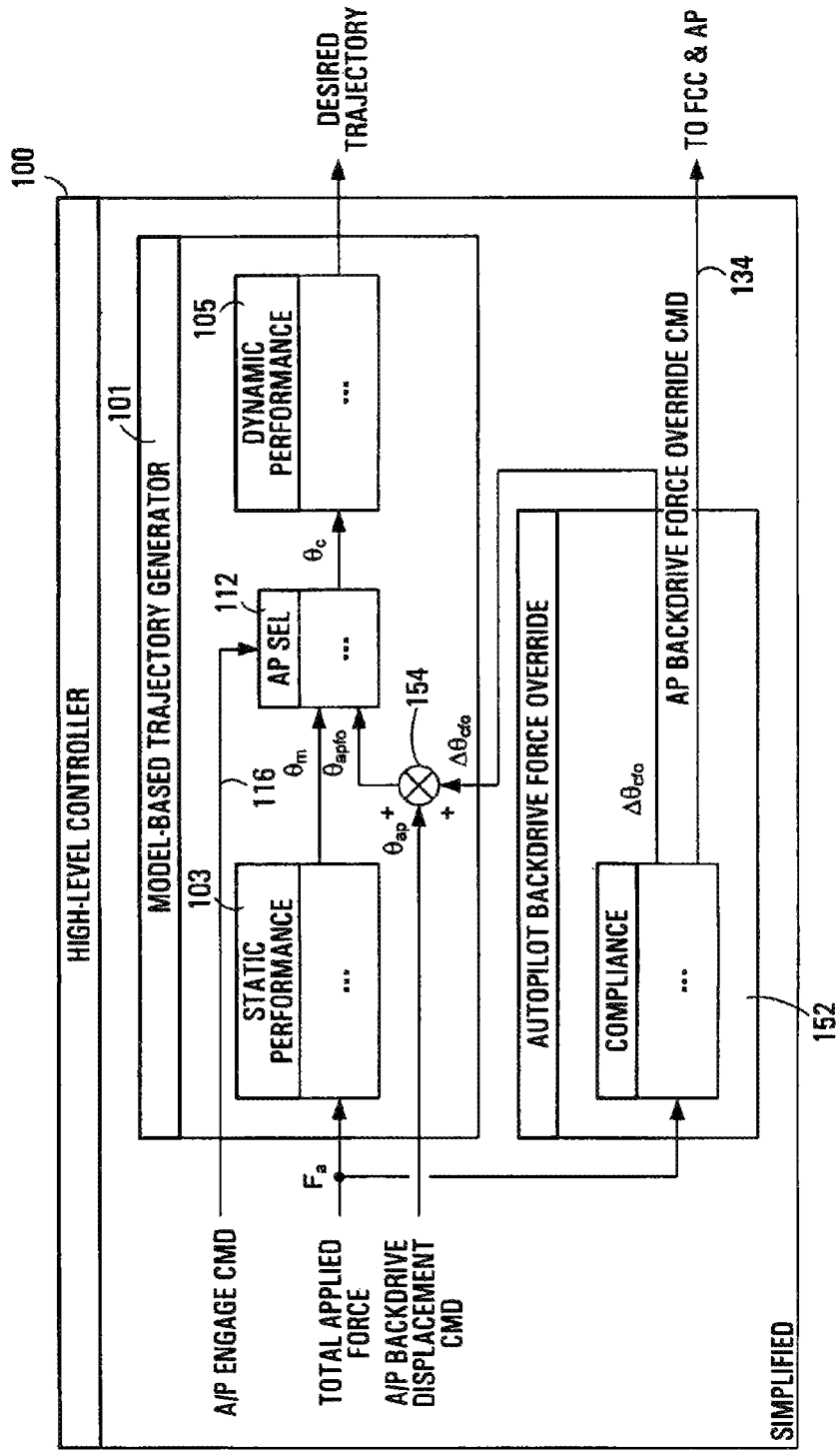
FIG. 9D shows a trajectory generator and associated components according to another embodiment of the present invention.
Figure 9E:
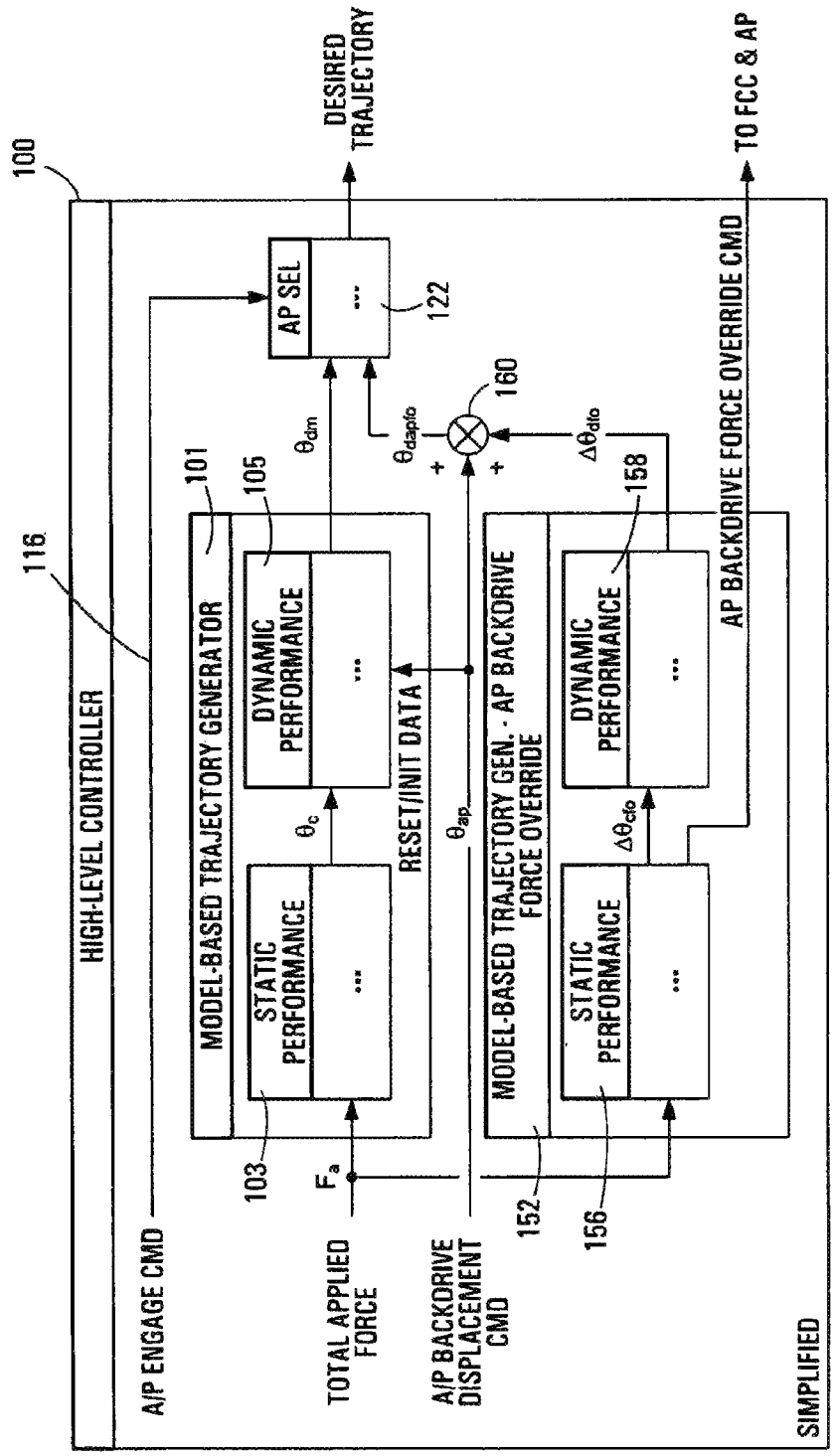
FIG. 9E shows a trajectory generator and associated components, according to another embodiment of the present invention.

An embodiment of the present invention which is capable of implementing an excursion or differential displacement of a control member relative to a backdrive commanded displacement is shown in FIGS. 9D and 9E. The embodiment of FIG. 9D is similar to that shown in FIG. 9B, and like parts are designated by the same reference numerals. This embodiment includes a compliance controller 152 which is adapted to monitor the applied force and determine a value of differential displacement for the control member based on the applied force, and the differential displacement may be determined for example in accordance with the profile shown in FIG. 9C, or in accordance with another profile. A summer 154 is provided to add a differential displacement $\Delta \theta_{cfo}$ generated by the compliance element 152 to the autopilot backdrive displacement command, the sum being passed to the dynamic performance model as the commanded displacement if the autopilot is engaged. FIG. 9E shows another embodiment of the present invention capable of providing an artificial compliance to a control member, in which the autopilot backdrive displacement command is provided as the desired trajectory, as in the case of the embodiment shown in FIG. 9A, and like parts are designated by the same reference numerals. In this embodiment, the compliance element 152 includes a compliance model for determining a desired differential trajectory based on the applied force Fa. The compliance model may include a static performance model 156 for generating a commanded differential displacement $\Delta \theta_{cfo}$ and a dynamic performance model 158 for generating a desired differential trajectory (e.g. differential displacement as a function of time and/or higher order derivatives such as rate and/or acceleration) from the commanded differential displacement. A summer 160 is provided to add the desired differential trajectory to the autopilot displacement command $\theta_{ap}$ and the resulting signal constitutes the desired trajectory for controlling movement of the control member if the autopilot is engaged. When the autopilot is engaged, integrator(s) within the dynamic performance model 105 may be reset and updated in a similar manner to the embodiment described above in conjunction with FIG. 9A. In one embodiment, the compliance model may be modified if necessary. For example, the override force versus differential displacement may be adjusted as a function of the operation of the system being controlled, and in the case of an aircraft, the differential displacement may be varied as a function of flight phase (autopilot in cruise, autoland) or turbulence level. If a dynamic model is used, and transitions between various models are implemented, the models to be executed should be properly controlled, reset and initialized.

In the embodiment shown in FIGS. 8 and 9A, a simple switch may be used to select and switch between the operator applied signal and the backdrive signal. In another embodiment, the switch may be replaced by a fader whose function is to gradually switch between the two extreme positions and therefore provide a smoother transition between the operator and automatic control modes.

Figure 9F:
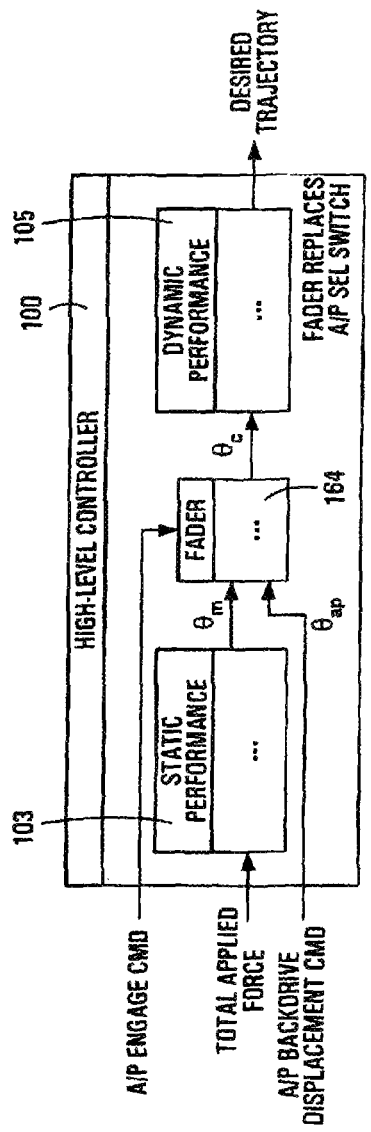
FIG. 9F shows a diagram of a trajectory generator according to an embodiment of the present invention.
Figure 9G:
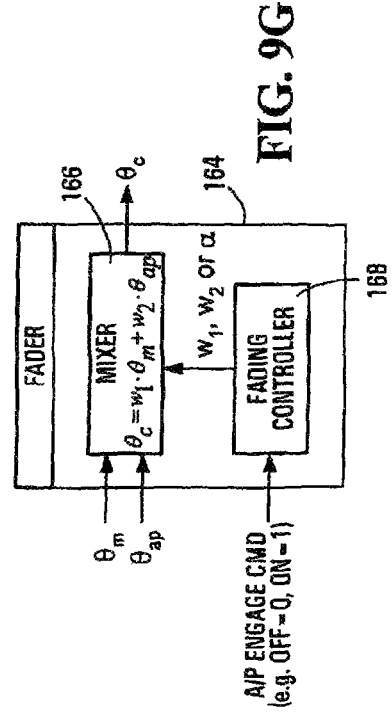
FIG. 9G shows an embodiment of a fader which may be used in the embodiment of FIG. 9F.

FIG. 9F shows a schematic diagram of a high level controller 100 having a fader 164 between the static performance model 103 and dynamic performance model 105 for gradually switching between an autopilot backdrive displacement command and an operator displacement command from the static performance model. An embodiment of a fader is shown in more detail in FIG. 9G. Referring to FIG. 9G, the fader 164 may be divided functionally into a mixer 166 and fading controller 168. The mixer performs a weighted sum of the two input signals, one of which is the steady-state displacement $\theta_m$ of the control member corresponding to the output of the static performance model driven with total applied force, and the other being the autopilot backdrive displacement command $\theta_{ap}$, to provide the commanded displacement $\theta_c$ such that:

$$\theta_c = W_1 \cdot \theta_m + W_2 \cdot \theta_{ap}$$

where $W_1$ and $W_2$ are weighting factors. In one example, a smooth transition may be implemented by smoothly changing the weighting factors $W_1$ and $W_2$ in time between zero and one. Weighting factors may also be controlled such that when the weighting factor $W_1$ equals zero, $W_2$ equals 1, and vice versa. In one embodiment, this condition may be satisfied by making both weighting factors dependent on a single fading parameter $\alpha_f$ such as:

$$W_1 = (1-\alpha_f) \text{ and } W_2 = \alpha_f$$

where $\alpha_f$ takes a value between zero and one. These definitions are such that the sum of the two weighting factors is always equal to unity, and hence guarantees that when a weighting factor is zero, the other weighting factor is one and vice versa. It will be appreciated that other choices exist that would preserve this latter condition.

Figure 9H:
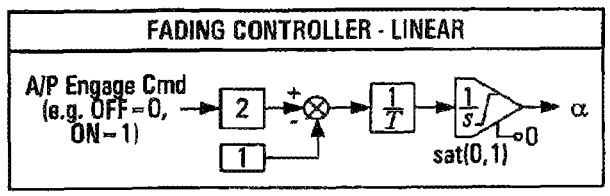
FIGS. 9H, 9I and 9J each show a diagram of embodiments of a fading controller and their respective functions, according to embodiments of the present invention.
Figure 9I:
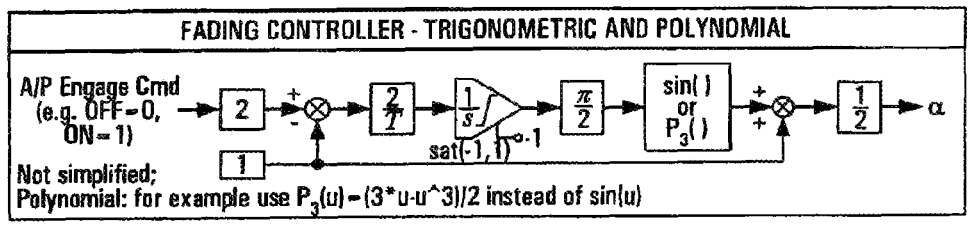
Figure 9J:
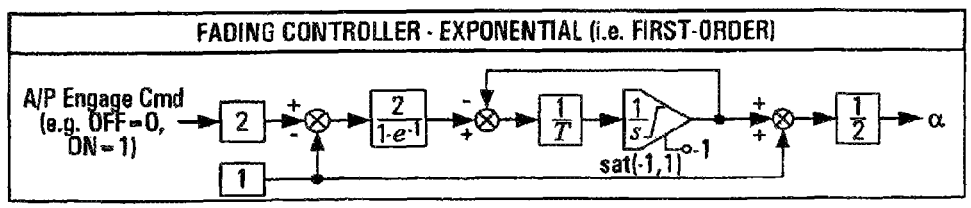

The fading controller 168 may be arranged to smoothly change the weight factors used by the mixer 166 as a function of time by, for example changing a single parameter, $\alpha_f$. The value of this parameter depends on the autopiloting engage command which may have only two values, for example one for engagement and zero otherwise. In the above example, to achieve a smooth transition between operator control and automatic control and automatic control modes, the fading controller smoothly changes the value of $\alpha$ between zero and one to change from operator control to automatic control and between one and zero to change from automatic control to operator control. Thus, a trajectory is generated for the weighting factors according to some dynamics which is analogous to the function of the dynamic performance model. An example of a linear fading controller, a trigonometric and polynomial fading controller and exponential (i.e., first-order) fading controller are shown in FIGS. 9H, 9I and 9J, respectively. In each fading controller shown in FIGS. 9H to 9J, the autopiloting engage command is firstly mapped from the discrete set of values (0, 1) to (−1, +1), and this is shown in all of the examples by multiplying the autopilot engage command by two and then subtracting 1 from the result. A dynamic model is then implemented to smoothly and continuously change the associated state between ±1. Finally, the status is converted back into a fading parameter taking a value between zero and one, this being achieved by adding one to the state and then dividing by two.

A desirable characteristic of the dynamic mode is its symmetry with respect to time reversal, i.e. the fading parameter trajectory is the same whether its leaves or arrives at the end point. This behavior is guaranteed by arranging the dynamic model as an odd function of time i.e. $F(-T)=F(T)$. This characteristic is present in the linear and trigonometric and polynomial examples shown in FIGS. 9H and 9I, but is not demonstrated by the first order fading controller shown in FIG. 9J.

In the first-order fading controller, the end points are only attained asymptotically and therefore in theory an infinite amount of time is required to achieve the final value of zero or one. This problem may be solved in the examples by additional scaling of the input signal, and by saturation of the integrated state. In the case of higher order dynamic models, such as the dynamic performance model, which may comprise a second-order model over shoots above and below the end value should be avoided, and this may be achieved by a specifying critical damping.

Fading controller of the polynomial type can be chosen to be symmetrical with respect to time; only odd power terms need be retained. Advantageously, polynomial based fading controllers are computationally efficient and by carefully selecting the value of the various polynomial coefficients, the shape of the fading parameter trajectory can be customized. For example, a third order polynomial would be of the form $p_3(x)=(c_1+c_2 \cdot x^2) \cdot x$. The end point condition $p_3(\pm 1)=\pm 1$ determines one coefficient. The second coefficient can be determined, for example by specifying the slope at the end point, or at the mid transition point. If the end point slope is specified to be zero, as is the case for the trigonometric example, then $c_1=3/2$ and $c_2=-1/2$. In this example, this polynomial provides a trajectory that is very close to the trigonometric case and yet is significantly more computational efficient.

As discussed above, the Autopilot Backdrive Force Override is the capability of the pilot to disengage the autopilot by applying force on the stick to oppose the commanded Autopilot Backdrive displacement. This function can be easily implemented by monitoring the force applied by the pilot on the stick, and if this force exceeds a pre-determined threshold, then the stick unit can send a message to the Flight Control Computer indicating that a force override condition exists. The Flight Control Computer would then disengage the autopilot and send a signal back to the stick unit to disable the Autopilot Backdrive. Note that the decision of disengaging the autopilot is and should be taken by the Flight Control Computer. This is shown in FIG. 9A for the case where the Autopilot Backdrive displacement would be used as a command to the Dynamic Performance Model of the Model-Based Trajectory Generator (FIG. 8). The scheme applies equally to the scheme illustrated in FIG. 9. Note that the drawing in FIG. 9A has been simplified for clarity. For example, additional filtering and compensation of the applied force signal may be needed. Moreover, the Override Monitor assumes that autopilot disengagement is commanded if the currently applied force exceeds a pre-determined threshold. Other schemes are possible; for example, they may involve asymmetric thresholds in the positive and negative directions, and/or some persistence in the applied force exceeding the relevant threshold. These modifications to the basic embodiment do not change its basic principle.

As mentioned above, it is possible to further implement some artificial compliance into the stick displacement; i.e. the applied force by the pilot opposing the autopilot backdrive stick motion would result in a stick displacement error relative to the backdrive command. The preferred characteristics of this error as a function of the opposing force, and its implementation is shown in FIG. 9C; it is similar to the Cross-Coupling Force Override function described below. The Autopilot Backdrive Force Override profile can be asymmetric in the positive and negative direction. It may include an optional zero breakout, that is, a minimum force would need to be applied before a resulting stick differential displacement would take place. The maximum differential displacement is limited to a so-called break value corresponding to a break force. When the applied force goes beyond the break force, or when the stick differential displacement reaches the break displacement, an Autopilot Backdrive Force Override Command signal is generated for the FCC (and possibly the Autopilot system). Normally, the decision to disconnect the Autopilot would remain with the FCC however.

To implement the corresponding compliance, a perturbation trajectory proportional to the opposing force would simply be added to the desired trajectory commanded by the autopilot before being transmitted to the stick unit low-level controller. FIG. 9D presents a preferred embodiment for the Autopilot Backdrive option described in FIG. 8. The Compliance block would implement the criterion for generating the Autopilot Backdrive Force Override Command, and computation of the differential displacement as per FIG. 9C.

A preferred embodiment for the Autopilot Backdrive option described in FIG. 9D is presented in FIG. 9E. In this case, the Autopilot Backdrive trajectory specifies the displacement of the stick and is sent directly to the Low-Level Controller. The Autopilot Backdrive Force Override is specified in detail through a compliance model. As for the Model-Based Trajectory Generator, the compliance characteristics can be separated into independent static and dynamic performance models. These models can also be specified independently of the trajectory generation and cross-coupling force override functions. They can also be modified online if necessary; for example, the override force vs differential displacement could be adjusted as a function of flight phase (autopilot in cruise, autoland), or turbulence level. If dynamic models are used, and transitions between various models are implemented, then it is important to properly control, reset and initialize the model to be executed based on the current state. This is not explicitly shown in the figures, but an implementation similar to that outlined in FIG. 9 can be used.

In the above, only a limited number of possible embodiments of the invention have been presented. Moreover, not all details are shown. However, it should be easy to complete the implementation based on the description of the other features provided herein, or to derive other variations of embodiments of the invention to suit a particular problem without requiring much additional development.

Variable Feel

Variable Feel is the capability of changing the feel experienced by the pilot as a function of the state of the system being controlled. In one embodiment of the present invention, this can be easily achieved by modifying either the feel force profile or the dynamic model by changing the value of the describing parameters. Normally, only changes to the former would be required. This can be done by external signals as shown in FIG. 2A and FIG. 4. For example, a scale factor could be applied to the feel force profile, the value of which would reflect the actual dynamic pressure and therefore changes in the value of control surface hinge moments (this is referred to as q-feel). Another possibility is to move the soft stop position as a function of controlled system state within the control envelope. Feel of the soft stop by an operator could advise him that he is exceeding the normal control envelope e.g. flight envelope. Such a tactile cue may enhance safety by improving the operator situation awareness. Another example could be the tailoring of the zero breakout (or detent) as a function of the turbulence level encountered by the controlled system; this could either help maintain the control member in zero position when left untouched, or ensure that the operator maintains his awareness of the control member being in or out of its detent (zero position) in such conditions.

The dynamic performance parameters can be similarly changed, for example to allow an optimization of the handling qualities at all flight regimes.

If feel force profile parameters are changed, some filtering or blending may be required to provide a smooth transition. This is not illustrated in FIG. 2 or FIG. 3 but can be easily added to embodiments of the present invention. Note however that the feel would only change slowly as a function of aircraft state, and that the rate of variation of the aircraft state is normally slow for commercial aircraft application. Therefore, this capability is unlikely to be required.

The major advantages provided by an embodiment of the present invention are that the Static Performance and Dynamic Performance of a control member can be changed independently of one another, and that this can be done through parameters that are intuitive and directly related to the desired effects. Moreover, these changes can be easily implemented online, for example as a function of the aircraft state. Finally, changes to the feel within a given range can be done without having to modify the LLC gains.

So far, this capability has been described in the context of a particular application. The flexibility can also be considered in the context of being able to adjust the control member feel to a different aircraft, or application, without having to redesign the system. For example, it could only be necessary to change to feel force profile, or the dynamic response parameters, to optimize the use of a given stick for another aircraft, or application, rather than to redesign the overall system.

Additional Force Cues

The additional force cues feature is described below with reference to aircraft application, although it will be appreciated that this feature is applicable to other systems.

The Additional Force Cues function allows the flight control computer to add a virtual force on the control member that would be felt by the pilot, or that would result in some motion of the control member. For example, the force could reflect the level of excedence of the current aircraft state from the flight envelope boundaries. In a way, this is equivalent to simulating a virtual pilot capable of applying a force on the control member in order to keep the aircraft within its flight envelope.

Figure 10:
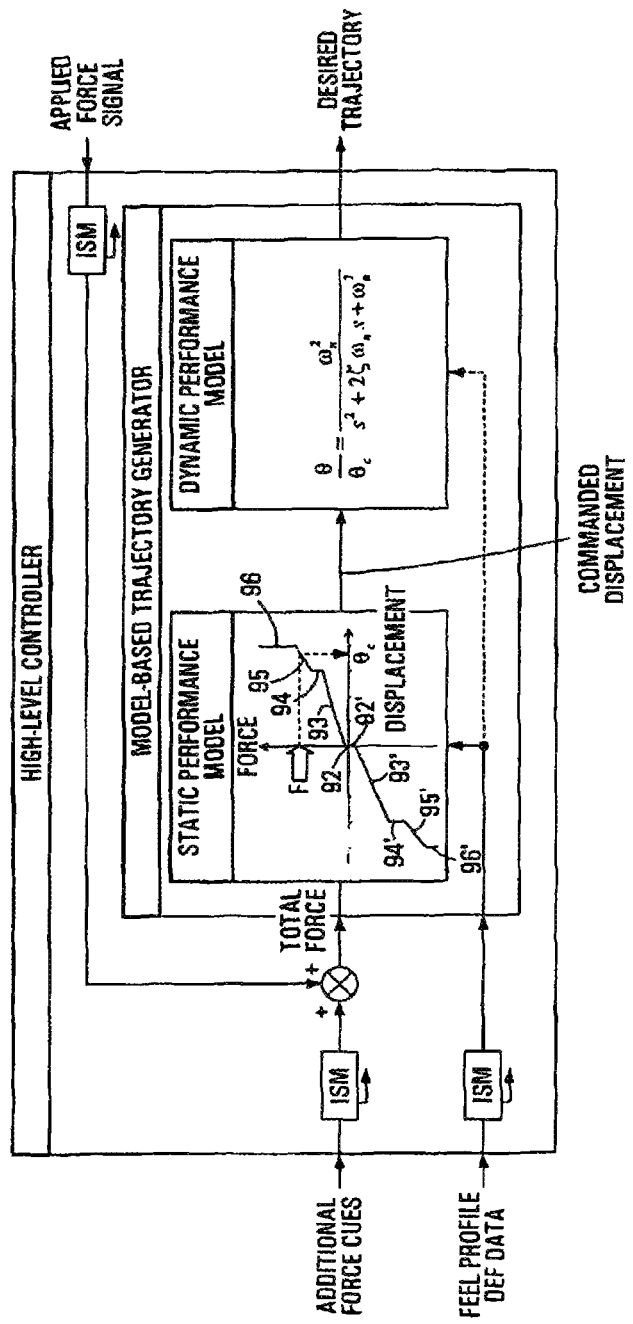
FIG. 10 shows a diagram of a trajectory generator according to an embodiment of the present invention.

An embodiment of the Additional Force Cues function is illustrated in FIG. 10. It simply consists in summing the externally supplied Additional Force Cues signal to the applied force signal. This is totally compatible with the Autopilot Backdrive function or the other functions and features described previously. For simplicity, these are not shown in the figure. In one embodiment, the Additional Force Cues function is completely independent of the Autopilot Backdrive function within the stick unit. Note however that one could consider disengaging the autopilot function if the latter drives the aircraft outside of its normal flight envelope; for now, it will be assumed that this possibility is taken care of by the flight control computer.

Based on the physical (and mechanical) representation of the Model-Based Trajectory Generator process as illustrated in FIG. 6, the summation of the applied force by the pilot and Additional Force Cues signal is equivalent to having an additional hand on the handgrip which applies a force in harmony or in opposition to that already applied by the pilot, if any. The greater the aircraft state is exceeding the flight envelope boundary, the greater is the force on the stick in the direction of the flight envelope boundary. This means that the pilot will have to fight against the Additional Force Cues, i.e. apply a greater force, if he wants to maintain the aircraft state outside of the flight envelope. As aircraft state is dynamic and evolves as a function of the flight control system and stick commands, the force felt by the pilot will vary in time as a function of aircraft state.

If the pilot does not apply any force on the stick, and the aircraft goes outside its normal flight envelope, the Additional Force Cues signal can be arranged to drive the control member as if it were operated by some pilot. The force (or value of force) so generated will be converted into a desired trajectory by the Model-Based Trajectory Generator and forwarded to the control member unit Low-Level Controller. As a result, the control member will move to reflect the additional force generated by the flight control computer. This is similar to having an autopilot specialized for flying the aircraft back toward the flight envelope boundary, as said previously. Note that this process could also be used to implement the Autopilot Backdrive function.

In another embodiment, the additional force may originate from a force applied to another control member and may be used as a way to cross-couple the control members together.

For protection, a limiter should preferably be applied to the Additional Force Cues signal, although an out of range signal would be limited by the Static Performance Model. This feature can be considered as not shown in the figure, or can be considered part of the Input Signal Monitor (ISM) block. The latter also preferably performs signal receiving, signal validation and reporting.

As before, this can be implemented either with analog or digital circuitry. In the latter case, elements such as ADC, DAC, signal conditioner and anti-aliasing filter should preferably be added.

As can be seen in FIG. 10, the Additional Force Cues signal sees the breakout implemented in the Static Performance Model. Moreover, for a free control member, the Additional Force Cues signal applied to the roll axis will result in different control member displacements for left and right sticks because these have asymmetric feel force profile (as described below). Alternatively, the additional pilot force that the pilot needs to apply on the handgrip to compensate for the Additional Force Cues force, is the same for inboard and outboard displacement, so that the pilot will feel a different force. These problems can be circumvented by one aspect of the present invention, an example of which is as follows.

Asymmetric Feel Force

Embodiments of the invention may be adapted to provide asymmetry in the feel force experienced by an operator which depends on the direction of the operator applied force on the control member. It has been found that, in general, the human arm is stronger for executing lateral inboard movement than for executing lateral outboard movement in a ratio of about 3:2. To compensate for this strength asymmetry, the feel force may be made asymmetric so that an operator feels that the same level of effort is required to move the control member laterally in either inboard or outboard directions.

In one embodiment, an asymmetric feel force may be implemented by defining the required asymmetry in the steady state force-commanded displacement transfer function, which may reside in the static performance model, an example of which is shown in FIG. 10.

Referring to FIG. 10, the SPM includes a predetermined Force vs Commanded Displacement relationship for both positive and negative displacements. For both positive and negative displacements, the feel force profile includes a zero break-out region 92, 92', a first linear gradient 93, 93', a soft stop 94, 94', a steeper, second linear gradient 95, 95', and a hard stop 96, 96'. In this embodiment, each of the breakout force and soft stop thresholds 92', 94' and first and second linear gradients for the negative direction is greater than that for the positive direction, so that less force is required to move the control member a given distance from a given position in the positive direction than in the negative direction. This form of profile may be implemented in a system for controlling lateral and/or forward and aft motion of a manual control member, or for controlling motion of any other type of control member in any desired direction. In other embodiments, breakouts, soft stops and other features may be modified, omitted or added, as required and each may or may not be asymmetric, to provide the desired feel characteristics for both positive and negative forces.

Therefore, the present embodiment provides a simple means of implementing asymmetry in the feel force independently of the desired dynamic response, which is implemented separately by the DPM.

As can be seen in FIG. 10, input signal, for example, the additional force cues signal sees the breakout implemented in the SPM. As the breakout is implemented to provide the operator with a tactile cue of the zero position, its effect on the additional force cue signal may be undesirable. Moreover, for a free control member (i.e. with no operator applied force), application of an additional force cue signal indicative of an additional positive or negative force of given magnitude will result in different displacements of the control member for the positive and negative directions due to the asymmetry in the feel force profile. On the other hand, where an operator force is applied to the control member, the additional operator force that an operator must apply to the control member to compensate for the additional force cues force is the same for both positive and negative displacements, so that the operator will feel different forces for the positive and negative directions. An aspect of the present invention addresses these problems, examples of which are described below with reference to FIGS. 11A to 11G and 12.

Figure 11A:
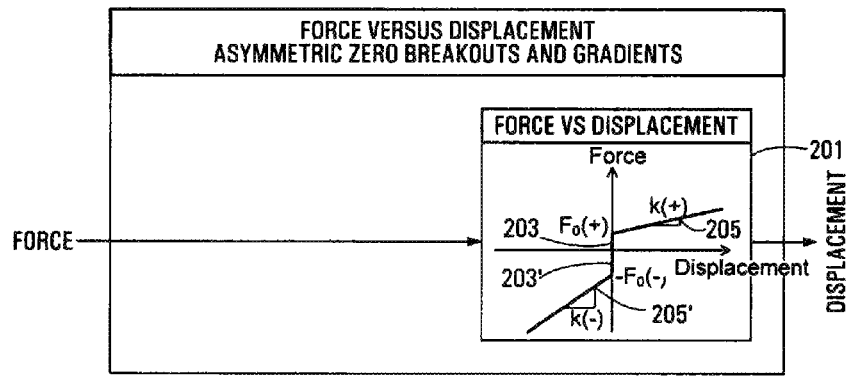
FIG. 11A shows a graph of a force vs displacement relationship.

FIG. 11A illustrates an example of a generic feel force profile 201 having an asymmetric breakout 203, 203' and asymmetric linear gradients 205, 205', similar to FIG. 10. The profile may include other features such as soft stops and secondary gradients, examples of which are shown in FIG. 10, but are omitted here for clarity. Features of the profile such as the asymmetry and breakout can be decomposed into separate elements such as asymmetric or symmetric scaling and normal or offset deadband, examples of which are shown in FIGS. 11B to 11G.

Figure 11B:
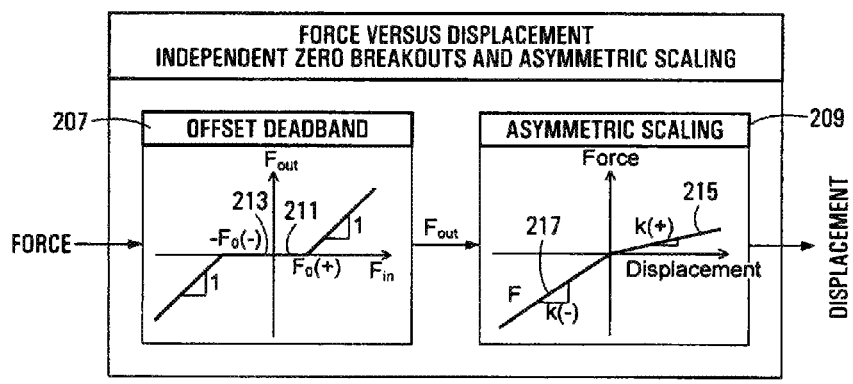
FIGS. 11B to 11G show elements defining relationships between input and output force according to embodiments of the present invention.

In FIG. 11B, the feel force profile 201 of FIG. 11A is decomposed into an offset deadband (OD) element 207 and an asymmetric scaling element (ASE) 209. The offset deadband defines the relationship between an input force and an output force and includes a first region 211 for positive force between zero and a first threshold input force for which the output force is zero, and a second region 213 for negative force between zero and a second, different threshold input force for which the output force is also zero. Beyond the first and second regions, the relationship between the input (VP) and output (O/P) force is 1:1. Thus, this element implements both the zero breakout and the asymmetry of the zero breakout, with the positive zero breakout 203 of FIG. 11A being represented by the first region 211 of FIG. 11B, and the negative zero breakout 203' of FIG. 11A being represented by the second region 213 of FIG. 11B.

The asymmetric scaling element 209 defines the relationship between force and displacement, and comprises a first linear gradient 215 for positive displacements, and a second, different gradient 217 for negative displacements. This element converts the output force from the offset deadband element into a displacement, and implements both the linear gradients and the asymmetry of the linear gradients of the generic feel force profile 201 of FIG. 11A.

Figure 11C:
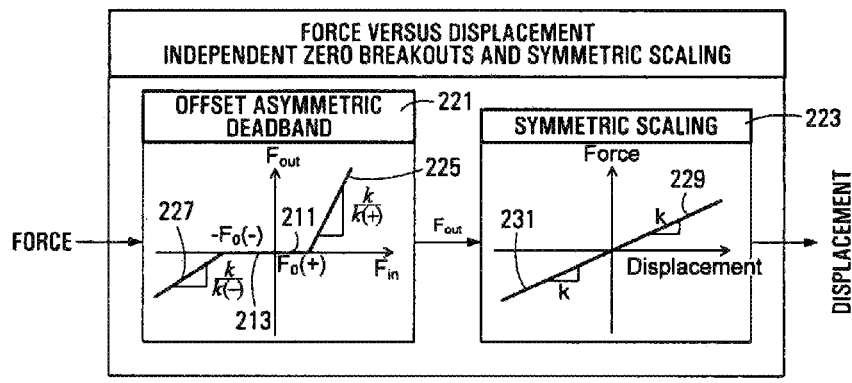

In FIG. 11C, the generic feel force profile is decomposed into an offset asymmetric deadband (OAD) element 221 and a symmetric scaling element 223. The first element 221 defines the relationship between an I/P and O/P force and is similar to the offset deadband element of FIG. 11B in that it includes first and second regions 211, 213, which implement the asymmetric zero breakout 203, 203' of FIG. 11A. In addition, the first element 221 includes a first linear gradient 225 beyond the positive zero breakout threshold, and a second, different gradient 227 beyond the negative zero breakout, which implement the ratio of force asymmetry in the feel force profile 201, of FIG. 11A.

The second element 223 defines the relationship between force and displacement and comprises first and second gradients 229, 231 of equal value for positive and negative displacements, respectively. The combination of these symmetric gradients 229, 231 and the asymmetric gradients 225, 227 of the first element implement the asymmetric force vs displacement relationship of the feel force profile 201 of FIG. 11A.

Figure 11D:
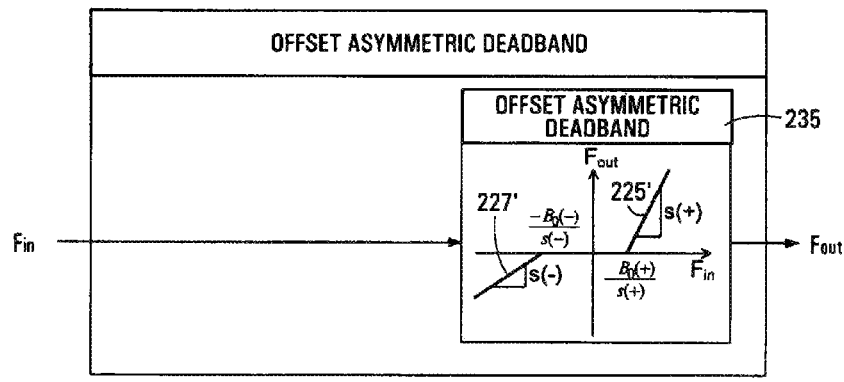

FIG. 11D shows a single, offset asymmetric deadband element 235 which defines the relationship between an I/P and O/P force, and is similar to that of FIG. 11C.

Figure 11E:
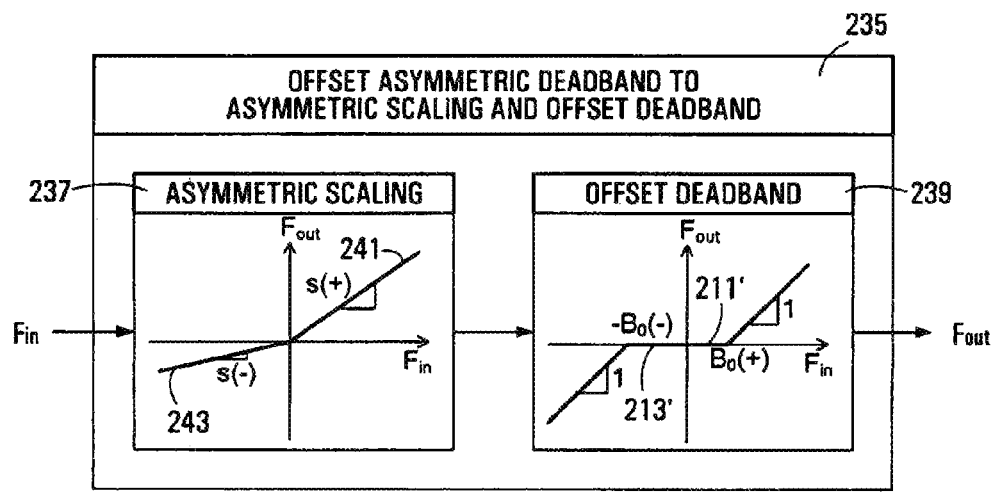

FIG. 11E shows a decomposition of the offset asymmetric deadband element of FIG. 11D into an asymmetric scaling element 237 and an offset deadband element 239. The first element 237 defines the relationship between an PP force and O/P force and includes a first linear gradient 241 for positive force and a second, different linear gradient 243, which implement the asymmetric gradients 225, 227 of the OAD element 235 (FIG. 11D) or 221 (FIG. 11C).

The second element 239 also defines a relationship between I/P and O/P force and includes first and second deadband regions 211', 213', which implement the offset or asymmetric deadband, which yields zero O/P force for different predetermined ranges of PP forces in the positive and negative directions. Beyond the deadband threshold, the relationship between I/P and O/P force is 1:1. This arrangement allows the linear gradient and the deadband (e.g. extent and degree of asymmetry or offset) to be defined and varied independently.

Figure 11F:
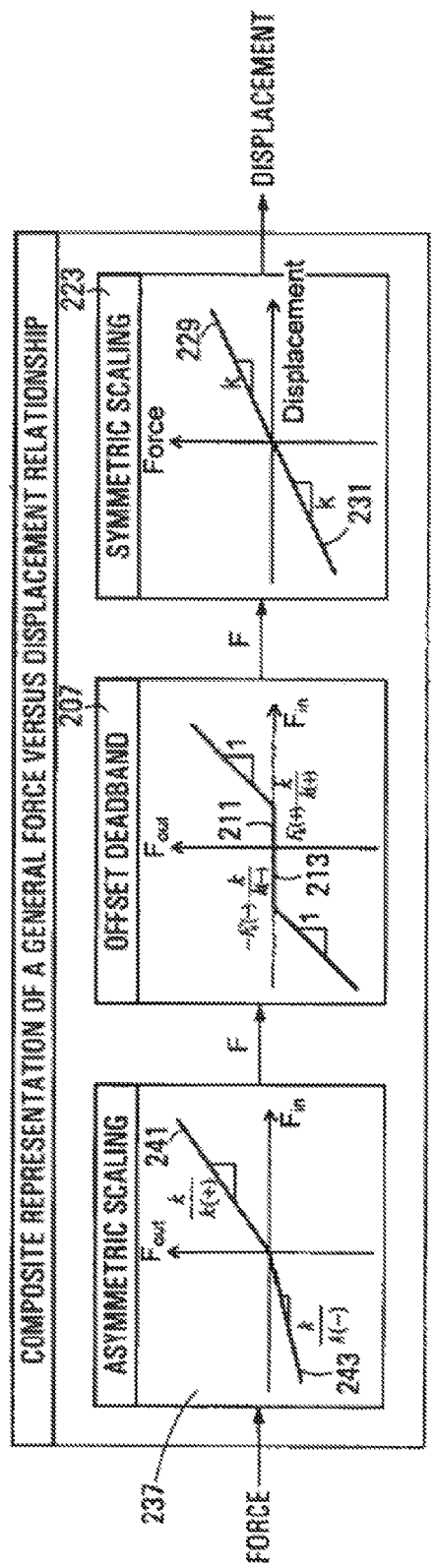

FIG. 11F shows an example in which the generic feel force profile has been decomposed into three elements, namely an asymmetric scaling element 237 (FIG. 11E), an offset deadband element 207 (FIG. 11B) and a symmetric scaling element 223 (FIG. 11C). The first element 237 defines the relationship between I/P and O/P force and includes first and second asymmetric gradients 241, 243 and implements the ratio of the O/P force in the positive and negative directions for a given I/P force, which defines degree of asymmetry of linear gradients in the feel force profile 201 of FIG. 11A.

The second element 207, defines the relationship between I/P and O/P force and includes an offset deadband 211, 213, similar to that shown in FIG. 11B or 11E, which implements the asymmetric zero breakout in the feel force profile. The second element receives as its I/P the O/P force from the first element.

The third element 223 defines the relationship between I/P force and displacement and includes symmetric linear gradients 229, 231 for positive and negative displacements, and serves to convert (by scaling) the O/P force from the second element into displacement.

Figure 11G:
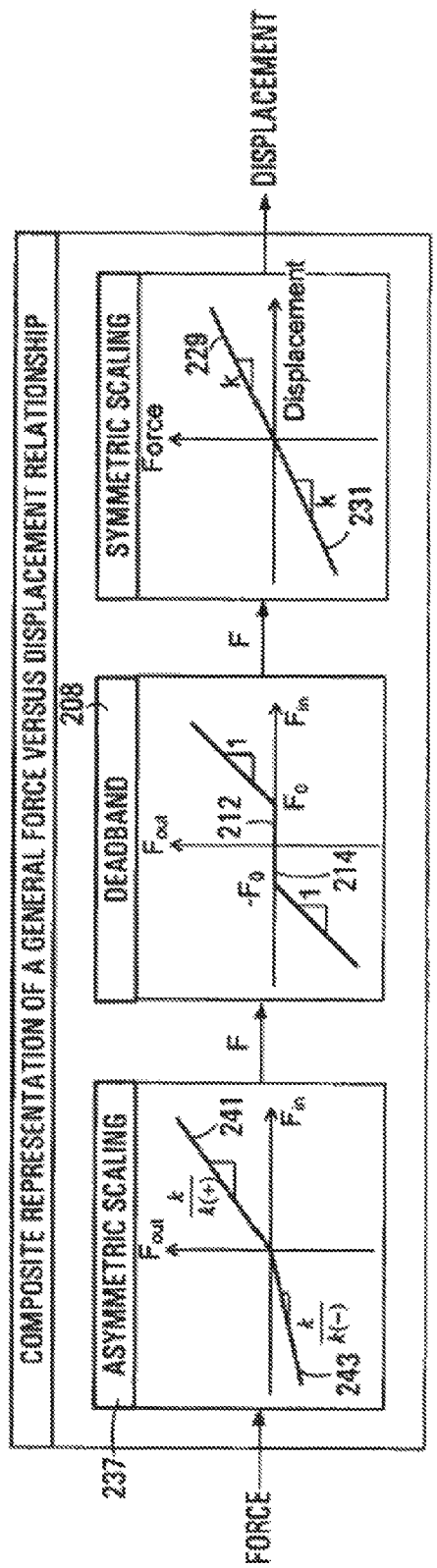

FIG. 11G shows another example of a decomposition having three elements which are similar to the elements of FIG. 11F, except that the second element 208 has a symmetric rather than asymmetric deadband 212, 214. The asymmetry of the deadband can be removed if the positive and negative feel force profiles are in constant proportion to one another.

Figure 12:
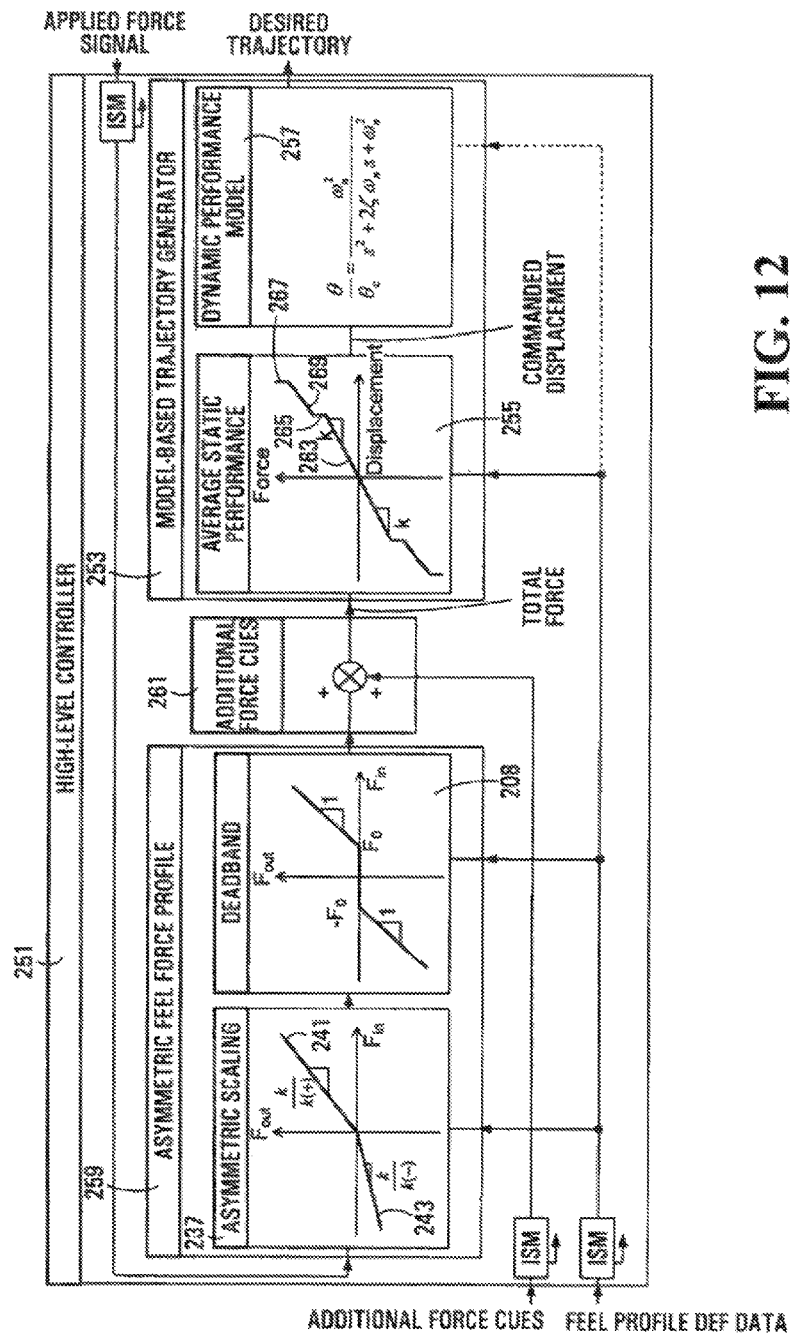
FIG. 12 shows a block diagram of a high level controller according to an embodiment of the present invention.

FIG. 12 shows a schematic diagram of a high-level controller according to an embodiment of the present invention, in which certain features of the feel force profile are implemented by a plurality of separate elements.

The HLC 251 comprises a trajectory generator 253 having a static performance model 255 and a dynamic performance model 257, and separate profile module 259 having a symmetric scaling element 237 and a deadband element 208. The HLC further comprises a summer 261 for summing additional force cues with the O/P from the profile module 259 and providing the sum to the trajectory generator 253.

The first element 237 defines the relationship between an PP and O/P force and has a first and a second different linear gradient 241, 243 for positive and negative force, respectively and implements the asymmetry in the feel force profile between the positive and negative directions. The I/P force to the ASE is indicative of the force applied to a control member by an operator.

The second element 208 defines the relationship between an I/P and O/P force, the PP force being the O/P force from the ASE 237. The second element defines a range of I/P force from zero to a desired threshold over which the O/P force is substantially zero, and in this embodiment, the threshold is the same for both positive and negative forces, so that the deadband is symmetric. Beyond the threshold, the relationship between the I/P and O/P force is 1:1 for both positive and negative directions. The deadband element implements the zero breakout in the feel force profile, and the ASE 237 implements the asymmetry in the zero breakout, as for the embodiment shown in FIG. 11G.

The static performance model 255 defines the relationship between an I/P force and commanded displacement for a control member, the relationship being symmetric for both positive and negative displacements. The profile includes a first linear gradient 263 from zero to some predetermined value of displacement, a soft stop 265, a hard stop 267 and a second linear gradient 269 extending from the soft to the hard stop. Each gradient may be the average gradient for force vs. displacement relationship for left and right control members (or left and right displacements for the same control member).

Advantageously, in this embodiment, conditioning of the operator applied force signal to introduce components of asymmetry and zero breakout is separated from the feel force profile in the static performance model and precedes the summing junction 261, so that the additional force cue signals do not see the asymmetry or zero breakout and therefore, the additional force cue generator e.g. flight control computer does not need to consider or compensate for these features in generating the additional force cue signals.

Application of an additional force cue signal of given magnitude in either positive or negative direction will result in the value of commanded displacement irrespective of the direction due to the symmetry of the feel force profile in the static performance model. However, the applied operator force required to compensate for this additional displacement is less in one direction than the other (in the present case less for the positive direction than the negative direction) due to the asymmetric scaling in the first element 237, so that for example, if applied to manual lateral motion of a manual control member located on the left hand side of a vehicle e.g. aircraft, the operator will feel that the same force is required to compensate for the additional force cue displacement in either the inboard or outboard directions.

It is to be noted that if an additional force cue offsets the control member, the detent or zero breakout will still be felt by an operator at the offset position. If this is undesirable, the zero breakout could be moved back into the static performance model.

In another embodiment, the soft stop could be implemented in an element separate from the static performance model, and could for example be included in the deadband element 208 with the zero breakout, or in a separate element.

It will be appreciated that the order of the asymmetric scaling and deadband conditioning may be reversed from that shown in FIG. 12, so that the deadband conditioning precedes the asymmetric scaling. In other embodiments, the symmetric deadband element may be replaced by an offset deadband element as described above.

Advantageously, by using separate elements to implement the various functional relationships between input force and output force these relationships may be varied independently of one another.

Cross Coupling

Various examples of embodiments of the present invention, in which two or more control members are coupled together, are described below with reference to FIGS. 13 to 25.

Figure 13:
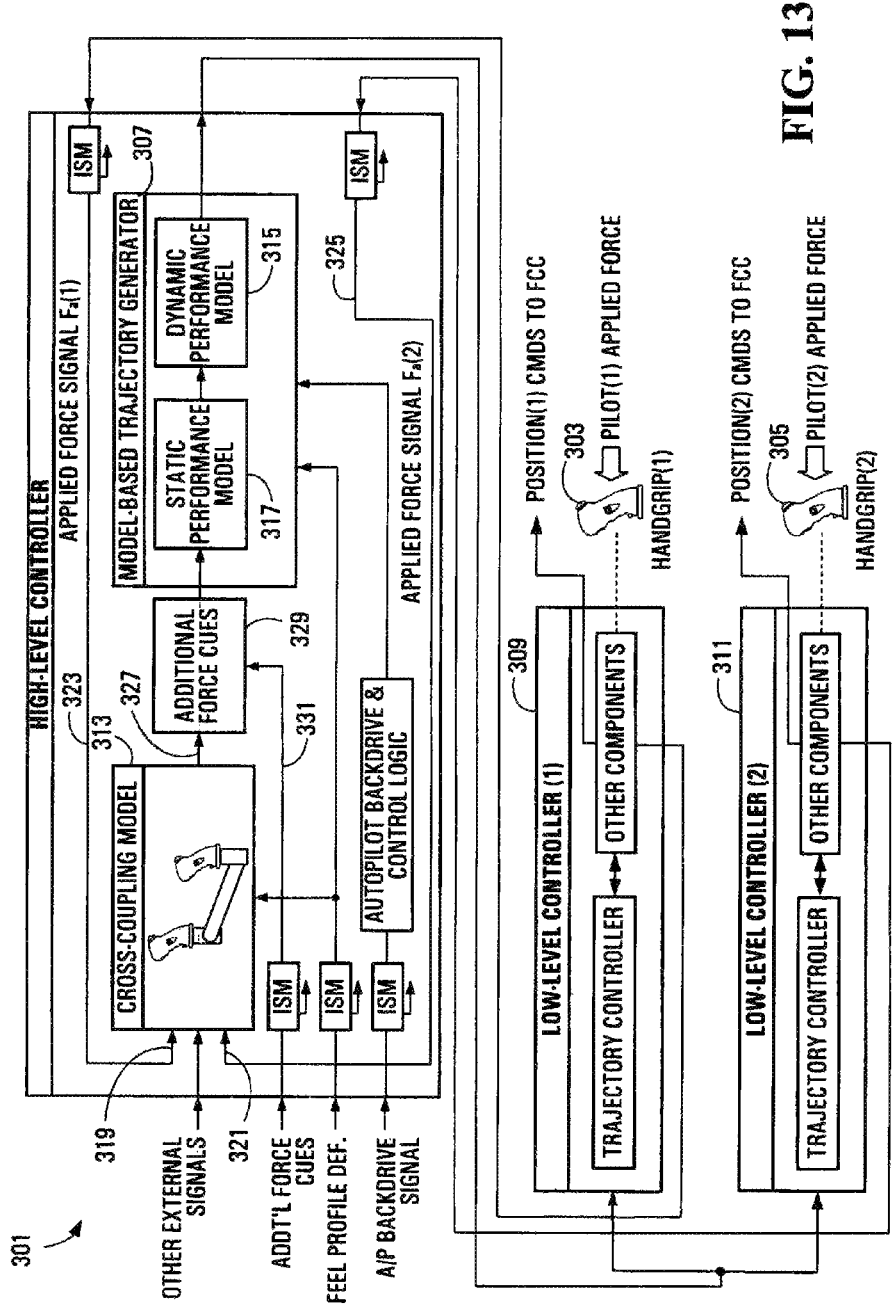
FIG. 13 shows a diagram of an apparatus for coupling control members, according to an embodiment of the present invention.

Referring to FIG. 13, an apparatus 301 for controlling the motion of two control members 303, 305 comprises a trajectory generator 307 for generating a desired trajectory for the control members and first and second drive controllers 309, 311 for driving movement of the first and second control members, respectively, in response to the desired trajectory. The apparatus 301 further includes a coupling controller 313 for controlling the cross-coupling between the control members 303, 305, examples of which are described in more detail below.

The trajectory generator 307 may comprise a dynamic performance model 315 for generating the desired trajectory from a commanded displacement, and may further include a static performance model 317, for generating a commanded displacement for the dynamic performance model 315. The dynamic and static performance models may for example comprise any of the embodiments described above as well as other embodiments.

The drive controllers 309, 311 may be arranged to cause substantially identical movement of the control members 303, 305 in response to the desired trajectory, and may comprise components having similar or identical characteristics. The trajectory controllers may use feedback to ensure that each controller accurately tracks the desired trajectory, and so that any differences between them do not cause non-identical movement of the control members.

This embodiment includes a force sensor (not shown) associated with each control member for sensing the force applied thereto by an operator, and the coupling controller 313 has a first input 319 for receiving an applied force signal 323 indicative of an external force applied to the first control member and a second input 321 for receiving an applied force signal 325 indicative of an external force applied to the second control member. The coupling controller 313 generates a control signal for the trajectory generator 307 based on the applied force signals, which is subsequently used by the trajectory generator to determine a desired trajectory. In other embodiments, the coupling controller may use other signals to generate the control signal.

A respective applied force signal 323, 325 may be fed back to a respective drive controller 309, 311 to remove any effect of the operator applied force on the drive controller, which would otherwise cause an error between the desired trajectory determined by the trajectory generator and the actual trajectory of the control member, as for example described above, in conjunction with FIG. 2B.

As the same desired trajectory is fed from the trajectory generator to each drive controller 309, 311, and the drive controllers are adapted to respond substantially identically, the control members will track one another accurately, both statically and dynamically.

The apparatus may include a summer 329 for modifying the coupling control signal 327 by any additional force cue signals 331, examples of which were described above, before the control signal is passed to the trajectory generator.

Figure 14A:
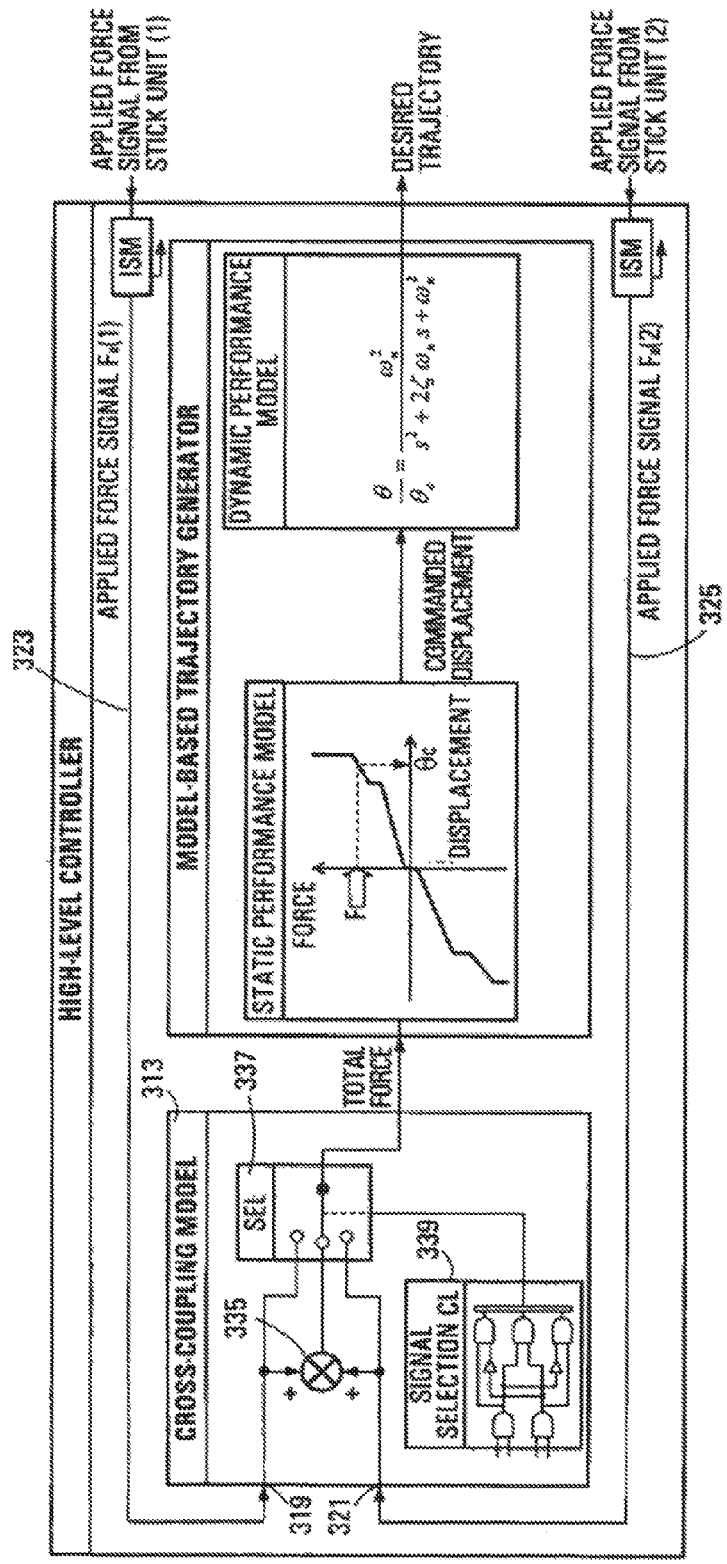
FIG. 14A shows a diagram of a high level controller according to another embodiment of the present invention.

FIG. 14a shows an embodiment of a coupling controller in more detail. The coupling controller 313 comprises first and second inputs 319, 321 for receiving first and second applied force signals 323, 325, respectively, from the first and second control member force sensors, a summer 335 for summing the force signals, a selector switch 337 for selecting as an output one of the first applied force signal, the second applied force signal and the sum of the two applied force signals, and a switch controller 339 for controlling the state of the selector switch.

Thus, in this embodiment, the control members are coupled by force (or torque) summation, which corresponds to a mechanical system in which the control members are rigidly connected together. When the switch is in the summing state, the sum of the forces applied to the control members is passed to the trajectory generator instead of the applied force on one control member in a single control member system.

In operation, if a force is applied to a single control member, the operator will experience the same feel as a single control member system, i.e. the operator will not feel the presence of the other control member and will not be able to tell by feel alone whether the control members are coupled or not.

If forces are applied to both control members simultaneously, a constant force applied to one control member will result in displacement of the other control member and a force bias, but will not modify the feel force profile, e.g. the feel gradient, or soft stop position, or zero breakout, if any.

In this embodiment, the coupling controller includes a switch controller which determines the state of the switch, according to predetermined criteria. An example of a switch controller is shown in more detail in FIG. 14B.

The switch controller 339 is arranged to determine the switch state in accordance with a Valid signal and the state of an operator controlled switch, associated with each control member. The Valid signal may be derived from a monitor which monitors the magnitude of the applied force signal (or another parameter) or by other means and determines whether it falls within predetermined limits. If the signal exceeds a predefined limit, the monitor may provide an Invalid signal. The operator controlled switch may be used by an operator to actively decouple the control members and may have a first state which permits the control members to adopt a coupled state and a second state which causes the control members to decouple. In the present embodiment, the switch controller 339 includes logic that controls the selector switch to adopt the summing state if both signals are valid for both control members, a state which passes the applied force signal only for that control member for which both signals are valid, if one or both of the signals for the other control member are invalid, and optionally, a state in which neither applied force signal is passed if at least one of the control signals for each control member is invalid.

Figure 14B:
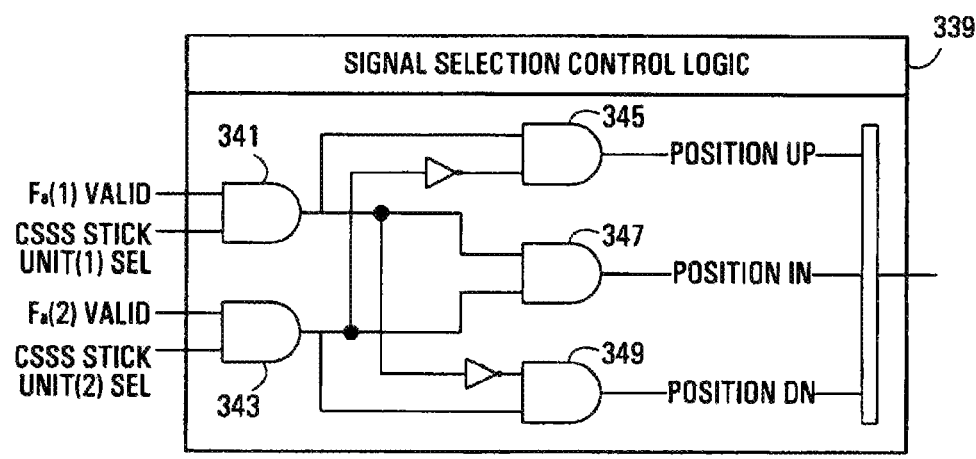
FIG. 14B shows a diagram of logic which may be used to control signal selection according to an embodiment of the present invention.

In the embodiment of FIG. 14B, the signal selection control logic includes first and second AND gates 341, 343 each for receiving a valid and select signal, and third, fourth and fifth AND gates 345, 347, 349, the fourth AND gate 347 receiving as its inputs the outputs from the first and second AND gates, the third AND gate receiving as its inputs the output from said first AND gate 341 and an inverted output from the second AND gate 343, the fifth AND gate receiving as its inputs the output signal from the second AND gate 343 and an inverted output from the first AND gate 341. The output from the third, fourth and fifth AND gates is used to control the state of the selector switch 337 in FIG. 14A.

Figure 15:
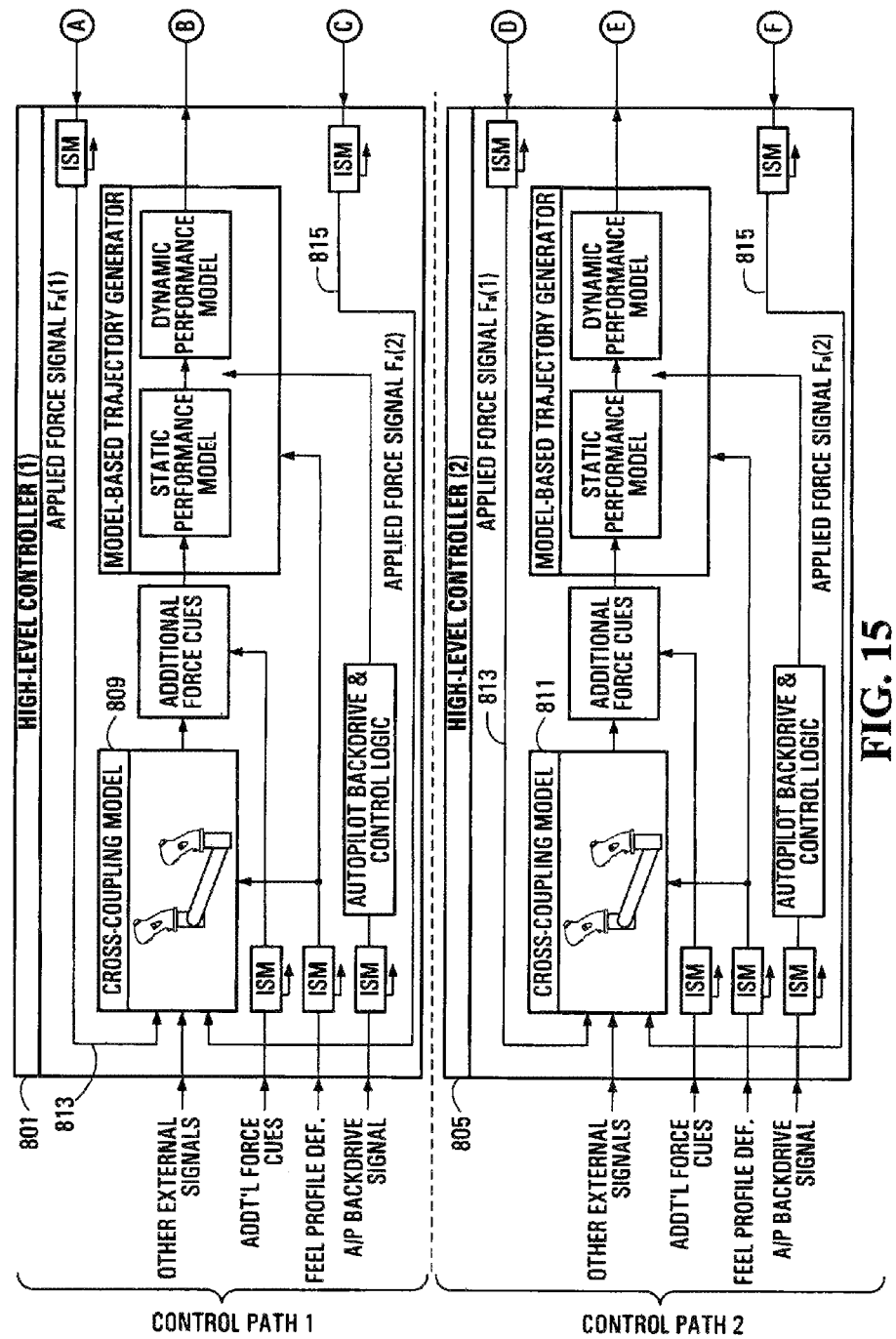
FIG. 15 shows a diagram of an apparatus for coupling control members according to another embodiment of the present invention.
Figure 15:
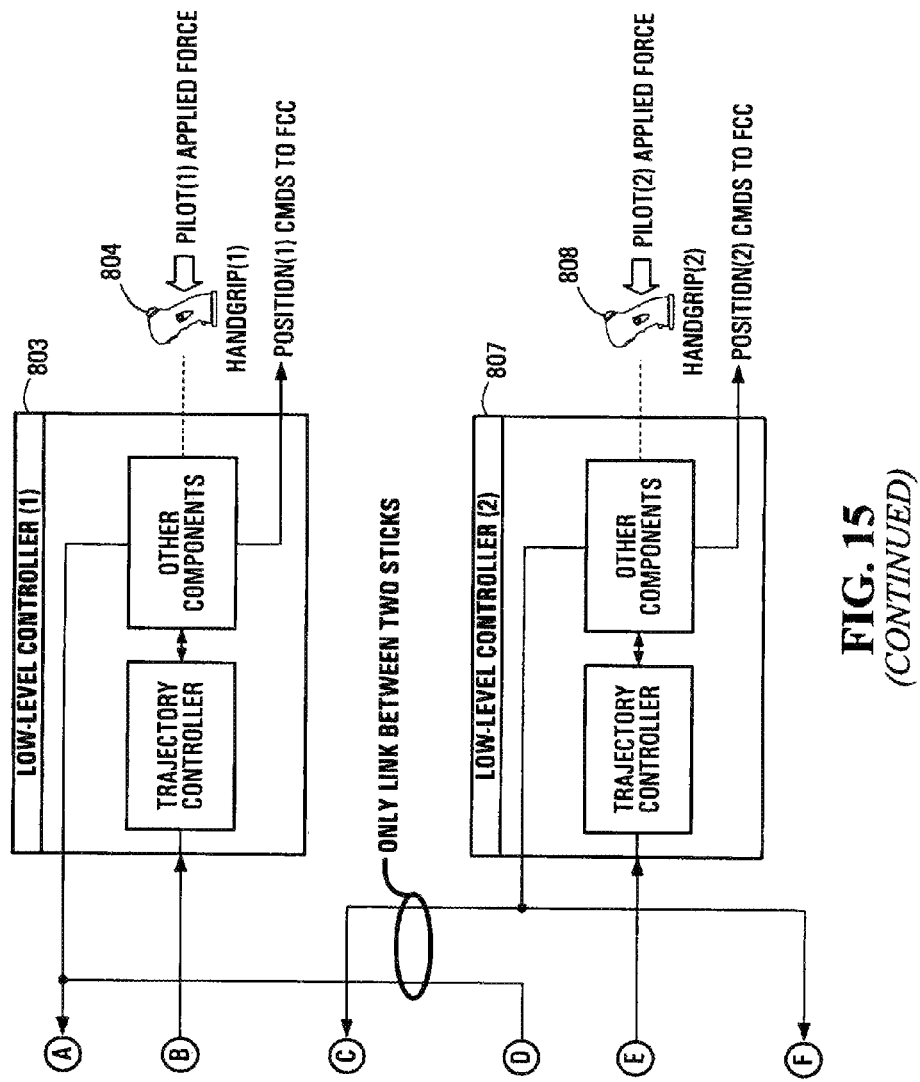

FIG. 15 is another embodiment of the invention whereby the control paths of the control members are separated from one another. The control system comprises a first high level controller 801 and a first low level controller 803 for controlling movement of a first control member 804, and a second high level controller 805, and a second low level controller 807 for controlling a second control member 808. The first and second high level controllers 801, 805 include a coupling controller 809, 811, respectively for controlling coupling between the control members 804, 808 in response to applied force signals 813, 815 indicative of a force applied to the first and second control members, respectively. As one can see, the only link between the two control member units are the force signals being exchanged. This is the minimum solution, as there has to be some exchange of information between the two control member units to implement cross-coupling, otherwise the two control members would be independent. The control link can be reduced if force sensors are used for each control member unit, and the electronics for one of them is in the other control member unit. This would completely separate the two control member units. However, in this embodiment, inaccuracies in the force sensors could lead to cross-coupling tracking errors.

Figure 16:
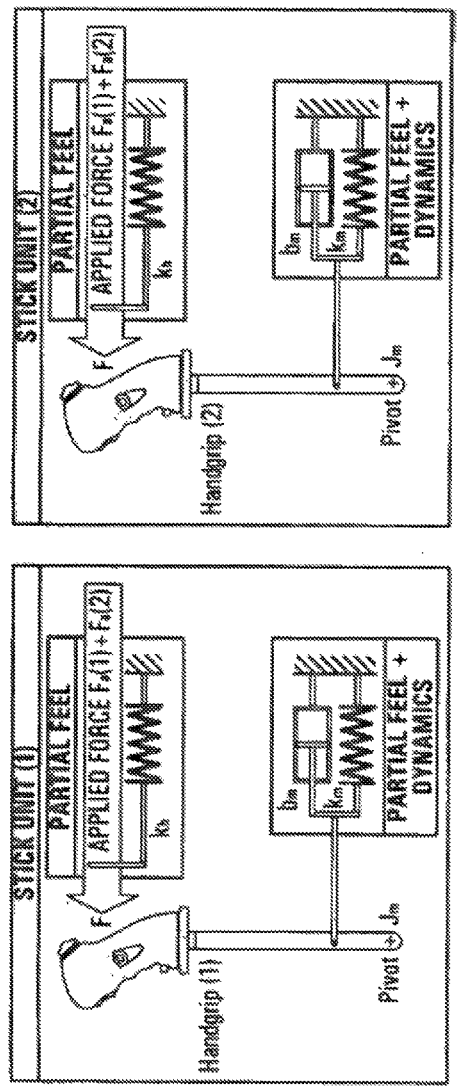
FIG. 16 is a schematic diagram illustrating and comparing the mechanical equivalent of a model which provides coupling between control members, according to an embodiment of the present invention.

FIG. 16 describes a mechanical equivalent to an embodiment of the cross-coupled control member system of one aspect of the present invention. It shows an example in which cross-coupling by force summation, for the pitch axis, or by scaled force summation, for the roll axis when the control members are in a side-by-side configuration (see below), according to an embodiment of the present invention is equivalent to two rigidly connected control members each having half the inertia, damping coefficient, and spring stiffness of the cross-coupled stick model. Otherwise, the behavior of this mechanical equivalent system to the forces applied by the two operators is identical to that of a single stick described earlier. Note however that the position dependent stiffness, i.e. the non-linearities in the feel force profile, is provided on the combined hands, not split equally between the two as for the other components. A major difference of an embodiment of the present invention with a true mechanical system, is that in case of de-coupling of the two control members, the physical system could only provide half the feel force of the coupled system; with an embodiment of the present invention, the resulting feel may be unaffected.

Asymmetric Feel in a Coupled System

As described above in connection with a single control member, it may be desirable to implement different feel forces for different directions of applied force, for example, for lateral movement of a manual control member to compensate for the asymmetry between the inboard and outboard strength of the human arm. Examples of embodiments of a system which implement asymmetric feel force for each control member when coupled to one another is described below, with reference to FIGS. 17 to 20.

Figure 17:
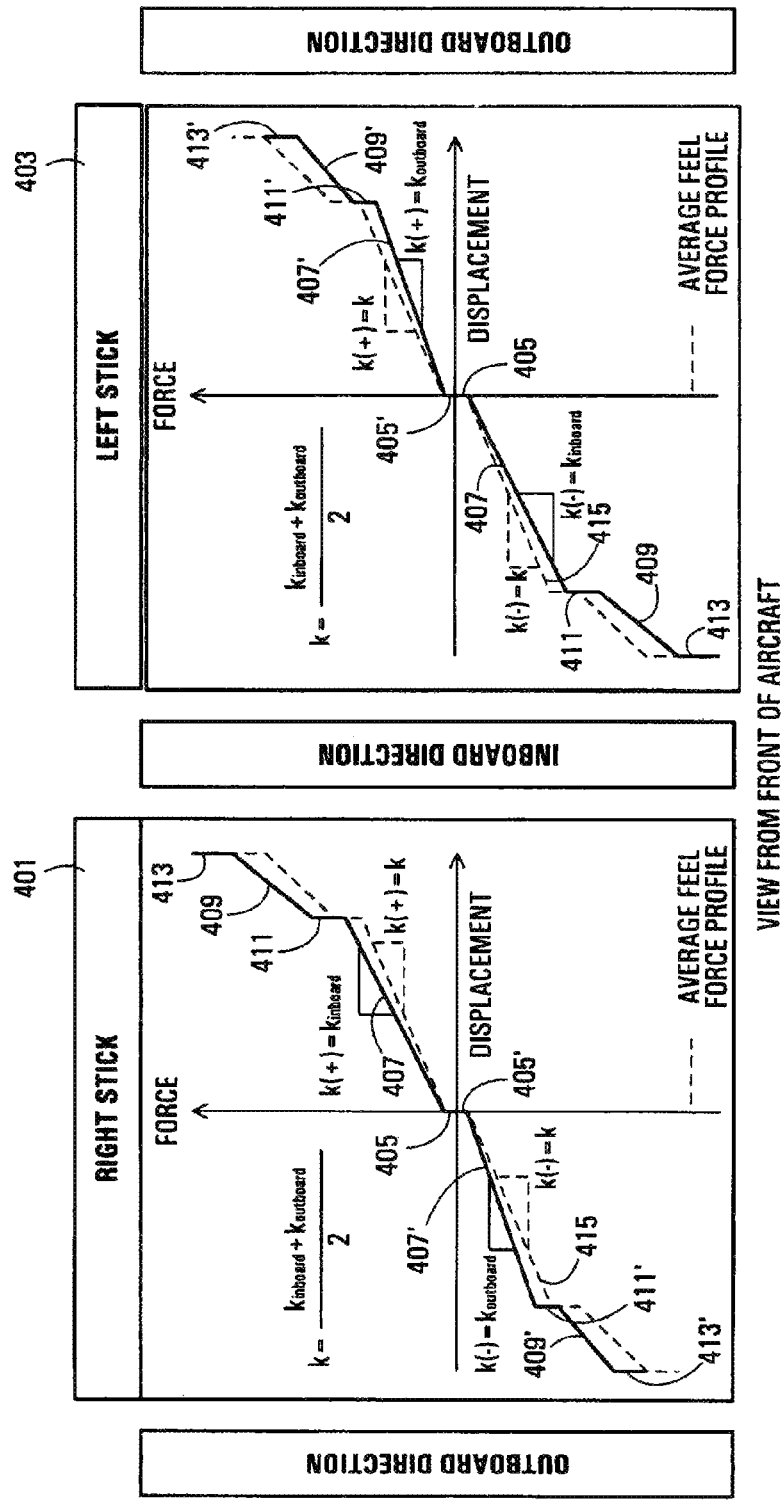
FIG. 17 illustrates force vs displacement characteristics of side by side control members, which may be employed for the roll access of an aircraft.

FIG. 17 shows a feel force profile 401, 403 (force vs. commanded displacement) for both positive and negative displacements for two control members positioned side by side, as viewed from the front of a vehicle (e.g. aircraft) or other system being controlled, so that from an operator's view point, the feel force profile 401 on the LHS of the page is that for the RHS control member and the feel force profile 403 on the RHS of the page is that for the LHS control member. The required feel force profile for each control member shown by the solid lines is asymmetric about zero displacement. In the feel force profile 401 for the RHS control-member, the force required to displace the control member a given distance in the positive (inboard) direction is greater than that for the negative (outboard) direction. In this embodiment, the feel force profile 401 includes zero breakouts 405, 405', first and second linear gradients 407, 407', 409, 409' and soft and hard stops 411, 411' and 413, 413', in which the threshold force values for the zero breakout 405 and soft stop 411 and the first and second gradients 407, 409 for inboard displacement are greater than those for outboard displacement.

Similarly, in the feel force profile 403 for the LHS control member, the force required to move the control member a given distance in the negative inboard direction is greater than that for the positive outboard direction. The feel force profile 403 has similar features to that for the RHS control member described above, and these features are designated by the same reference numerals.

The dashed line 415 in each graph is the average feel force profile of the positive and negative asymmetric profiles, and is symmetric about zero displacement.

Figure 18:
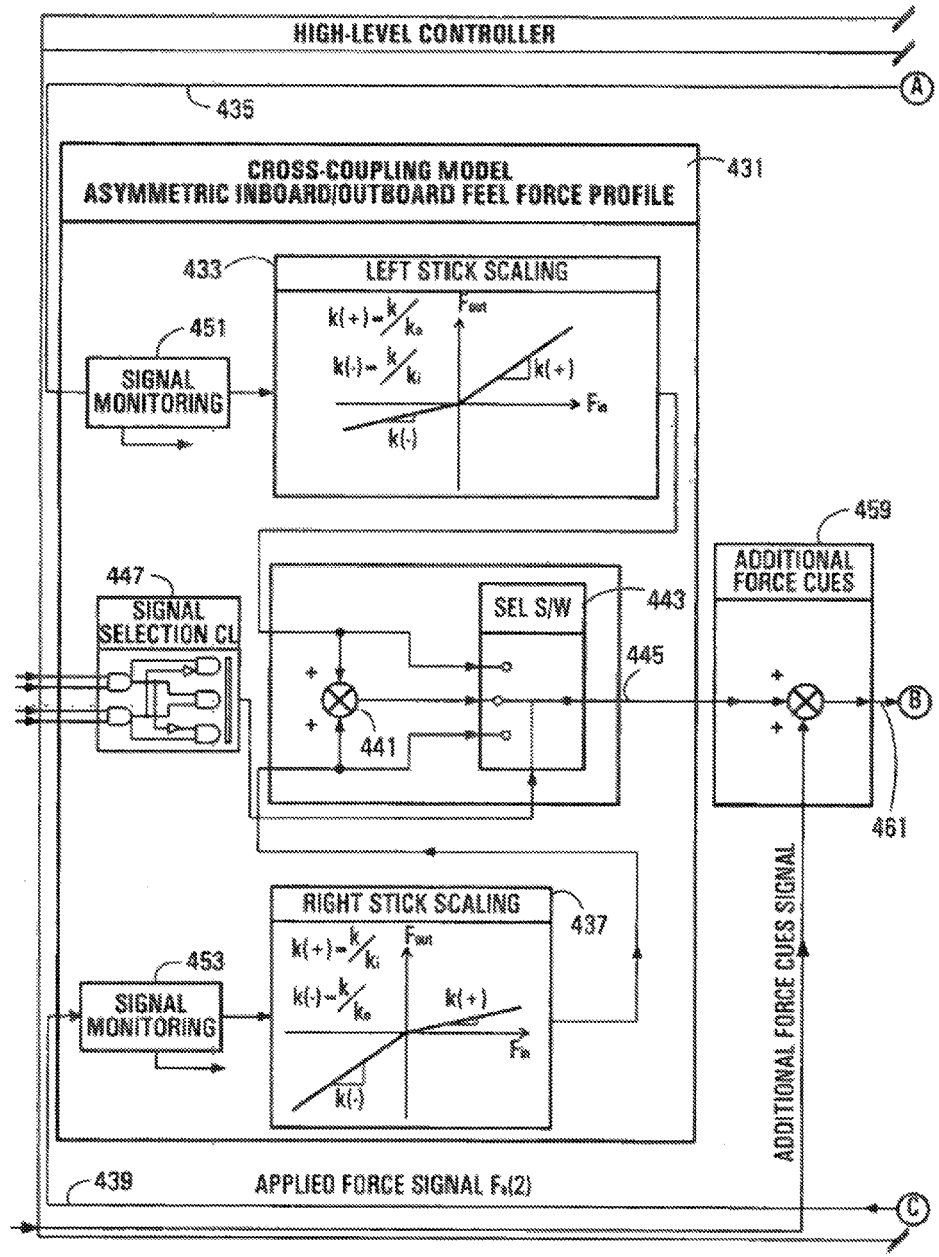
FIG. 18 shows a diagram of a high level controller according to another embodiment of the present invention.
Figure 18:
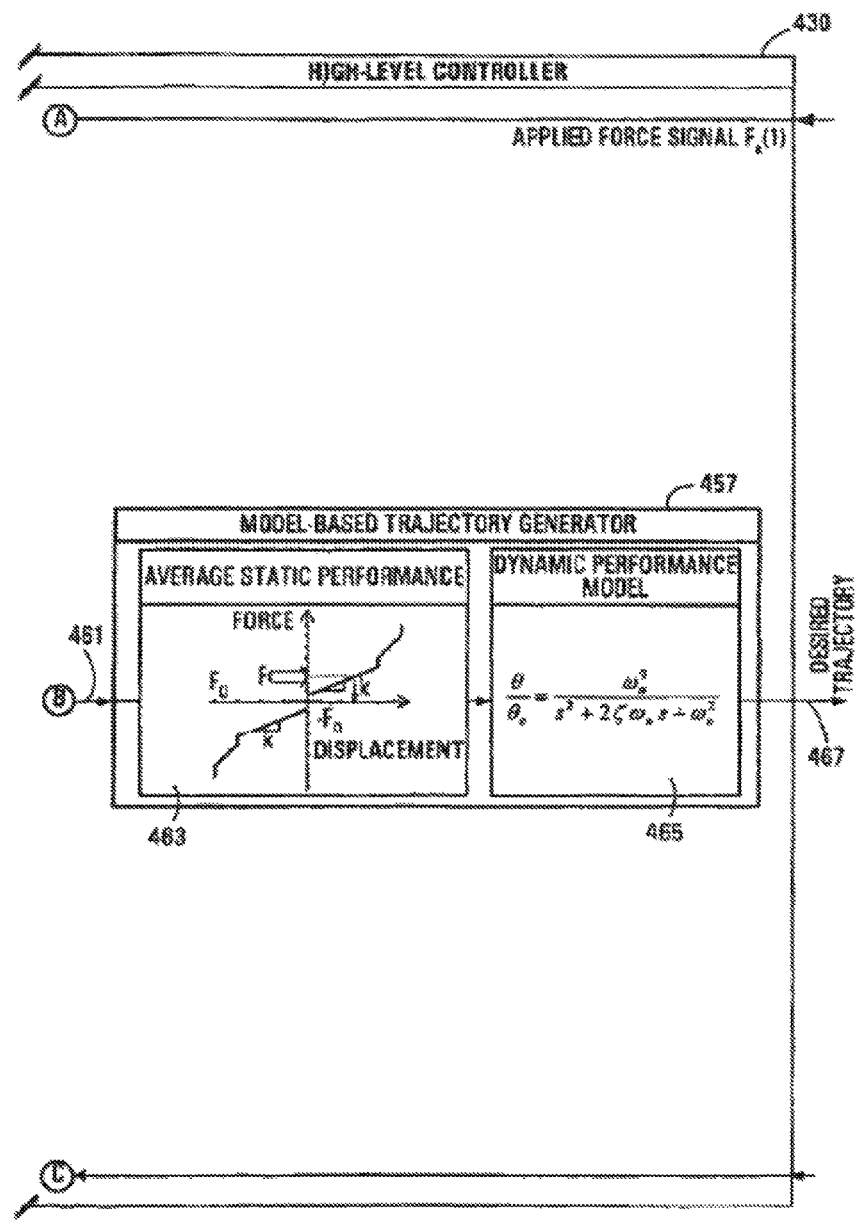

FIG. 18 shows an embodiment of a coupling controller, which is capable of implementing asymmetric feel for cross-coupled control members. The coupling controller 431 comprises a first scaling element 433 associated with a first control member for scaling a first applied force signal 435, a second scaling element 437 associated with a second control member for scaling a second applied force signal 439, a summer 441 for summing the force signals from the scaling elements 433, 437, and a selector switch 443 for selecting as an output signal 445 one of the summed applied force signals from the scaling elements, the first applied force signal for the first scaling element 433, and the second applied force signal from the second scaling element 437. The coupling controller also includes a switch controller 447 for controlling the selector switch state, and first and second signal monitors 451, 453 may be provided for monitoring the applied force signals 435,439. The monitors may be used to monitor whether the signals are within a permitted range and provide an indication to the switch controller of the signal status, as for example described above.

The first and second scaling elements 433, 437 each define output force as a function of input force for positive and negative directions, the O/P force being equal to the I/P force times a predetermined factor. In the first element 433, the multiplication factor for the positive direction is greater than that for the negative direction, and in the second element 437, the multiplication factor is greater for the negative direction than that for the positive direction, so that each element performs direction dependent asymmetric scaling.

The embodiment of FIG. 18 further includes a trajectory generator 457 and an optional summer 459 for summing the O/P force signal 445 with additional force cue signals and passing the resulting force signal 461 to the trajectory generator. In this particular embodiment, the trajectory generator may have a static performance model 463 and a dynamic performance model 465. The feel force profile defined by the static performance model is symmetric in both positive and negative directions and is the average feel force profile of both directions. The desired asymmetry in the feel force profiles for each control member is defined and provided by the respective scaling element, which will cause asymmetry in each feature of static performance model, for example, the zero breakout, soft stop, and the gradients. The static performance model determines a commanded displacement from the force signal 461 and the dynamic performance model determines a desired trajectory 467.

The scaling elements may be adapted to compensate for the inboard/outboard asymmetry in the strength of the human arm. If an operator force is applied to only one control member, both control members will move together, as the desired displacement signal is fed to both drive controllers, but the operator will only feel the response or load of a single control member and not the load of the other control member, and the feel force will feel the same in both directions due to the asymmetric compensation.

If a force is applied to both control members at the same time, the forces from each asymmetric scaling element 433, 437 are added together by the summer 441 and the resulting applied force signal 445 is passed, via the second, optional summer 459 for addition with any additional force cue signal and then to the trajectory generator which determines a desired trajectory for both control members. Therefore, each operator will feel the effect of the additional asymmetric compensated force applied by the other operator.

In this embodiment, since the static performance model uses an average, symmetric feel force profile, symmetry for the additional force cues is preserved, although, in this embodiment, the additional force cues see the zero breakout of the static performance model.

Cross-Coupling with Independent or Distributed Zero Break Out

Embodiments of the invention may be adapted so that each of a plurality of coupled control members has zero breakout which is independent of the force applied to another control member, which will be referred to as "independent zero breakout" or so that the zero breakout is partially or completely shared between coupled control members, which will be referred to as "distributed zero breakout". An example of an embodiment which can implement these features is shown in FIG. 19.

Figure 19:
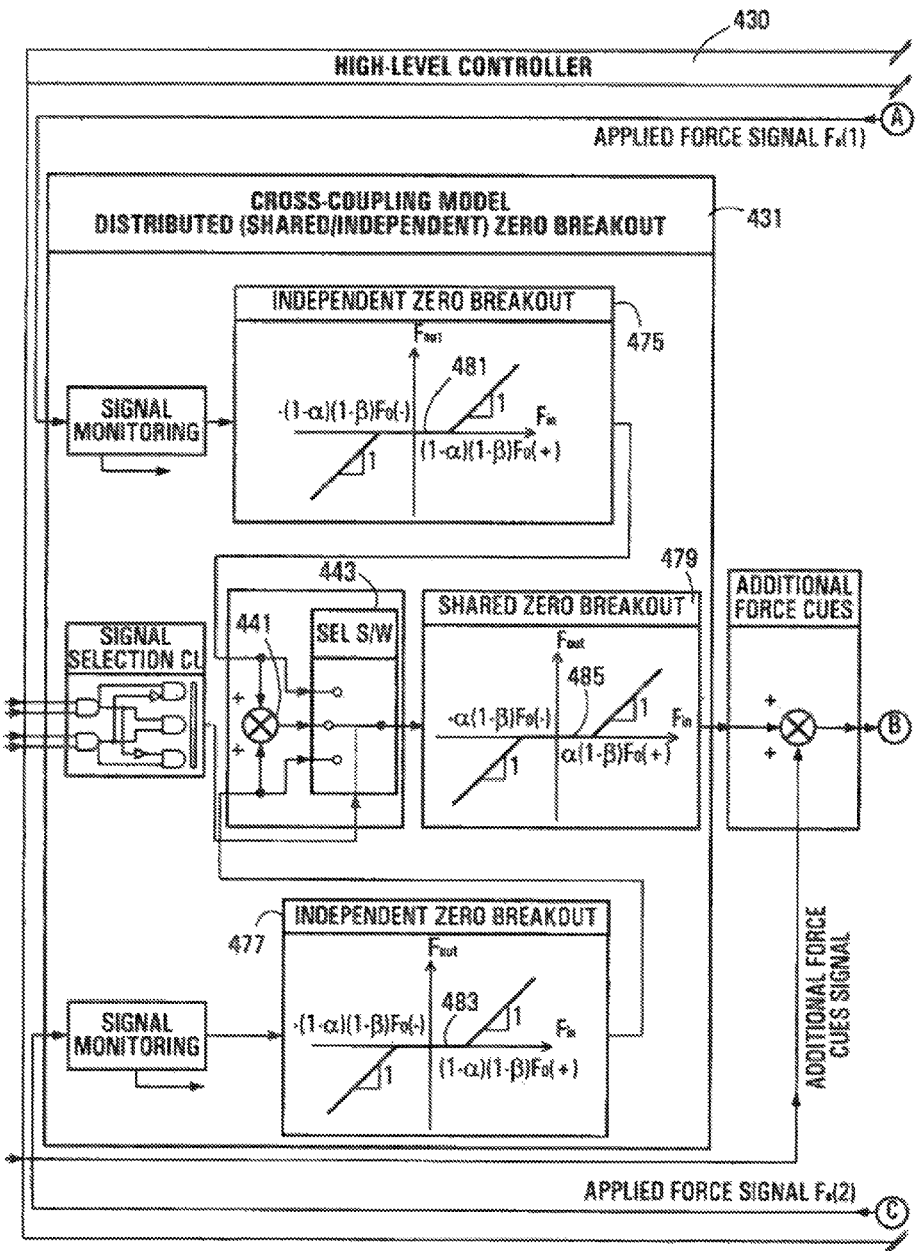
FIG. 19 shows a diagram of a high level controller according to another embodiment of the present invention.
Figure 19:
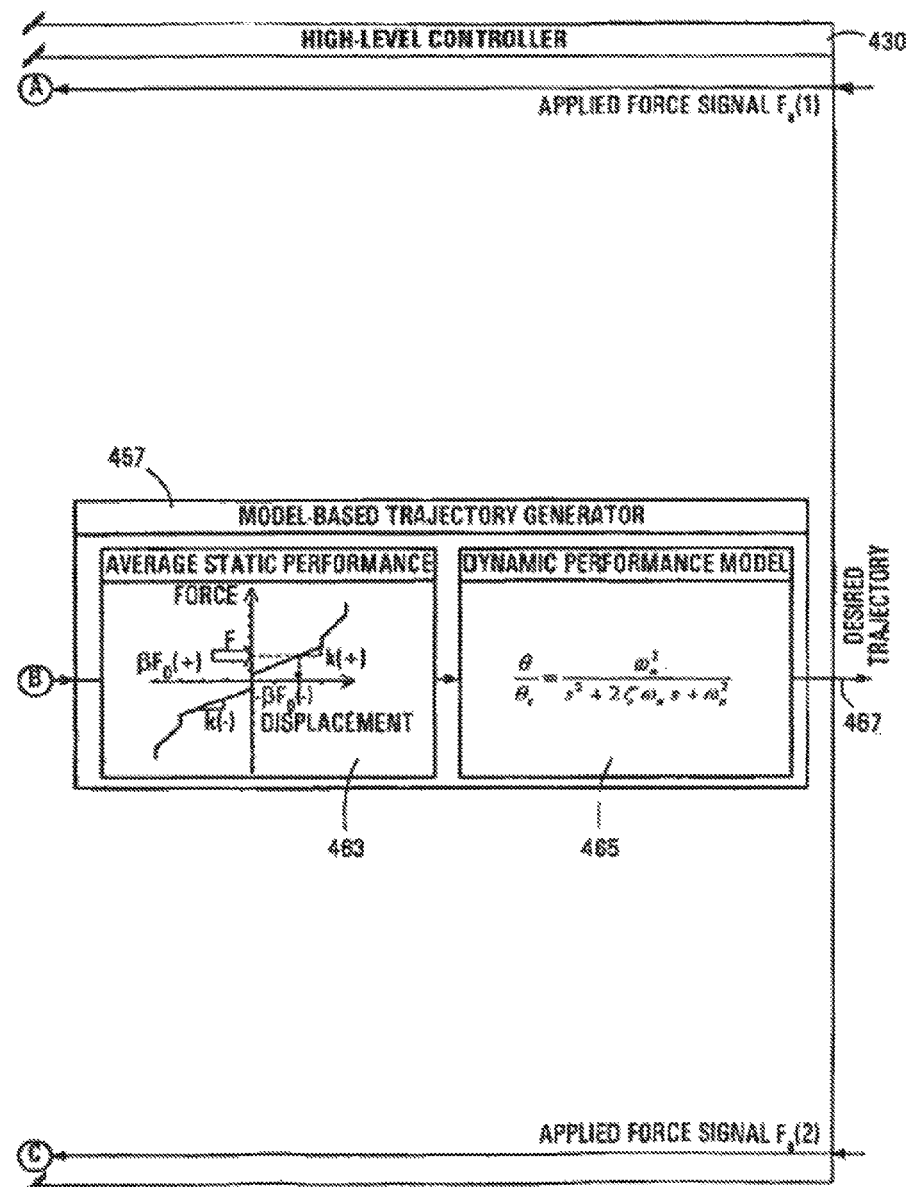

FIG. 19 shows a system 430 for controlling coupling between two control members and for generating a desired trajectory for controlling movement of the control members. The system is similar to that shown in FIG. 18, and like parts are designated by the same reference numerals.

The cross coupling controller 431 comprises a first zero breakout element 475 for implementing an independent zero breakout for a first control member, a second zero breakout element 477 for implementing an independent zero breakout for a second control member, and a third zero breakout element 479 for implementing a shared zero breakout. Each element defines the relationship between an I/P and O/P force for both positive and negative directions, and includes a deadband 481, 483, 485 in which the O/P force is zero from zero to a predefined threshold of I/P force in each direction, beyond which, the relationship between I/P and O/P force is 1:1, and are similar to the offset deadband element 207 of FIG. 11E.

The first and second elements 475, 477 each have an input for receiving an applied force signal indicative of a force applied to their respective control members, and an output for outputting the determined O/P force to the summer 441. The input of third element 479 is connected to the O/P of the switch 443, which selectively switches between the O/P of one of the first and second elements 475, 477 and the O/P of the summer 441.

The deadband range or zero breakout threshold I/P force in each element determines the degree of independent and shared zero breakout. If the breakout threshold in the third element 479 for one or both directions is zero, then the degree of shared breakout in that direction is zero. In this case, if the breakout threshold in the first and/or second elements is finite, then the respective control member will have an independent zero breakout. On the other hand, if the breakout threshold in the third element is finite in one or both directions, the zero breakout will be at least partially shared between the control members.

In this embodiment, the static performance model may or may not implement a shared zero breakout, and may define the degree of shared zero breakout with any additional force cues.

The zero breakout for the first and second elements may be expressed as:

$$(1-\alpha)(1-\beta)F_0$$

the zero breakout for the third element may be expressed as:

$$\alpha(1-\beta)F_0$$

the zero breakout in the static performance model may be expressed as:

$$\beta \cdot F_0$$

where $\alpha$ is the zero breakout sharing allocation coefficient between the control members and can take a value in the range of 0 to 1, and $\beta$ is the zero breakout allocation coefficient between the control members and the additional force cues, and can also take a value in the range of 0 to 1. Thus, if $\alpha=0$, the zero breakout for each control member is completely independent of the other, and if $\alpha=1$, the zero breakout for the control members is completely shared.

Similarly, if $\beta=0$, any zero breakout is completely removed from the additional force cues, and if $\beta=1$, the entire breakout, if any, is forced to be shared between the control members and additional force cues.

Figure 20:
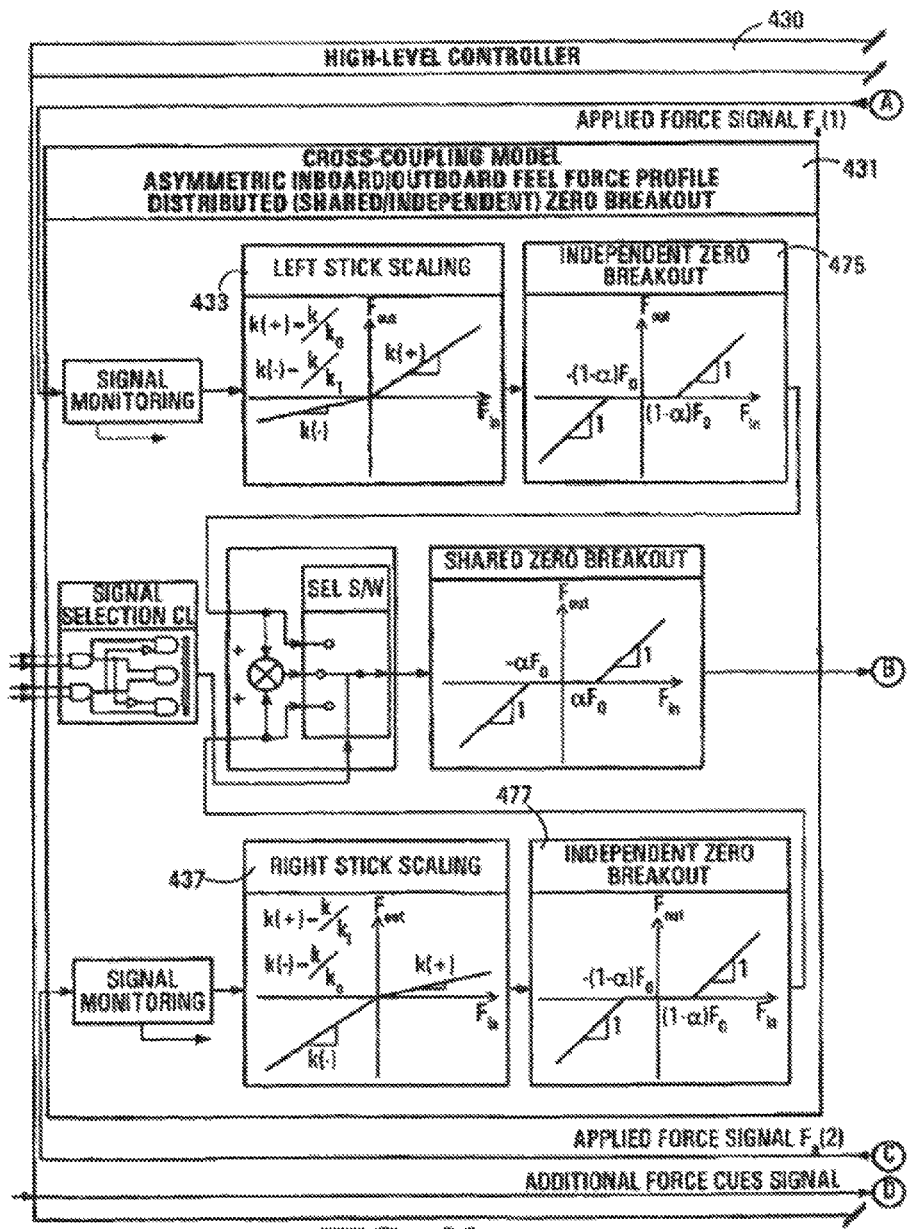
FIG. 20 shows a diagram of a high level controller according to another embodiment of the present invention.
Figure 20:
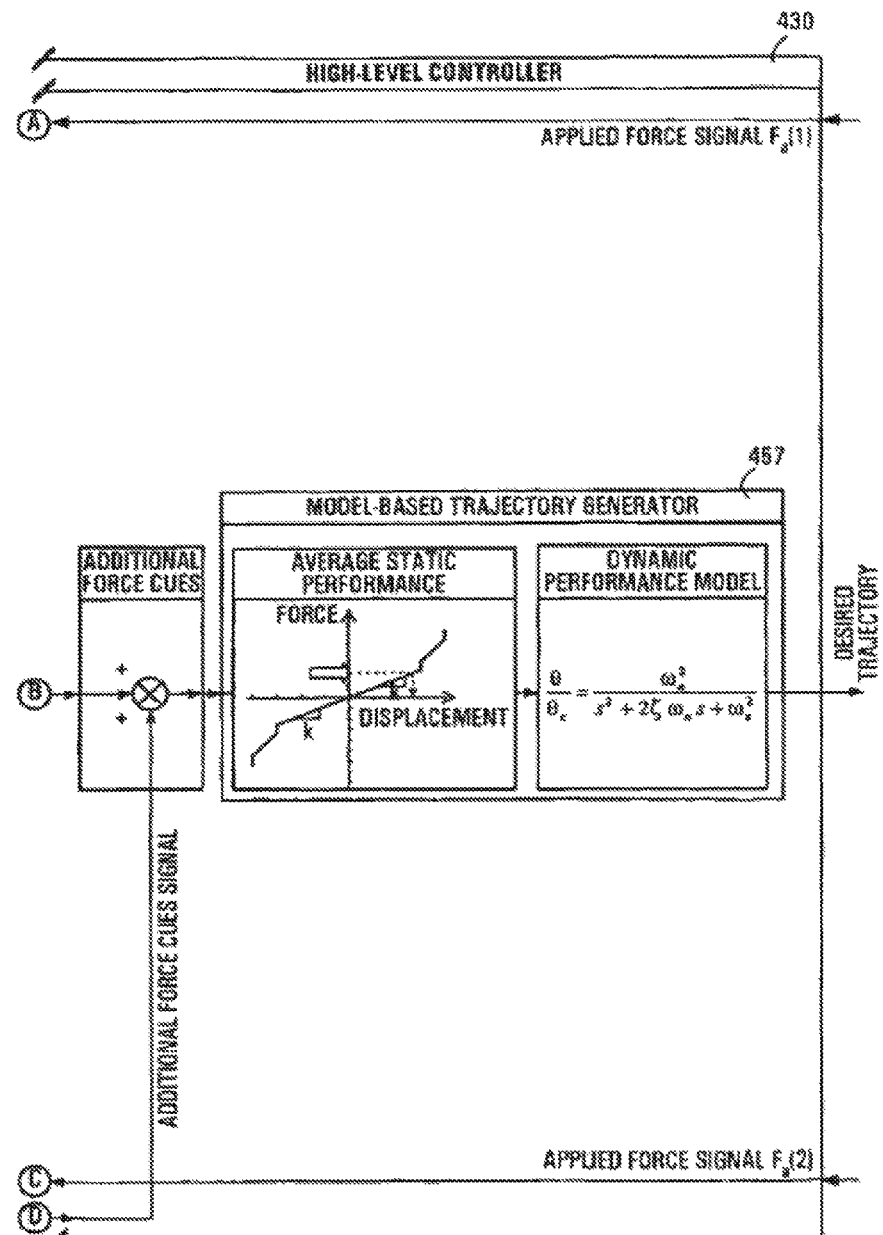

Independent and/or shared breakout and asymmetry in the feel force profile of coupled control members may be incorporated into embodiments of the present invention, and an example of a control system having this capability is shown in FIG. 20. The coupling control system 430 comprises a coupling controller 431 and a trajectory generator 457 and is similar to the coupling control systems shown in FIGS. 18 and 19, with like paths being designated by the same reference numerals. The coupling controller is similar to that shown in FIG. 19 and further includes a first asymmetric scaling element 433 for asymmetrically scaling the applied force signal associated with a first control member, depending on the direction of applied force, and a second asymmetric scaling element 437 for asymmetrically scaling the applied force signal associated with a second control member, depending on the direction of applied force. In this embodiment, the first and second asymmetric scaling elements 433, 437 are arranged to such that their outputs are passed to the first and second zero breakout elements 475, 477, respectively, although it will be appreciated, that in another embodiment, the order of one or both of the asymmetric scaling elements and zero breakout elements may be reversed so that an applied force signal is conditioned in a zero breakout element before asymmetric scaling element.

The values for the two coefficients $\alpha$ and $\beta$ may be chosen and fixed during the design of the system and the corresponding values of breakout may be hard coded. In another embodiment, the values of $\alpha$ and $\beta$ may be modified or varied depending, for example, on the operating conditions of the system being controlled. For example, the values of $\alpha$ and/or $\beta$ may be modified online, as a function as turbulence level to compensate for a force sensor that is not inertially balanced. Advantageously, embodiments of the present invention allow adjusting the zero breakout in a simple and consistent manner for various applications (e.g. for different types of aircraft or various other types of vehicle).

The following provides examples of benefits of various implementations associated with a zero breakout feature as may be employed in embodiments of the present invention in comparison with a mechanical system.

In a mechanically cross-coupled stick system, the zero breakout is shared between the two sticks. This means that the breakout seen by a second pilot is reduced by the amount of force applied by a first pilot. That is, the forces applied by the two pilots combine to override the zero breakout. This is referred to as shared zero breakout.

For example, if the zero breakout is of 1 lb and one pilot applies 0.5 lb to his stick, then the other pilot will only need to apply 0.5 lb to move the stick system away from the null displacement. Similarly, if the stick system has been moved out of detent by a first pilot, the second pilot will not experience a detent; as soon as he applies force to his stick, the stick system will move to a new displacement. This has the advantage of making the system very sensitive to the forces applied by either pilot. This enforces situation awareness, i.e. to provide to a first pilot tactile cues of the actions of the second pilot. This feature could be very useful in instructor/student scenario where it is useful for the pilots to feel what the other is doing (or not doing). However, this could also be annoying since, if a second pilot uses the buttons on the stick, for example the Push-To-Talk (PTT) button to communicate with the Air Traffic Control, the first pilot will feel the perturbations. Similarly, if a second pilot monitors the commands of a first one by putting his hand on his stick, then all the forces applied by this second pilot on his stick, however small, will be felt by the first pilot, and it will be annoying.

One aspect of the present invention allows a zero breakout to be applied individually and independently to each stick. This will be referred to as independent zero breakout. This has a number of advantages and would be difficult and complex to implement mechanically. Such a scheme offers many advantages. For example, the perturbation force due to a second pilot manipulating buttons on his stick, or following up the stick, up to a pre-determined value would not be transmitted to the first stick. Moreover, in case of accelerated flight, for example in turbulence, gusts, or significant g-level maneuvers, the system will prevent the stick from moving around, especially if the force sensors are not completely inertially balanced. However, this type of zero breakout reduces the sensitivity of the stick to the force applied by the other pilot.

It can be seen that the level and type of zero breakout required for a given application may be relatively complex. However, aspects of the present invention allow the implementation of a zero breakout of arbitrary value, and/or allow allocation of the zero breakout value in any proportion between shared and independent types. For single pilot operation, the nominal zero breakout will be felt by the pilot. Moreover, they can be easily adjusted in such a way that the pilots will feel the combined zero breakout as if it were symmetrical. Additionally, it is also possible to continuously allocate a fraction of the breakout so that it is also felt by the Additional Force Cues function.

Cross-Coupling Force Override

Another aspect of the present invention can provide a cross-coupling force override function, in which a differential force or force fight between two control members causes a differential displacement between the control members. In a conventional system, in which control members are mechanically coupled together, a decoupling mechanism is provided to allow the control member on one side to be dissociated from a jammed system on the other side so that the movable control member can be used to maintain control of the system.

A force fight situation exists when forces are applied to two coupled sticks simultaneously in opposite directions. If the forces are applied in the same direction, the forces help one another to displace the control members in the same direction, rather than fight the displacement. The inventors have found that the amount of fight force is the minimum of the absolute values of the applied forces given that they are applied in opposite directions. A force fight condition may lead to a difference in the positions of two control members and this difference in position is defined as the differential displacement.

Figure 21:
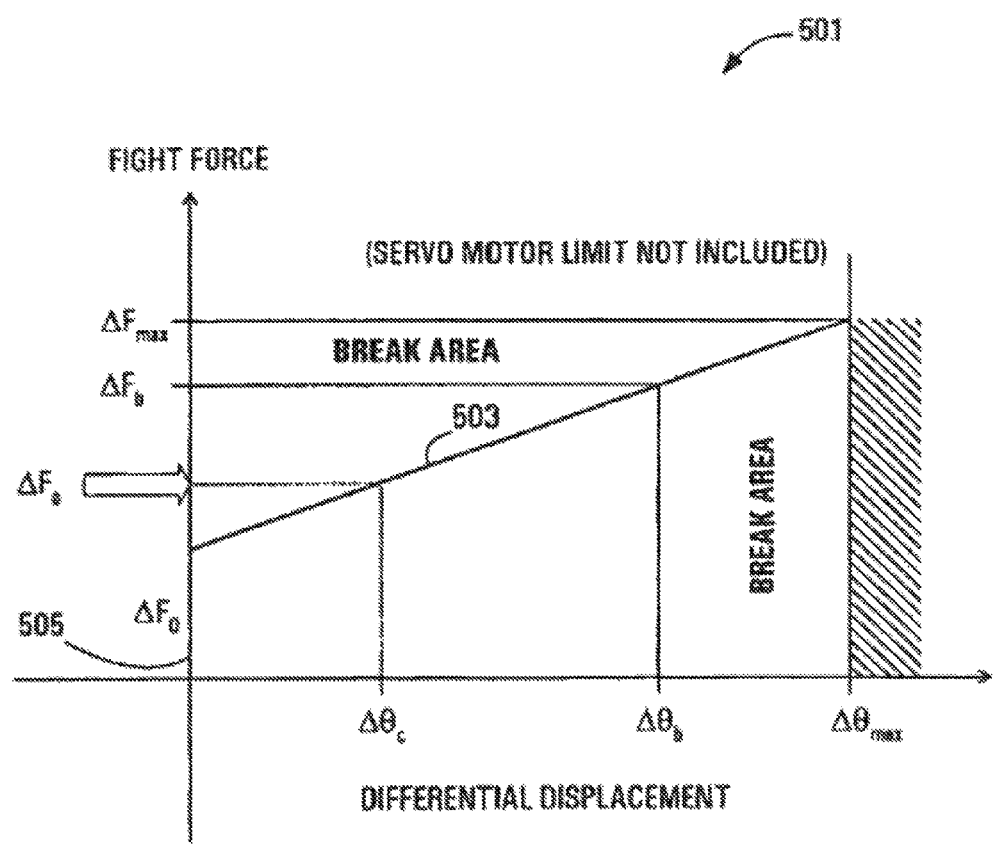
FIG. 21 is a graph illustrating the desired cross coupling force vs displacement characteristics for use in embodiments of the present invention.

FIG. 21 shows an example of the relationship between fight force and differential displacement for a cross coupled system, and is shown by the solid line 503, and has similarities to the force vs displacement relationship, described above. In this example, the fight force vs displacement relationship includes a zero breakout 505 which determines how much fight force must be applied to the control members before they begin to separate from one another. Following this zero breakout, the differential displacement between the two control members is proportional to the level of fight force, and is analogous to a system in which control members are connected mechanically through a spring. The spring stiffness, i.e. the slope of the curve may be chosen to be higher than the feel force gradient of the control members and the differential behavior may have a dynamic response in accordance with this higher stiffness.

The maximum differential displacement $\Delta\theta_{max}$ corresponds to the total range of travel of the control members, i.e. when one of the control members is at the limit of its travel in direction and the other is at the limit of its travel in the opposite direction. Therefore, at this limit, the application of additional fight force would not increase the differential displacement. A break point $\Delta\theta_b$ can be defined somewhere between 0 and maximum differential displacement, and corresponds to a breakpoint fight force $\Delta F_b$. The cross-coupling may be disabled when the breakpoint is attained. A force fight monitor could be used to detect a condition where the fight force has reached a predetermined threshold, and the monitor could trigger a fader for decoupling the control member in response to the condition. The fader may be similar to that described above in connection with the Autopilot Force Override.

Figure 22:
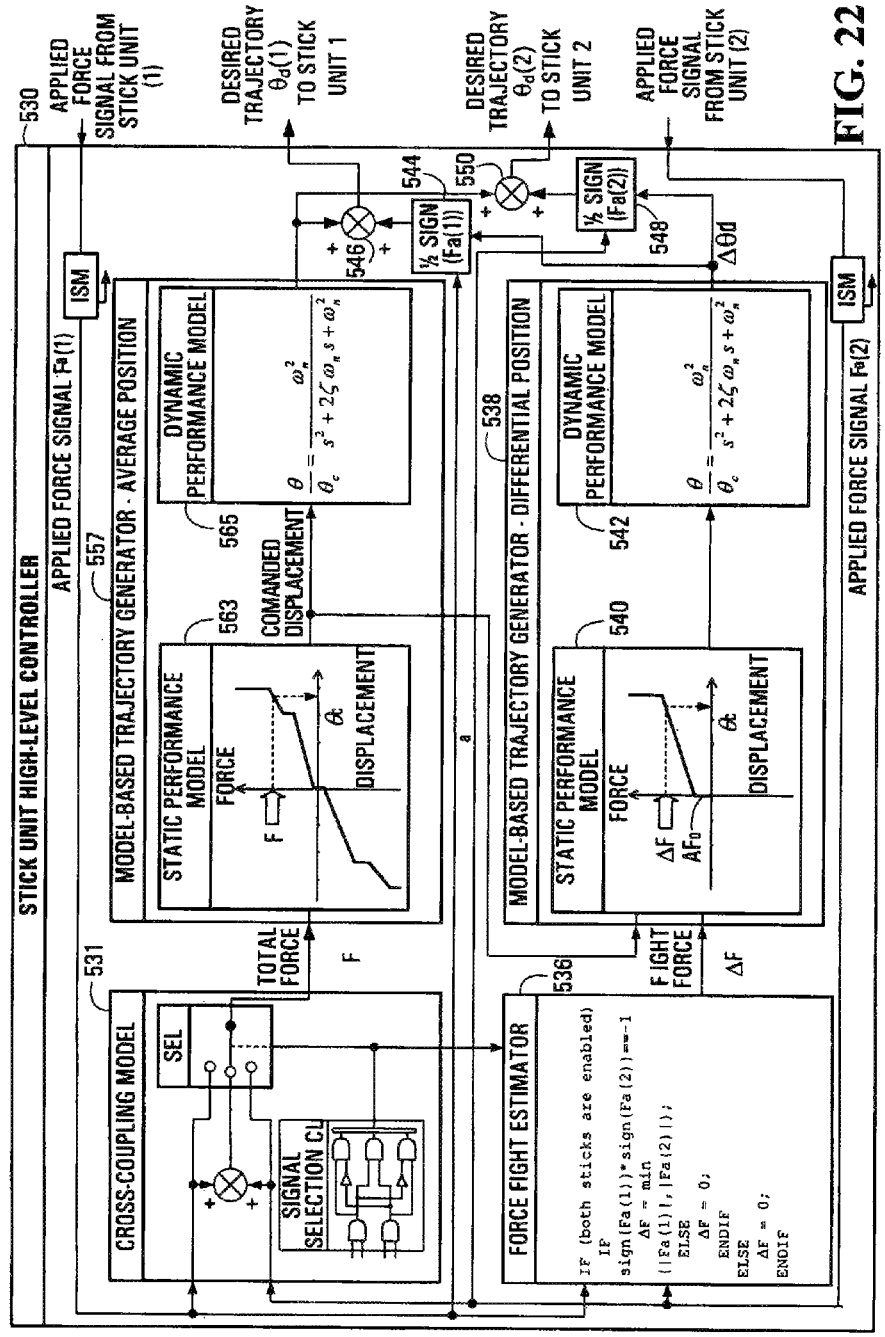
FIG. 22 shows a diagram of a high level controller according to another embodiment of the present invention.

An example of an embodiment of a coupling system which is capable of controlling the separation between coupled control members depending on the level of fight force between the control members is shown in FIG. 22.

Referring to FIG. 22, the system 530 comprises a coupling controller 531, a first trajectory generator 557, a force fight estimator 536 and a second trajectory generator 538. The cross coupling controller 531 provides a force signal which is the sum of the applied force signals associated with first and second control members and may be adapted to provide asymmetric feel force and/or independent or shared zero breakout as for the embodiments described above. The first trajectory generator 557 comprises a static performance model 563 for determining a commanded displacement, $\theta_c$, for the control members based on the force signal from the coupling controller 531, and a dynamic performance model 565 for generating a desired trajectory, $\theta_d$, for the control members, and the first trajectory generator 557 may for example comprise any of the trajectory generators described above.

The force fight estimator 536 is adapted to determine whether a force fight exists between the two control members (i.e. forces are applied in opposite directions) and if a force fight condition is detected, the value of the force fight $\Delta F$ is determined as the minimum of the absolute value of two applied forces, and in this case outputs the value of the force fight $\Delta F$.

The second trajectory generator is adapted to determine the value of a desired differential trajectory $\Delta\theta_d$ based on the fight force determined by the force fight estimator 536. In this embodiment, the second trajectory generator 538 comprises a static performance model 540 which defines a relationship between fight force $\Delta F$ and differential displacement $\Delta\theta_c$, as for example shown in FIG. 21, and a dynamic performance model 542 which determines a desired differential trajectory from the commanded differential displacement $\Delta\theta_C$. The dynamic performance model 542 may either be the same as or different from the first dynamic performance model 565.

The system further comprises a first multiplier (or divider) 544 for determining half the value of the desired trajectory $\Delta\theta_d$ and applying the sign of the force applied to the first control member, and for passing the resultant value to a summer 546 to be summed with the desired trajectory $\theta_d$ from the dynamic performance model 565 to produce a desired trajectory $\theta_d(1)$ for the first control member. Similarly, the system further includes a means (e.g. multiplier or divider) 548 for determining the value of half the differential desired trajectory $\Delta\theta_d$ and for applying the sign of the force applied to the second control member to this value, and for passing the determined value to a summer 550 for summation with the desired trajectory $\theta_d$ from the trajectory generator 557 to provide a value of the desired trajectory $\theta_d(2)$ for the second control member.

Figure 23:
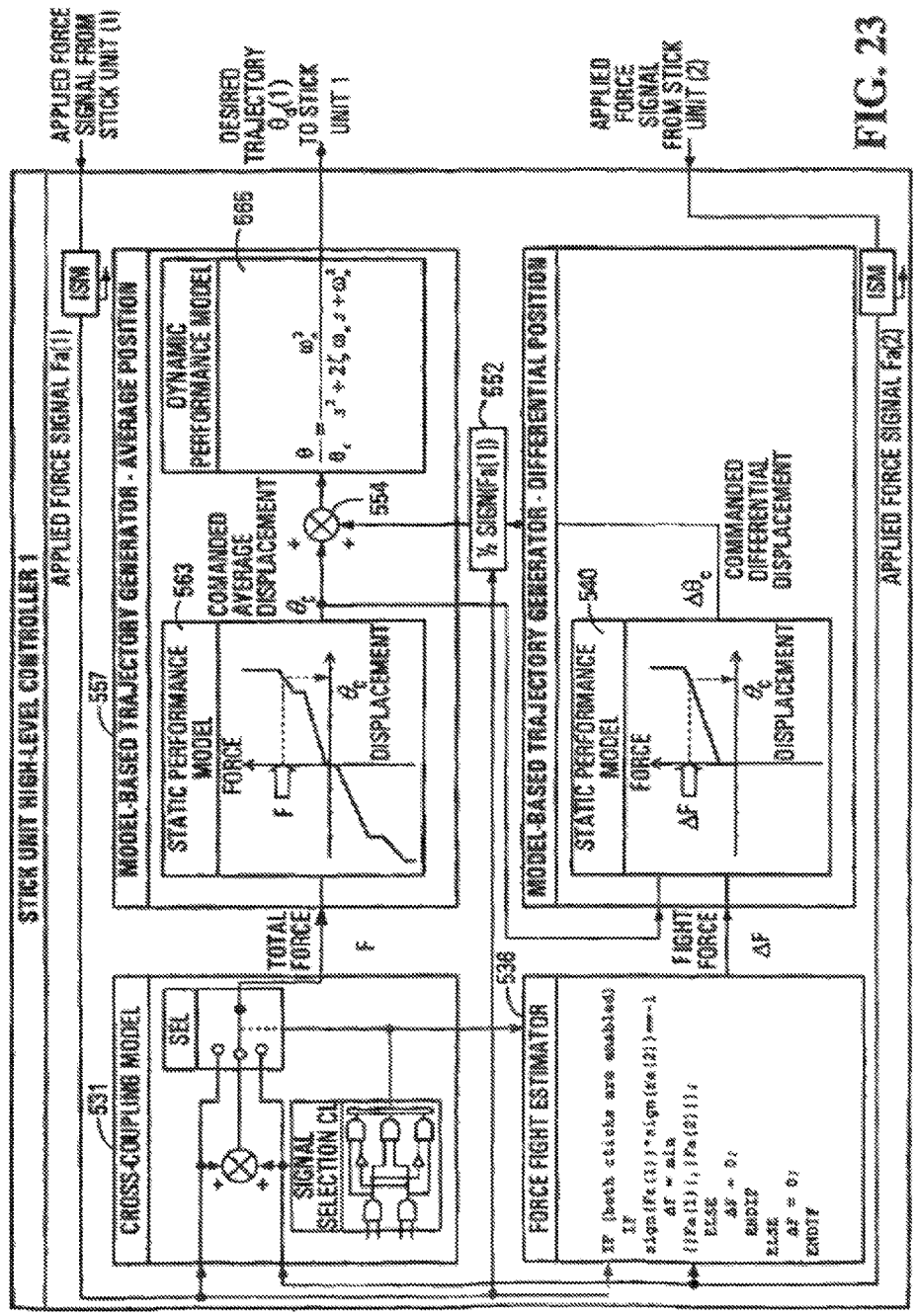
FIG. 23 shows a diagram of a high level controller according to another embodiment of the present invention.

FIG. 23 shows another embodiment of a system which is capable of controlling differential displacement between two control members in response to a force fight condition. This embodiment is similar to that shown in FIG. 22, and like parts are designated by the same reference numerals. The main difference between this embodiment and that shown in FIG. 22, is that the desired trajectory for a control member is determined by the dynamic performance model 565 of the first trajectory generator 557 from the commanded average displacement $\theta_c$ determined by the first static performance model 563 and the commanded differential displacement $\Delta\theta_c$ determined by the differential position static performance model 540. The system includes means for determining half the value of the commanded differential displacement $\Delta\theta_c$ and for applying the sign of the force applied to a control member and a summer 554 for summing the resulting value with the commanded average displacement $\theta_c$, the sum being used by the dynamic performance model 565 to determine the desired trajectory for the control member. In another embodiment, a desired trajectory signal which is modified to include a differential displacement may be provided in a similar manner to a second control member.

Figure 24:
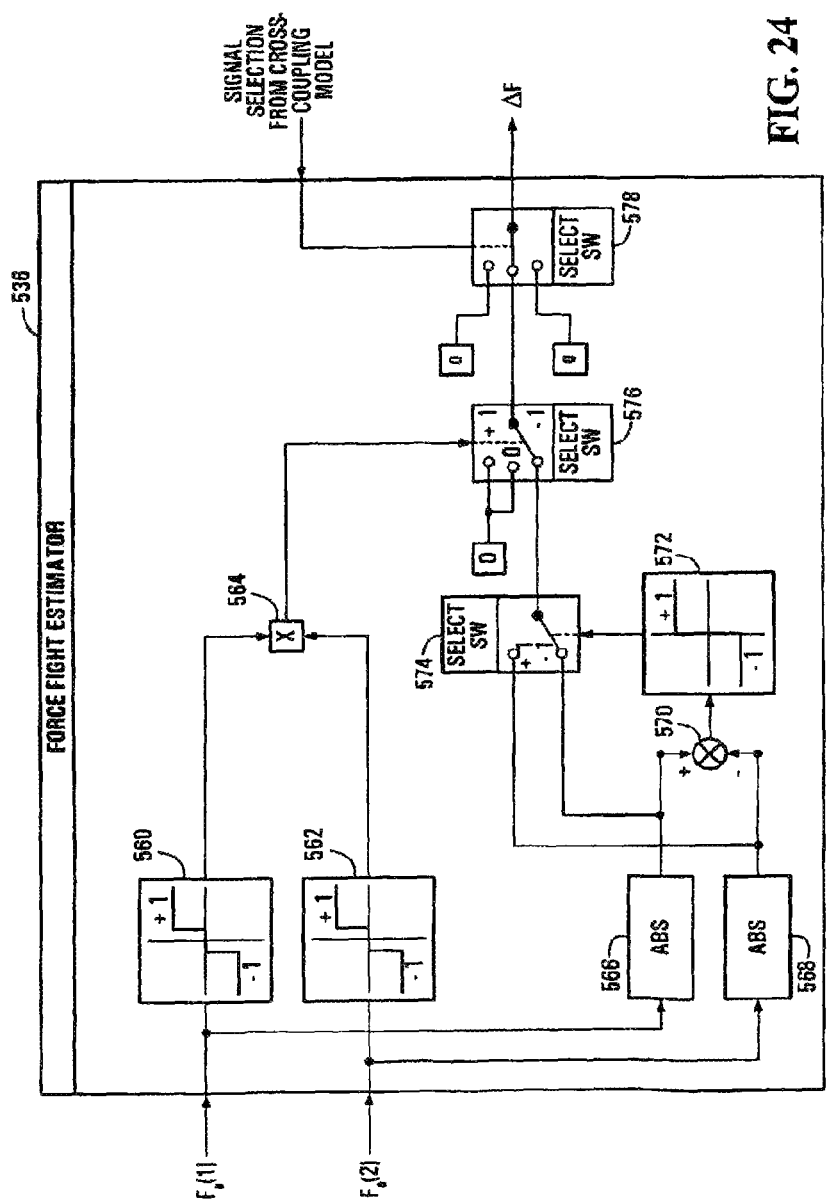
FIG. 24 shows a diagram of a force fight estimator according to an embodiment of the present invention.

In one embodiment, the description of the force fight estimator is provided in the form of pseudo-code, as for example shown in FIGS. 22 and 23. Another embodiment of a force fight estimator is shown in FIG. 24. Referring to FIG. 24, the force fight estimator 536 comprises first and second detectors 560, 562 for detecting the sign of the applied force signals $F_a(1)$ and $F_a(2)$ associated with first and second control members and for outputting a value of +1 if the sign of the applied force signal is positive and a value of −1 if the sign of the applied force signal is negative, a multiplier 564 for multiplying the output values of the first and second detectors 560, 562. In this example, the first and second detectors have a threshold around zero and the applied force signals $F_a(1)$ and $F_a(2)$ must be sufficiently different from zero to consider a force fight situation. The estimator 536 has third and fourth detectors 566, 568 for determining the absolute values of the applied force signals, a summer 570 for determining the difference between the absolute values of the first and second applied forces and a fifth detector 572 for detecting the sign of the difference. The estimator 536 further includes a first selector switch 574 which selects as its output the lesser of the two absolute values of applied force under the control of the fifth detector 572, a second selector switch 576 which is operative to select as its output the value ΔF output from the first selector switch 574 if the product from the multiplier 564 is −1, or 0 if the product is 0 or +1, and an optional third selector switch 578 which is operative to output the value ΔF or 0 in response to a selection control signal, for example from the cross coupling controller.

Other embodiments of the force fight estimator may be implemented by any other suitable means and in any other suitable configuration.

In a mechanical system, cross coupling breakout depends on the position of a control member. Part of the force applied to a control member in a mechanical system is necessarily transferred to the second control member through the connecting tube. This force is required to move the second control member against its mechanical feel system. Therefore, except for zero displacement, the connecting tube is always in force fight. The tube may contain a pre-stressed spring to provide a threshold below which no control member would occur but above which separation would occur in preparation for the force fight. The level of fight force increases with position and follows the normal feel force profile of a control member, the total feel in a mechanical system normally being distributed equally between both control members. Consequently, the cross-coupling breakout decreases as a function of displacement. Embodiments of the present invention may either be arranged such that the cross-coupling breakout threshold is independent of control member position, or may be adapted to simulate mechanical behavior by making the breakout threshold a function of the average commanded displacement, or has a function of the desired displacement. An example of the former implementation is shown in FIGS. 22 and 23, in which the average command displacement $\theta_c$ determined by the first static performance model 563 is passed to the second static performance model 540 which may be adapted to use the average commanded displacement to vary the value of the cross coupling breakout force $\Delta F_0$.

The cross-coupling override function can be expressed as a change of variables from the individual displacements $\theta(1)$ and $\theta(2)$ of the control members, corresponding to applied forces $F_a(1)$ and $F_a(2)$ on the control members to the average displacement $$\frac{\theta(1) + \theta(2)}{2}$$

and differential displacement $$\frac{\theta(1) - \theta(2)}{2}$$

corresponding to the total applied force $F_a(1)+F_a(2)$ and fight force (very) approximately $F_a(1)-F_a(2)$.

Cross-Coupling Fade-In/Fade-Out

Embodiments of the present invention may include a means for gradually decoupling or recoupling two control members in order to avoid a sudden or abrupt change in the displacement of one control member in response to it being decoupled or recoupled to the other control member when a force is applied to both control members.

The trajectory for the first control member may be determined by the applied force on the first control member when not coupled and by the sum of the applied forces on the first and second control members, when coupled. The situation for the second control member is symmetric. Therefore, the driving forces for the first and second control members, respectively, are:

Control Member 1: $F_a(1)+\gamma F_a(2)$ where γ is valued on the interval [0, 1]. A value of 0 corresponds to uncoupled sticks, a value of one to cross-coupled sticks, and a value between these extremes reflects a partial cross-coupling.

Control Member 2: $F_a(2)+\gamma F_a(1)$

In an embodiment of this aspect of the present invention, the parameter γ is gradually changed from a value of 1 to a value of 0 when a cross-coupling force override break signal is set or when the cross-coupling is broken from the Control Side Select Switch, an example of which is described below, with reference to FIGS. 27A and 27B, a time constant may be used to determine the rate at which cross-coupling disappears, as described below with reference to FIG. 25.

Figure 25:
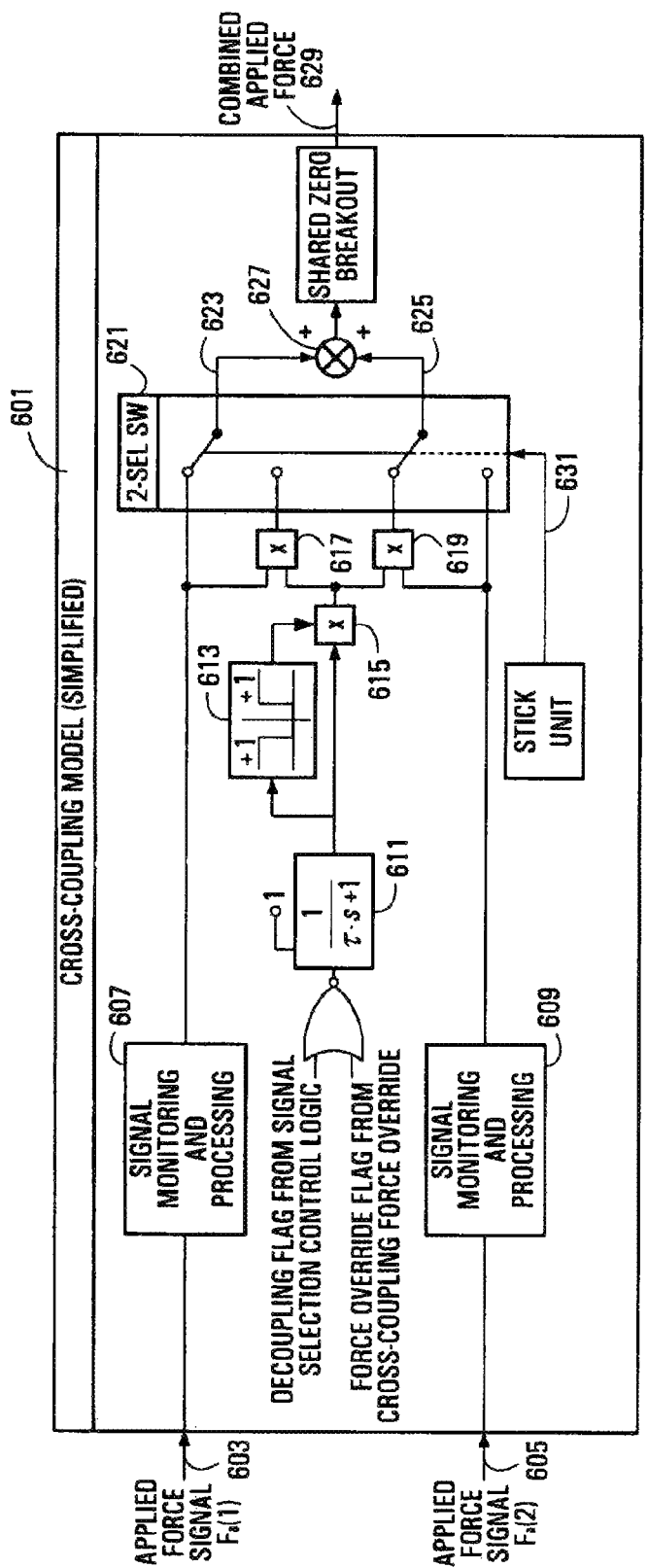
FIG. 25 shows a cross-coupling controller according to another embodiment of the present invention.

An example of a means for providing gradual decoupling between different control members is shown in FIG. 25, and in this embodiment, is implemented as part of a cross-coupling controller. Referring to FIG. 25, the cross-coupling controller 601 comprises first and second inputs 603, 605 for receiving applied force signals $F_a(1)$ and $F_a(2)$, respectively. The cross-coupling controller may optionally include signal monitoring and processing means 607, 609 for monitoring and/or processing the first and second applied force signals, respectively. The cross-coupling controller further includes a function block 611 which gradually changes the value of γ from one to zero when the input is discretely changed from one to zero. A condition where γ equals one provides complete coupling and a condition where γ equals zero provides complete decoupling. The coupling controller further includes a threshold block 613 which forces the value of γ determined by the function block 611 to zero when the value of γ is sufficiently close to zero. A first multiplier 615 is provided for multiplying the output from the function block 611 with the output from the threshold block 613 to provide an output corresponding to the value of γ. Second and third multipliers 617, 619 for multiplying the first and second applied force signals 603, 605, respectively by γ. The coupling controller further includes a selector switch 621 for selecting as a first output 623 between the output of the second multiplier 617 and the first applied force signal, and for selecting as a second output 625 between the product of the third multiplier 619 and the second applied force signal 605. A summer 627 is provided for summing the first and second outputs 623, 625 to provide a combined applied force signal 629. The selector switch may be controlled by a signal 631 initiated from a control member or any other source.

With certain modifications, the embodiment may be used for recoupling. In another embodiment, a system which is similar to the fade-in/fade-out system used for autopilot coupling and decoupling, described above may be used.

Flight Control

Figure 26:
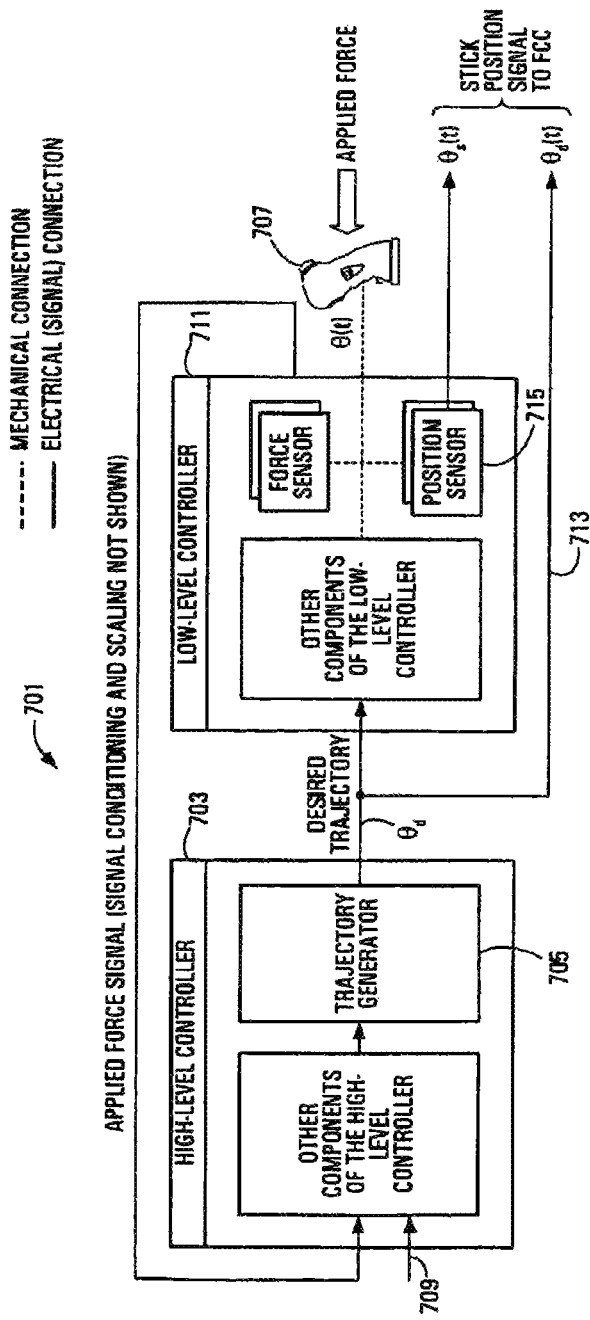
FIG. 26 shows a block diagram of an apparatus for controlling movement of a control member, according to another embodiment of the present invention.

In a conventional fly-by-wire flight control system, the flight control computer (FCC) derives operator originating flight control signals from position sensors which detect the position of the control lever, e.g. manual control lever or pedal. According to one aspect of the present invention, the flight control signal for the flight control computer comprises the desired trajectory generated by the trajectory generator, which may be determined from an operator force applied to a control member or from another source such as another computer or processor, for example an autopilot. An example of an embodiment of a system in which the desired trajectory may be used as the flight control signal is shown in FIG. 26. The system 701 comprises a high level controller 703 having a trajectory generator 705 for generating a desired trajectory $\theta_d$ which may be based on a force applied to a control member 707 and/or another signal 709. The high-level controller 703 may optionally further include other components which implement functions such as a asymmetry, independent or shared breakout, cross coupling and force override, examples of which are described above. The system 701 has a low-level controller 711 for driving movement of the control member 707 according to the desired trajectory $\theta_d$. The system includes a bus 713 or other transmission means for transmitting the desired trajectory to an actuator controller, such as a flight control computer (not shown) and a position sensor 715 for detecting the position of the control member 707 and for transmitting the sensed position also to the actuator controller (e.g. flight control computer). The desired trajectory $\theta_d$ may comprise a sequence of position values as a function of time and may further include time derivatives of position such as rate (velocity), acceleration and other higher order derivatives of position. Thus, in the present system, the full trajectory is not generated once, but constitutes a sequence of single positions generated at specific times, so that the trajectory is the set of such positions generated as time progresses.

This aspect of the present invention exploits the fact that the actual trajectory of the control member $\theta(t)$ and the measured trajectory $\theta_s(t)$ of the control member is essentially equal to the desired trajectory $\theta_d(t)$ of the control member assuming that the low-level controller 711 accurately tracks the designed trajectory generated by the trajectory generator 705. Thus, under normal circumstances, either of the two signals could be used as the control signal for the actuator controller.

In the case of a jam of the control member, or of any other causes preventing its motion or providing inaccurate control member motion, a desired trajectory may still be generated by the HLC based on the force applied to the control member, and/or possibly some other signal. However, the control member would not follow the desired trajectory. In this case, if the measured control member position were used as a control signal, the system could not be controlled.

A monitor may be provided to detect a failed control member. For example, the desired trajectory $\theta_d(t)$ and measured actual trajectory $\theta_s(t)$ may be within a pre-specified tolerance consistent with the normal performance of the system, and a difference between these parameters may be monitored. Consistency between the applied force and measured position of a control member and/or server motor torque may also be monitored. The detection threshold for a possible failure condition may be quite small if based on a comparison between the two trajectories, i.e. position as a function of time, which may be tracked very precisely. In contrast, former systems cannot make such a comparison and a threshold may be significantly larger and therefore may take more time for the detection of a failed system.

In one embodiment, the system may be reconfigured to make an actuator control system use the desired trajectory in lieu of the measured trajectory. For example, in such a situation, an operator would still be able to control the system (e.g. aircraft) by applying force to the control member but the control member would not move in response to the applied force.

Advantageously, this arrangement may allow the number of position sensors to be reduced. As a default condition, the desired trajectory from the trajectory generator may be used by the actuator controller and a position signal from a position sensor need only be used if the desired trajectory cannot be trusted.

This arrangement may also be implemented such that the definition of the desired trajectory for controlling the low level controller is different from that used in the actuator controller. The desired trajectory for the low level controller may be modified by autopilot and/or cross-coupling force override differential trajectories, as well as other tactile cues. In so doing, some of the tactile cues which may be provided to an operator to assist in controlling the system would not affect the commands used by the actuator controller.

This arrangement may be applied to a single control member system or a system having two or more coupled controlled members.

Control Side Select Switch

The Control Side Select Switch is a manual switch allowing the pilot to deselect a stick to prevent the corresponding displacement command signals to be used in the flight control computer for flying the aircraft. FIG. 27 shows part of the redundant flight control system architecture related to the stick displacement commands and Control Side Select Switch.

Figure 27A:
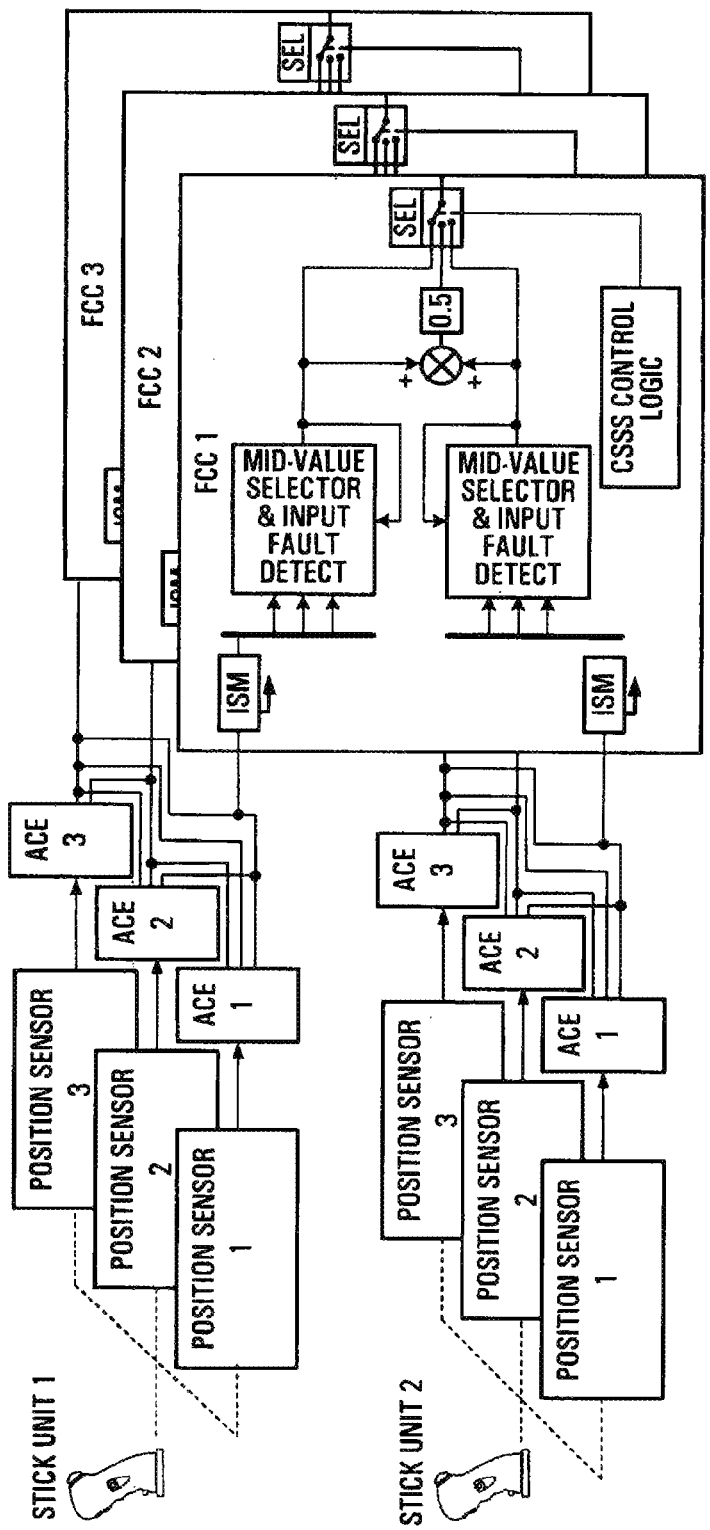
FIGS. 27A and 27B are schematic diagrams illustrating the position signal architecture and the impact of a control side select switch (CSSS) on the commands sent and used by flight control computers and on the system re-configuration following the use of the CSSS. Both flight control system normal and direct modes of operation are illustrated.
Figure 27B:
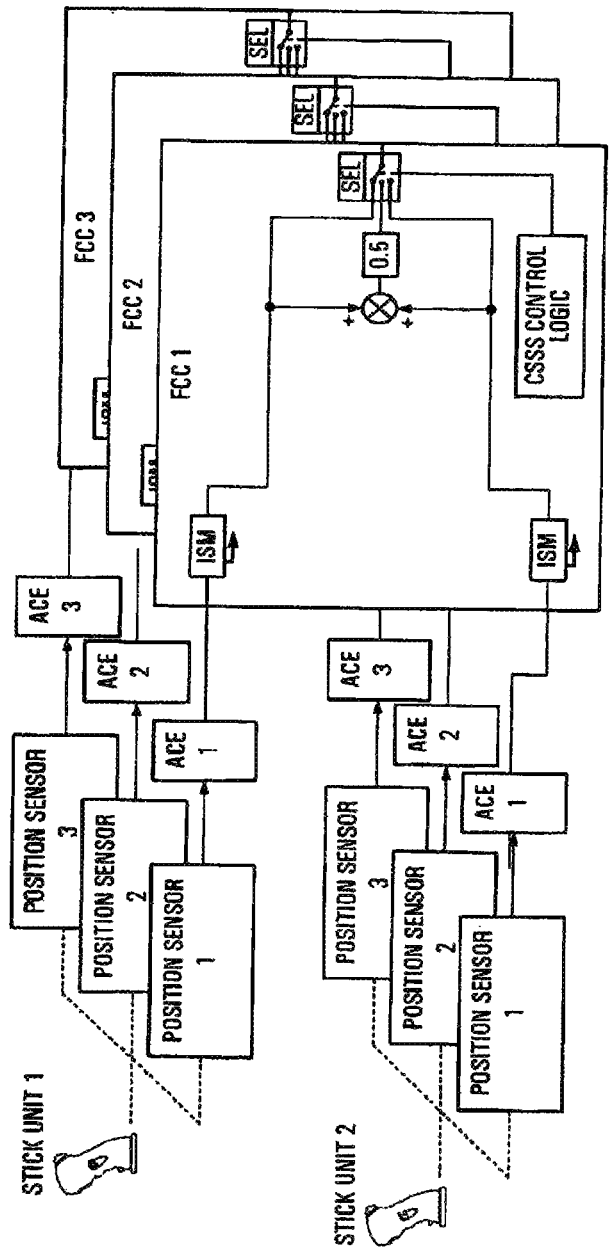

FIG. 27a shows the signal flow path in the flight control system NORMAL mode. FIG. 27b shows the same but for the DIRECT mode.

The Control Side Select Switch signal also controls the behavior of some of the functions in the stick unit High-Level Controller as could be seen from the various figures. Finally, the signal from the Control Side Select Switch can be used to remove power from the de-selected stick, and therefore forces de-coupling of the two sticks. In this case, the applied force signal of the disabled stick should normally be disabled.

Further aspects of the present invention include the combination of any two or more features described herein.

Modifications to embodiments of the present invention will be apparent of those skilled in the art.

What is claimed is:

1. An apparatus fir controlling coupling between first and second force-activated control members, comprising:
    a first sensor connected to the first control member, wherein the first sensor senses a first value of a parameter indicative of a first force applied to the first control member and generates a first force signal;

a second sensor connected to the second control member, wherein the second sensor senses a second value of a parameter indicative of a second force applied to the second control member and generates a second force signal;

a first high level controller comprising a first trajectory generator in communication with the first sensor and the second sensor for receiving the first force signal and the second force signal and generating trajectory signal data based at least in part on a combination of the first force signal and the second force signal;

a first drive controller connected to the first control member, wherein the first drive controller moves the first control member responsive to the trajectory signal data; and a second drive controller connected to the second control member, wherein the second drive controller moves the second control member responsive to the trajectory signal data.

2. The apparatus of claim 1, wherein the trajectory signal data comprises a common trajectory signal that is provided to the first drive controller and the second drive controller, such that movement of the first control member and the second control member are responsive to the common trajectory signal.

3. The apparatus of claim 1, wherein the trajectory signal data comprises a first trajectory signal and a second trajectory signal different from one another, the first drive controller moves the first control member responsive to the first trajectory signal; and the second drive controller moves the second control member responsive to the second trajectory signal.

4. The apparatus of claim 1, wherein the first high level controller further comprises a first coupling controller connected to the first sensor and the second sensor, wherein the first coupling controller receives the first force signal and the second force signal and generates a first coupling control signal based on a combination of the first force signal and the second force signal, and wherein the first trajectory generator generates the trajectory signal data based on the first coupling control signal.

5. The apparatus of claim 1, wherein the first trajectory generator further comprises:

a static performance model that generates a commanded displacement signal from at least the first force signal and the second force signal; and a dynamic performance model that generates the trajectory signal data from at least the commanded displacement signal.

6. The apparatus of claim 1, wherein the first force signal is fed back to the first drive controller and the second three signal is fed back to the second drive controller to negate operator applied forces to the first control member and the second control member, respectively.

7. The apparatus of claim 4, further comprising:

a summer connected between the first coupling controller and the first trajectory generator to modify the first coupling control signal by adding additional force cue signals.

8. The apparatus of claim 1, wherein the first trajectory generator further receives additional force cues, the trajectory signal data being generated at least in part on a basis of the additional force cues, the first force signal and the second three signal.

9. The apparatus of claim 4, further comprising a selector switch that receives the first force signal and the second force signal as input and permits selection, as output, of the first force signal, the second force signal, or the sum of the first force signal and the second force signal.

10. The apparatus of claim 9, further comprising a switch controller that controls a state of the selector switch, summing at least the first force signal and the second force signal when the first force signal and the second force signal are valid, passing only the first force signal if only the first force signal is valid, passing only the second three signal if only the second force signal is valid, and passing neither the first force signal nor the second force signal when neither signal is valid.

11. The apparatus of claim 10, wherein the switch controller that controls a state of the selector switch also receives at least one of first and second selector signals indicative of a state of an operator-controlled switch associated with the first and second control members.

12. The apparatus of claim 1, further comprising:

a second high level controller comprising a second trajectory generator in communication with the first sensor and the second sensor for receiving the first force signal and the second force signal, for generating, independently of the first high level controller, the trajectory signal data;

wherein the first drive controller is in communication with the first high level controller for receiving the trajectory signal data; and wherein the second drive controller is in communication with the second high level controller for receiving the trajectory signal data.

13. The apparatus of claim 1, wherein both the first force sensor and the second force sensor comprise a plurality of sensor.

14. The apparatus of claim 13, wherein:

the first force signal comprises at least one of a pitch axis component and a roll axis component, and the second force signal comprises at least one of a pitch axis component and a roll axis component.

15. The apparatus of claim 5, wherein:

the static performance model at least partially generates the commanded displacement signal based on a feel force profile.

16. The apparatus of claim 15, wherein the feel force profile is an average profile of positive and negative asymmetric profiles based on right hand side and left hand side positioning of at least one of the first control member and second control member.

17. The apparatus of claim 15, wherein:

the static performance model at least partially generates the commanded displacement signal based on the feel force profile and at least one of the first force signal and second force signal that has been scaled according at least one scaling element.

18. The apparatus of claim 15, wherein the feel force profile concerns at least one of roll and pitch.

19. The apparatus of claim 4, wherein the coupling controller comprises:

a first scaling element that receives the first force signal and defines a first output force as a function of a first input force, and a second scaling element that receives the second force signal and defines a second output force as a function of a second input force, wherein the first coupling control signal comprises a combination of the first output force and the second output force.

20. The apparatus of claim 4, wherein the first coupling controller comprises:
a first independent breakout element for receiving the first force signal and generating a first independent signal with zero breakout, and
a second independent breakout element fir receiving the second force signal and generating a second independent signal with zero breakout,
wherein the first coupling control signal comprises a combination of the first independent signal with zero breakout and the second independent signal with zero breakout.

21. The apparatus of claim 20, wherein the first coupling controller further comprises:
a shared zero breakout element that receives the first independent signal with zero breakout, the second independent signal with zero breakout, or a sum of the first independent signal with zero breakout and the second independent signal with zero breakout.

22. The apparatus of claim 21, further comprising:
a summer connected between the first coupling controller and the first trajectory generator to modify the control signal by adding additional force cue signals.

23. The apparatus of claim 20, wherein the first coupling controller comprises:
a first scaling element that receives the first force signal prior to the first force signal being applied to the first independent breakout element, and
a second scaling element that receives the second force signal prior to the second force signal being applied to the second independent breakout element.

24. The apparatus of claim 21, wherein:
a first value distributes the zero breakout between the first and second independent breakout elements and the shared zero breakout element.

25. The apparatus of claim 22, wherein:
a second value allocates at least a portion of the zero breakout to the additional force cues.

26. The apparatus of claim 24, wherein:
a second value also allocates at least a portion of the zero breakout to the additional force.

27. The apparatus of claim 4, further comprising:
an override to disable the coupling controller.

28. The apparatus of claim 27, wherein the first trajectory generator further comprises:
a static performance model that generates a commanded displacement signal from the first coupling control signal, and
a dynamic performance model that generates the trajectory signal data from at least the commanded displacement signal.

29. The apparatus of claim 28, further comprising:
a force fight estimator that receives the first force signal and the second force signal and determines if a force fight exists on a basis of a three being applied to the first control member and a force applied to the second control member.

30. The apparatus of claim 29, wherein the force fight estimator generates a force fight signal as a function of a minimum of an absolute value of the first force signal and the second force signal when the first force signal and the second force signal are enabled and opposite in direction.

31. The apparatus of claim 29, further comprising a differential trajectory generator comprising:
a static performance model that receives the force fight signal and applies a zero breakout region until the force fight signal reaches a first predetermined value, the static performance generator generating a commanded differential displacement signal; and
a dynamic performance model that generates a differential displacement trajectory signal from the commanded differential displacement signal when the force fight signal exceeds the first predetermined value.

32. The apparatus of claim 31, wherein the differential displacement trajectory signal is combined with trajectory signal data prior to being provided to at least one of the first drive controller and the second drive controller.

33. The apparatus of claim 30, wherein the force fight estimator causes the first coupling controller to decouple the first control member and the second control member if the force fight signal exceeds a second predetermined value.

34. The apparatus of claim 33, wherein the force flight estimator causes decoupling via a selector switch within at least one coupling controller.

35. The apparatus of claim 34, further comprising:
a fader to transition from the trajectory signal data being consistent with the first coupling control signal, to the trajectory signal data being consistent with one of either of the first force signal and the second force signal after the force fight estimator has caused decoupling.

36. The apparatus of claim 31, wherein the differential displacement signal varies as a function of a position of at least one of the first control member and the second control member.

37. The apparatus of claim 12, further comprising:
a low level controller for driving movement of at least one of the first control member and the second control member in response to receipt of trajectory signal data generated by at least one of the first high level controller and the second high level controller.

38. The apparatus of claim 37, wherein the low level controller comprises a position sensor that detects the position of at least one of the first control member and the second control member and generates an actual trajectory signal.

39. The apparatus of claim 38, wherein the trajectory signal data is essentially the same as the actual trajectory signal.

40. The apparatus of claim 1, wherein upon an occurrence of a failure of a control member, the trajectory signal data generated by the high level controller is independent of actual movement of the control member so as to be used as a command signal for a system being controlled by one of the first and second control members.

* * * * *